(12) United States Patent  
Holt

(10) Patent No.: US 7,860,829 B2  
(45) Date of Patent: Dec. 28, 2010

(54) COMPUTER ARCHITECTURE AND METHOD OF OPERATION FOR MULTI-COMPUTER DISTRIBUTED PROCESSING WITH REPLICATED MEMORY

(75) Inventor: John M. Holt, Hornchurch (AU)

(73) Assignee: Waratek Pty Ltd., Lindfield, New South Wales (AU)

( * ) Notice: Subject to any disclaimer, the term of this patent is extended or adjusted under 35 U.S.C. 154(b) by 65 days.

(21) Appl. No.: 12/396,446

(22) Filed: Mar. 2, 2009

(65) Prior Publication Data

US 2009/0235033 A1    Sep. 17, 2009

Related U.S. Application Data

(63) Continuation of application No. 11/259,634, filed on Oct. 25, 2005, now abandoned, which is a continuation-in-part of application No. 11/111,757, filed on Apr. 22, 2005, which is a continuation-in-part of application No. 10/830,042, filed on Apr. 23, 2004.

(51) Int. Cl.  
*G06F 17/30* (2006.01)

(52) U.S. Cl. .................. 707/617; 707/656; 707/695

(58) Field of Classification Search .......... 707/610, 707/617, 623, 615, 620  
See application file for complete search history.

(56) References Cited

U.S. PATENT DOCUMENTS

| 4,068,298 | A |   | 1/1978  | Dechant et al. |           |
|-----------|---|---|---------|----------------|-----------|
| 4,780,821 | A |   | 10/1988 | Crossley       |           |
| 4,969,092 | A | * | 11/1990 | Shorter        | 718/102   |
| 5,053,943 | A |   | 10/1991 | Yokoyama       |           |
| 5,214,776 | A | * | 5/1993  | Bagnoli et al. | 711/141   |
| 5,291,597 | A | * | 3/1994  | Shorter et al. | 718/100   |
| 5,418,966 | A | * | 5/1995  | Madduri        | 710/200   |
| 5,434,994 | A | * | 7/1995  | Shaheen et al. | 709/223   |
| 5,488,723 | A | * | 1/1996  | Baradel et al. | 719/315   |
| 5,544,345 | A | * | 8/1996  | Carpenter et al.| 711/150  |
| 5,568,609 | A | * | 10/1996 | Sugiyama et al.| 714/43    |
| 5,612,865 | A | * | 3/1997  | Dasgupta       | 700/79    |

(Continued)

FOREIGN PATENT DOCUMENTS

EP    0969377    1/2000

(Continued)

OTHER PUBLICATIONS

Zhou et al, Parallel Recovery in a Replicated Object Environment, pp. 1-6.*

(Continued)

*Primary Examiner*—John R. Cottingham  
*Assistant Examiner*—Sherief Badawi  
(74) *Attorney, Agent, or Firm*—Pillsbury Winthrop Shaw Pittman LLP

(57) ABSTRACT

The present invention discloses a modified computer architecture (50, 71, 72) which enables an applications program (50) to be run simultaneously on a plurality of computers (M1, ... Mn). Shared memory at each computer is updated with amendments and/or overwrites so that all memory read requests are satisfied locally. During initial program loading (75), or similar, instructions which result in memory being re-written or manipulated are identified (92). Additional instructions are inserted (103) to cause the equivalent memory locations at all computers to be updated.

18 Claims, 10 Drawing Sheets

U.S. PATENT DOCUMENTS

| | | | |
|---|---|---|---|
| 5,692,193 A | 11/1997 | Jagannathan et al. | |
| 5,754,207 A | 5/1998 | Gragg et al. | |
| 5,802,585 A * | 9/1998 | Scales et al. | 711/154 |
| 5,809,543 A | 9/1998 | Byers et al. | |
| 5,918,248 A * | 6/1999 | Newell et al. | 711/147 |
| 6,010,210 A | 1/2000 | Wilson et al. | |
| 6,017,118 A | 1/2000 | Gasvoda et al. | |
| 6,049,809 A * | 4/2000 | Raman et al. | 1/1 |
| 6,148,377 A * | 11/2000 | Carter et al. | 711/147 |
| 6,163,801 A | 12/2000 | O'Donnell et al. | |
| 6,192,514 B1 | 2/2001 | Lurndal | |
| 6,216,262 B1 | 4/2001 | Martin | |
| 6,264,316 B1 | 7/2001 | Chino | |
| 6,312,115 B1 | 11/2001 | Hara et al. | |
| 6,314,558 B1 | 11/2001 | Angel et al. | |
| 6,318,850 B1 | 11/2001 | Childers et al. | |
| 6,324,587 B1 | 11/2001 | Trenbeath et al. | |
| 6,327,630 B1 | 12/2001 | Carroll et al. | |
| 6,370,625 B1 | 4/2002 | Carmean et al. | |
| 6,386,675 B2 | 5/2002 | Wilson et al. | |
| 6,389,423 B1 | 5/2002 | Sakakura | |
| 6,425,016 B1 | 7/2002 | Banavar et al. | |
| 6,449,734 B1 | 9/2002 | Shrivastava et al. | |
| 6,460,051 B1 | 10/2002 | Larue et al. | |
| 6,496,871 B1 | 12/2002 | Jagannathan et al. | |
| 6,571,278 B1 | 5/2003 | Negishi et al. | |
| 6,574,628 B1 | 6/2003 | Kahn et al. | |
| 6,574,674 B1 | 6/2003 | May et al. | |
| 6,578,068 B1 | 6/2003 | Bowman-Amuah | |
| 6,585,359 B1 | 7/2003 | Gasvoda et al. | |
| 6,611,955 B1 | 8/2003 | Logean et al. | |
| 6,625,751 B1 | 9/2003 | Starovic et al. | |
| 6,633,577 B1 | 10/2003 | Nyu | |
| 6,637,872 B2 | 10/2003 | Ara et al. | |
| 6,922,685 B2 | 10/2003 | Greene et al. | |
| 6,668,260 B2 | 12/2003 | Zoltan | |
| 6,668,312 B2 | 12/2003 | Abury | |
| 6,682,608 B2 | 1/2004 | Abrams et al. | |
| 6,725,014 B1 | 4/2004 | Voegele | |
| 6,757,896 B1 | 6/2004 | Cohen et al. | |
| 6,760,903 B1 * | 7/2004 | Morshed et al. | 717/130 |
| 6,775,831 B1 * | 8/2004 | Carrasco et al. | 718/100 |
| 6,779,093 B1 * | 8/2004 | Gupta | 711/162 |
| 6,782,492 B1 * | 8/2004 | Nakaso | 714/42 |
| 6,823,511 B1 * | 11/2004 | McKenney et al. | 718/102 |
| 6,862,608 B2 * | 3/2005 | Buhlman et al. | 709/213 |
| 6,865,585 B1 | 3/2005 | Dussud | |
| 6,954,794 B2 * | 10/2005 | Rudd et al. | 709/230 |
| 6,968,372 B1 * | 11/2005 | Thompson et al. | 709/223 |
| 7,004,575 B2 | 2/2006 | Inoue et al. | |
| 7,010,576 B2 * | 3/2006 | Bae | 709/213 |
| 7,020,736 B1 * | 3/2006 | Cherukuri | 711/5 |
| 7,031,989 B2 * | 4/2006 | Elmendorf et al. | 1/1 |
| 7,047,341 B2 | 5/2006 | Jung | |
| 7,047,521 B2 | 5/2006 | Bunnell | |
| 7,058,826 B2 | 6/2006 | Fung | |
| 7,082,604 B2 | 7/2006 | Schneiderman | |
| 7,761,670 B2 | 10/2006 | Holt | |
| 7,788,314 B2 | 10/2006 | Holt | |
| 7,149,866 B2 | 12/2006 | Blandy | |
| 7,206,827 B2 | 4/2007 | Viswanath et al. | |
| 7,581,069 B2 | 5/2007 | Holt | |
| 7,380,039 B2 | 5/2008 | Miloushev et al. | |
| 7,412,580 B1 | 8/2008 | Garthwaite | |
| 7,660,960 B2 | 9/2008 | Holt | |
| 7,437,516 B2 | 10/2008 | Wintergerst et al. | |
| 7,451,240 B2 | 11/2008 | Wu et al. | |
| 7,549,149 B2 | 6/2009 | Childress et al. | |
| 7,639,656 B2 | 12/2009 | Dooley | |
| 7,647,454 B2 | 1/2010 | Aguilera | |
| 7,707,179 B2 | 4/2010 | Holt | |
| 7,712,081 B2 | 5/2010 | Biberstein et al. | |
| 7,739,349 B2 | 6/2010 | Holt | |
| 2002/0087925 A1 | 7/2002 | Hayden et al. | |
| 2002/0161848 A1 | 10/2002 | Willman et al. | |
| 2002/0169644 A1 | 11/2002 | Greene | |
| 2002/0199172 A1* | 12/2002 | Bunnell | 717/128 |
| 2003/0004924 A1* | 1/2003 | Williams | 707/1 |
| 2003/0005407 A1 | 1/2003 | Hines | |
| 2003/0012197 A1 | 1/2003 | Yazaki et al. | |
| 2003/0067912 A1* | 4/2003 | Mead et al. | 370/389 |
| 2003/0105816 A1* | 6/2003 | Goswami | 709/204 |
| 2003/0208658 A1 | 11/2003 | Magoshi | |
| 2004/0073828 A1* | 4/2004 | Bronstein | 714/6 |
| 2004/0093588 A1* | 5/2004 | Gschwind et al. | 717/130 |
| 2004/0142655 A1 | 7/2004 | Voegele | |
| 2004/0158819 A1* | 8/2004 | Cuomo et al. | 717/128 |
| 2004/0163077 A1* | 8/2004 | Dimpsey et al. | 717/130 |
| 2004/0196342 A1 | 10/2004 | Hara et al. | |
| 2005/0010683 A1 | 1/2005 | Moleyar et al. | |
| 2005/0039171 A1 | 2/2005 | Avakian et al. | |
| 2005/0027789 A1 | 3/2005 | Luo et al. | |
| 2005/0086384 A1 | 4/2005 | Ernst | |
| 2005/0108481 A1* | 5/2005 | Iyengar et al. | 711/141 |
| 2005/0228957 A1 | 10/2005 | Satoyama et al. | |
| 2005/0240737 A1 | 10/2005 | Holt | |
| 2005/0240907 A1 | 10/2005 | Renouf | |
| 2005/0257219 A1 | 11/2005 | Holt | |
| 2005/0262313 A1 | 11/2005 | Holt | |
| 2005/0262513 A1 | 11/2005 | Holt | |
| 2006/0015665 A1 | 1/2006 | Illowsky et al. | |
| 2006/0020913 A1 | 1/2006 | Holt | |
| 2006/0041823 A1 | 2/2006 | Wolfgang et al. | |
| 2006/0070051 A1 | 3/2006 | Kuck et al. | |
| 2006/0080389 A1* | 4/2006 | Powers et al. | 709/203 |
| 2006/0095483 A1 | 5/2006 | Holt | |
| 2006/0143350 A1 | 6/2006 | Miloushev et al. | |
| 2006/0167878 A1 | 7/2006 | Hartman | |
| 2006/0242464 A1 | 10/2006 | Holt | |
| 2006/0253844 A1 | 11/2006 | Holt | |
| 2006/0265703 A1 | 11/2006 | Holt | |
| 2006/0265704 A1 | 11/2006 | Holt | |
| 2006/0265705 A1 | 11/2006 | Holt | |
| 2007/0100828 A1 | 5/2007 | Holt | |
| 2007/0101080 A1 | 5/2007 | Holt | |
| 2007/0126750 A1 | 6/2007 | Holt | |
| 2007/0147168 A1 | 6/2007 | Pinto et al. | |
| 2007/0174734 A1 | 7/2007 | Holt | |
| 2007/0233967 A1 | 10/2007 | Rangarajan et al. | |
| 2008/0072238 A1* | 3/2008 | Monnie et al. | 719/310 |
| 2008/0114853 A1 | 5/2008 | Holt | |
| 2008/0114896 A1 | 5/2008 | Holt | |
| 2008/0114899 A1 | 5/2008 | Holt | |
| 2008/0114943 A1 | 5/2008 | Holt | |
| 2008/0114944 A1 | 5/2008 | Holt | |
| 2008/0114962 A1 | 5/2008 | Holt | |
| 2008/0120475 A1 | 5/2008 | Holt | |
| 2008/0120478 A1 | 5/2008 | Holt | |
| 2008/0123642 A1 | 5/2008 | Holt | |
| 2008/0126322 A1 | 5/2008 | Holt | |
| 2008/0126502 A1 | 5/2008 | Holt | |
| 2008/0126503 A1 | 5/2008 | Holt | |
| 2008/0126505 A1 | 5/2008 | Holt | |
| 2008/0126506 A1 | 5/2008 | Holt | |
| 2008/0126516 A1 | 5/2008 | Holt | |
| 2008/0126572 A1 | 5/2008 | Holt | |
| 2008/0126703 A1 | 5/2008 | Holt | |
| 2008/0127213 A1 | 5/2008 | Holt | |
| 2008/0127214 A1 | 5/2008 | Holt | |
| 2008/0133690 A1 | 5/2008 | Holt | |
| 2008/0114945 A1 | 6/2008 | Holt | |
| 2008/0126504 A1 | 6/2008 | Holt | |
| 2008/0126721 A1 | 6/2008 | Holt | |
| 2008/0130631 A1 | 6/2008 | Holt | |

| | | | |
|---|---|---|---|
| 2008/0130652 A1 | 6/2008 | Holt | |
| 2008/0133688 A1 | 6/2008 | Holt | |
| 2008/0133689 A1 | 6/2008 | Holt | |
| 2008/0133691 A1 | 6/2008 | Holt | |
| 2008/0133692 A1 | 6/2008 | Holt | |
| 2008/0133694 A1 | 6/2008 | Holt | |
| 2008/0133711 A1 | 6/2008 | Holt | |
| 2008/0133859 A1 | 6/2008 | Holt | |
| 2008/0133861 A1 | 6/2008 | Holt | |
| 2008/0133862 A1 | 6/2008 | Holt | |
| 2008/0133869 A1 | 6/2008 | Holt | |
| 2008/0133870 A1 | 6/2008 | Holt | |
| 2008/0133871 A1 | 6/2008 | Holt | |
| 2008/0133884 A1 | 6/2008 | Holt | |
| 2008/0137662 A1 | 6/2008 | Holt | |
| 2008/0140633 A1 | 6/2008 | Holt | |
| 2008/0140799 A1 | 6/2008 | Holt | |
| 2008/0140801 A1 | 6/2008 | Holt | |
| 2008/0140805 A1 | 6/2008 | Holt | |
| 2008/0140858 A1 | 6/2008 | Holt | |
| 2008/0140863 A1 | 6/2008 | Holt | |
| 2008/0140970 A1 | 6/2008 | Holt | |
| 2008/0140973 A1 | 6/2008 | Holt | |
| 2008/0140975 A1 | 6/2008 | Holt | |
| 2008/0140976 A1 | 6/2008 | Holt | |
| 2008/0140982 A1 | 6/2008 | Holt | |
| 2008/0141092 A1 | 6/2008 | Holt | |
| 2008/0151902 A1 | 6/2008 | Holt | |
| 2008/0155127 A1 | 6/2008 | Holt | |
| 2008/2050221 | 6/2008 | Holt | |
| 2008/0184071 A1 | 7/2008 | Holt | |
| 2008/0189385 A1 | 7/2008 | Holt | |
| 2008/0189700 A1* | 8/2008 | Schmidt et al. | 718/1 |
| 2008/0195617 A1 | 8/2008 | Holt | |
| 2008/0195682 A1 | 8/2008 | Holt | |
| 2008/0215593 A1 | 9/2008 | Holt | |
| 2008/0215701 A1 | 9/2008 | Holt | |
| 2008/0215703 A1 | 9/2008 | Holt | |
| 2008/0215928 A1 | 9/2008 | Holt | |
| 2008/0120477 A1 | 10/2008 | Holt | |
| 2008/0250213 A1 | 10/2008 | Holt | |
| 2008/0250221 A1 | 10/2008 | Holt | |
| 2009/0198776 A1 | 9/2009 | Holt | |
| 2009/0235033 A1 | 9/2009 | Holt | |
| 2009/0235034 A1 | 9/2009 | Holt | |
| 2010/0054254 A1 | 3/2010 | Holt | |
| 2010/0121935 A1 | 5/2010 | Holt | |

FOREIGN PATENT DOCUMENTS

| | | |
|---|---|---|
| WO | WO95/08809 | 3/1995 |
| WO | WO98/058330 | 12/1998 |
| WO | WO02/44835 | 6/2002 |
| WO | WO03/083614 | 10/2003 |
| WO | WO03/084116 | 10/2003 |
| WO | WO2005/103925 | 11/2003 |
| WO | WO2005/103924 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Thomas Seidmann, Replicated Distributed Shared Memory For The .NET Framework, 2001, pp. 1-4.*
Stockinger et al, File and Object Replication in Data Grids, 2001, pp. 1-11.*
Kielmann et al, Enabling Java for High-Performance Computing: Exploiting Distributed Shared Memory and Remote Method Invocation, 2000, pp. 1.14.*
Object Replication for Java, .NET & GWT, 2006, pp. 1-99.*
Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.
Aridor, et al. "cJVM: a single System Image of a JVM on a Cluster" Proceedings of the International Conference on Parallel Processing, pp. 21-24, Sep. 21-24, 1999.
Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.
Bal, et al., "Experience with Distributed Programming in Orca", *IEEE CS International Conference on Computer Languages*, pp. 1-23, Mar. 1990, New Orleans, Louisiana.
Bal, et al. "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.
Bal, et al., "Orca: A Language for Paralell Programming of Distributed Systems", *IEEE Transactions on Software Engineering*, 18(3): pp 1-33, Oct. 1989.
Bal, et al., "Replication Techniques for Speeding Up Parallel Applications On Distributed Systems", *Concurrency Practice & Experience*, 4(5):337-355 (1992).
Bellew, et al., "Update propagation in distributed memory hierarchy." Data Engr. 1990. Proc. 6th Int'l Conf., pp. 521-528, Feb. 1990.
Bennett, et al. "Munin: Distributed Shared Memory Based on Type Specific Memory Coherence." Dept. Elec & Computer Engr. pp. 1-9 ACM, PPOPP'90, Feb. 1990.
Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.
Chen, et al., "Multi-Jav: a distributed shared memory system based on multiple Java virtual machines," Proc. Of Conf. on Parallel & Distrib. Proc. Techn. & Appls., Las Vegas, NV, Jun. 1998.
Dasilva, et al. "An evaluation of cJava system architecture." IEEE Prc. 15th Symposium on Computer Architecture & High Performance Computing, pp. 1-9, Nov. 10-12, 2003, San Paulo, Brazil.
Dmitriev, "Profiling Java applications using code hotswapping and dynamic call graph revelation.", Jan. 14-16, 2004, ACM WOSP '04, pp. 139-150.
Dwarkadas, et al., "Evaluation of Release Consistent Software Distributed Shared Memory on Emerging Network Technology", Proc of the 20th Annual International Symposium on Computer Architecture (ISCA '93), pp. 144-155, May 16-19, 1993, San Diego, CA.
Goethe, et al. "The Distributed Ada Run-Time System DARTS." Software Prac. & Experience, vol. 21, No. 1, pp. 1249-1263, Aug. 4, 1989.
Haumacher, et al. "Transparent distributed threads for Java," Parallel & Distributed Proc. Symposium 2003. Proc. Int'l pp. 22-26, Apr. 2003.
Puatu, "Distributed Garbage Collection of Active Objects with No Global Syncrhonisation"—Lecture Notes in Computer Science, Memory Management [online], XP008098868 ISSN: 0302-9743 ISBN: 978-3-540-55940-5- Retreived from the internet URL:http//www.springerlink.com/content/5v_028411810p6m700/>, vol. 637, pp. 148-1694 Sep. 17-19, 1992, IWMM 92, St. Malo, France.
Larus, et al., "EEL: machine-independent executable editing. 1995 ACM SIGGPLAN '95." pp. 291-300 Jun. 21-22, 1995.
Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, XP010095684 ISBN:978-0-8186-3770-4.
Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplementary European Search Report EP 06 79 0317 dated Mar. 5, 2009.

* cited by examiner

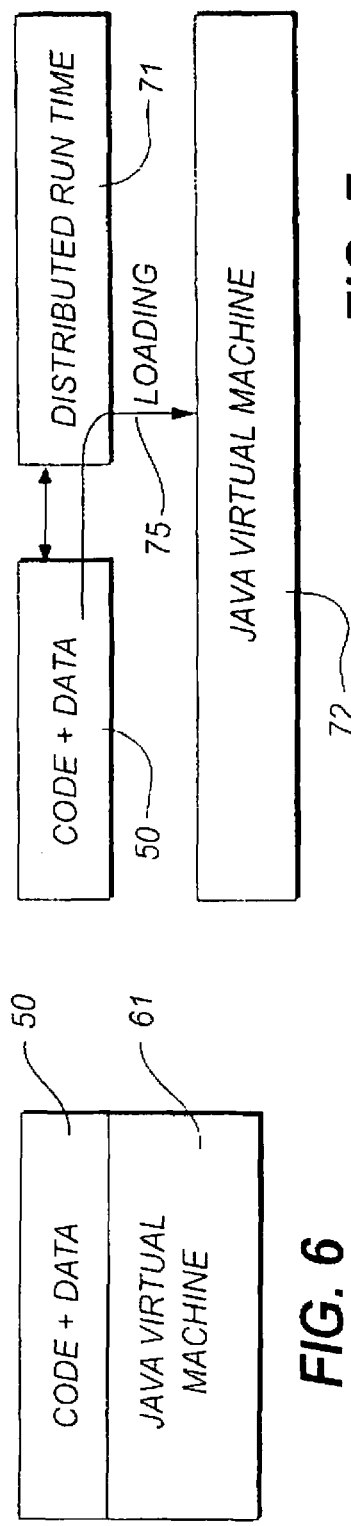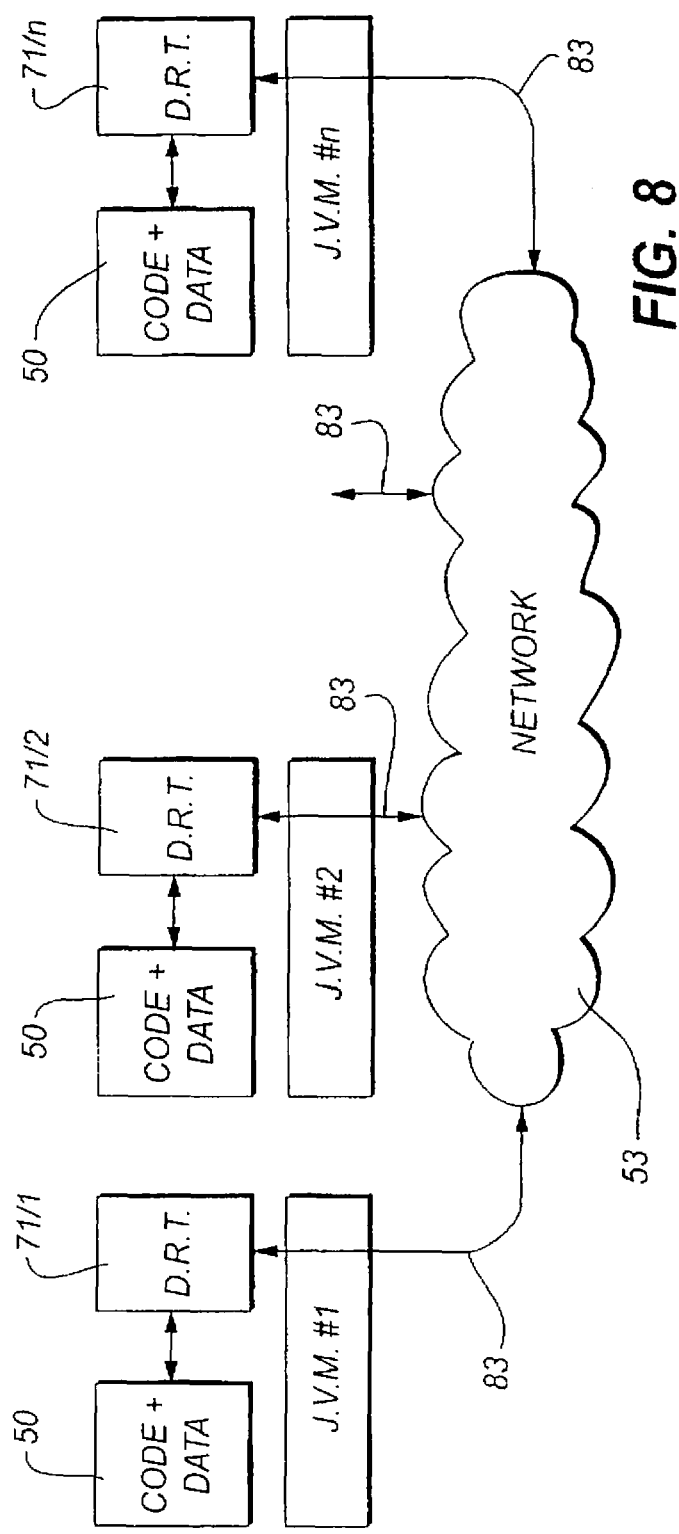

COMPUTER ARCHITECTURE AND METHOD OF OPERATION FOR MULTI-COMPUTER DISTRIBUTED PROCESSING WITH REPLICATED MEMORY

RELATED APPLICATIONS

This application is a Continuation of and claims the benefit of priority to U.S. patent application Ser. No. 11/259,634 filed 25 Oct. 2005 and entitled Computer Architecture And Method Of Operation For Multi-Computer Distributed Processing With Replicated Memory, and hereby incorporated by reference and which is a Continuation-In-Part of U.S. patent application Ser. No. 11/111,757 filed 22 Apr. 2005 entitled Multiple Computer Architecture With Replicated Memory Fields, which is a Continuation-In-Part of U.S. patent application Ser. No. 10/830,042 filed 23 Apr. 2004.

This application also claims the benefit of priority under one or more of 35 U.S.C. 119 and/or 35 U.S.C. 120 to the following Australian Patent Applications, U.S. Utility Patent Applications and PCT International Patent Applications, each of which is also a related application and each is incorporated herein by reference in its entirety:

U.S. patent application Ser. No. 11/259,634, filed 25 Oct. 2005 entitled "Computer Architecture And Method Of Operation For Multi-Computer Distributed Processing With Replicated Memory";

U.S. patent application Ser. No. 11/259,744, filed 25 Oct. 2005 entitled "Computer Architecture And Method Of Operation For Multi-Computer Distributed Processing With Initialization Of Objects";

U.S. patent application Ser. No. 11/259,762, filed 25 Oct. 2005 entitled "Computer Architecture And Method Of Operation For Multi-Computer Distributed Processing With Finalization Of Objects";

U.S. patent application Ser. No. 11/259,761, filed 25 Oct. 2005 entitled "Computer Architecture And Method Of Operation For Multi-Computer Distributed Processing With Synchronization";

U.S. patent application Ser. No. 11/259,885, filed 25 Oct. 2005 entitled "Computer Architecture And Method Of Operation For Multi-Computer Distributed Processing And Coordinated Memory And Asset Handling";

Australian Provisional Patent Application No. 2005 902 023 filed 21 Apr. 2005 entitled "Multiple Computer Architecture with Replicated Memory Fields";

Australian Provisional Patent Application No. 2005 902 024 filed 21 Apr. 2005 entitled "Modified Computer Architecture with Initialization of Objects";

Australian Provisional Patent Application No. 2005 902 025 filed 21 Apr. 2005 entitled "Modified Computer Architecture with Finalization of Objects";

Australian Provisional Patent Application No. 2005 902 026 filed 21 Apr. 2005 entitled "Modified Computer Architecture with Synchronization of Objects";

Australian Provisional Patent Application No. 2004 902 027 filed 21 Apr. 2005 entitled "Modified Computer Architecture with Coordinated Objects";

U.S. patent application Ser. No. 11/111,757 filed 22 Apr. 2005 entitled "Multiple Computer Architecture with Replicated Memory Fields";

U.S. patent application Ser. No. 11/111,781 filed 22 Apr. 2005 entitled "Modified Computer Architecture with Initialization of Objects";

U.S. patent application Ser. No. 11/111,778 filed 22 Apr. 2005 entitled "Modified Computer Architecture with Finalization of Objects";

U.S. patent application Ser. No. 11/111,779 filed 22 Apr. 2005 entitled "Modified Computer Architecture with Synchronization of Objects";

U.S. patent application Ser. No. 11/111,946 filed 22 Apr. 2005 entitled "Modified Computer Architecture with Coordinated Objects";

PCT International Application No. PCT/AU05/000/582 filed 22 Apr. 2005 entitled "Multiple Computer Architecture with Replicated Memory Fields";

PCT International Application No. PCT/AU05/000/578 filed 22 Apr. 2005 entitled "Modified Computer Architecture with Initialization of Objects";

PCT International Application No. PCT/AU05/000/581 filed 22 Apr. 2005 entitled "Modified Computer Architecture with Finalization of Objects";

PCT International Application No. PCT/AU05/000/579 filed 22 Apr. 2005 entitled "Modified Computer Architecture with Synchronization of Objects"; and PCT International Application No. PCT/AU05/000/580 filed 22 Apr. 2005 entitled "Modified Computer Architecture with Coordinated Objects".

A further related patent application that is hereby incorporated by reference is U.S. patent application Ser. No. 10/830,042 filed 23 Apr. 2004 entitled "Modified Computer Architecture".

FIELD OF THE INVENTION

The present invention relates to computers and other computing machines and information appliances, in particular, to a modified computer architecture and program structure which enables the operation of an application program concurrently or simultaneously on a plurality of computers interconnected via a communications link using a distributed runtime and enables improved performance to be achieved.

BACKGROUND OF THE INVENTION

Ever since the advent of computers, and computing, software for computers has been written to be operated upon a single machine. As indicated in FIG. 1, that single prior art machine 1 is made up from a central processing unit, or CPU, 2 which is connected to a memory 3 via a bus 4. Also connected to the bus 4 are various other functional units of the single machine 1 such as a screen 5, keyboard 6 and mouse 7.

A fundamental limit to the performance of the machine 1 is that the data to be manipulated by the CPU 2, and the results of those manipulations, must be moved by the bus 4. The bus 4 suffers from a number of problems including so called bus "queues" formed by units wishing to gain an access to the bus, contention problems, and the like. These problems can, to some extent, be alleviated by various stratagems including cache memory, however, such stratagems invariably increase the administrative overhead of the machine 1.

Naturally, over the years various attempts have been made to increase machine performance. One approach is to use symmetric multi-processors. This prior art approach has been used in so called "super" computers and is schematically indicated in FIG. 2. Here a plurality of CPU's 12 are connected to global memory 13. Again, a bottleneck arises in the communications between the CPU's 12 and the memory 13. This process has been termed "Single System Image". There is only one application and one whole copy of the memory for the application which is distributed over the global memory. The single application can read from and write to, (i.e. share) any memory location completely transparently.

Where there are a number of such machines interconnected via a network, this is achieved by taking the single application written for a single machine and partitioning the required memory resources into parts. These parts are then distributed across a number of computers to form the global memory 13 accessible by all CPU's 12. This procedure relies on masking, or hiding, the memory partition from the single running application program. The performance degrades when one CPU on one machine must access (via a network) a memory location physically located in a different machine.

Although super computers have been technically successful in achieving high computational rates, they are not commercially successful in that their inherent complexity makes them extremely expensive not only to manufacture but to administer. In particular, the single system image concept has never been able to scale over "commodity" (or mass produced) computers and networks. In particular, the Single System Image concept has only found practical application on very fast (and hence very expensive) computers interconnected by very fast (and similarly expensive) networks.

A further possibility of increased computer power through the use of a plural number of machines arises from the prior art concept of distributed computing which is schematically illustrated in FIG. 3. In this known arrangement, a single application program (Ap) is partitioned by its author (or another programmer who has become familiar with the application program) into various discrete tasks so as to run upon, say, three machines in which case n in FIG. 3 is the integer 3. The intention here is that each of the machines M1 . . . M3 runs a different third of the entire application and the intention is that the loads applied to the various machines be approximately equal. The machines communicate via a network 14 which can be provided in various forms such as a communications link, the internet, intranets, local area networks, and the like. Typically the speed of operation of such networks 14 is an order of magnitude slower than the speed of operation of the bus 4 in each of the individual machines M1, M2, . . . , Mn.

Distributed computing suffers from a number of disadvantages. Firstly, it is a difficult job to partition the application and this must be done manually. Secondly, communicating data, partial results, results and the like over the network 14 is an administrative overhead. Thirdly, the need for partitioning makes it extremely difficult to scale upwardly by utilising more machines since the application having been partitioned into, say three, does not run well upon four machines. Fourthly, in the event that one of the machines should become disabled, the overall performance of the entire system is substantially degraded.

A further prior art arrangement is known as network computing via "clusters" as is schematically illustrated in FIG. 4. In this approach, the entire application is loaded onto each of the machines M1, M2, . . . , Mn. Each machine communicates with a common database but does not communicate directly with the other machines. Although each machine runs the same application, each machine is doing a different "job" and uses only its own memory. This is somewhat analogous to a number of windows each of which sell train tickets to the public. This approach does operate, is scalable and mainly suffers from the disadvantage that it is difficult to administer the network.

In computer languages such as for example JAVA and MICROSOFT.NET there are two major types of constructs with which programmers deal. In the JAVA language these are known as objects and classes. More generally they may be referred to as assets. Every time an object (or other asset) is created there is an initialization routine run known as an object initialization (e.g., "<init>") routine. Similarly, every time a class is loaded there is a class initialization routine known as "<clinit>". Other languages use different terms but utilize a similar concept. In either case, however, there is no equivalent "clean up" or deletion routine to delete an object or class (or other asset) once it is no longer required. Instead, this "clean up" happens unobtrusively in a background mode.

Furthermore, in any computer environment it is necessary to acquire and release a lock to enable the use of such objects, classes, assets, resources or structures to avoid different parts of the application program from attempting to use the same objects, classes, assets, resources or structures at the one time. In the JAVA environment this is known as synchronization. Synchronization more generally refers to the exclusive use of an object, class, resource, structure, or other asset to avoid contention between and among computers or machines. This is achieved in JAVA by the "monitor enter" and "monitor exit" instructions or routines. Other languages use different terms but utilize a similar concept.

Unfortunately, conventional computing systems, architectures, and operating schemes do not provide for computing environments and methods in which an application program can operate simultaneously on an arbitrary plurality of computers where the environment and operating scheme ensure that the abovementioned memory management, initialization, clean up and synchronization procedures operate in a consistent and coordinated fashion across all the computing machines.

SUMMARY

The present invention discloses a computing environment in which an application program operates simultaneously on a plurality of computers. In such an environment it is advantageous to ensure that the abovementioned asset initialization, clean-up and synchronization procedures operate in a consistent and coordinated fashion across all the machines.

In accordance with a first aspect of the present invention there is disclosed a multiple computer system having at least one application program each written to operate on only a single computer but running simultaneously on a plurality of computers interconnected by a communications network, wherein different portions of said application program(s) execute substantially simultaneously on different ones of said computers, wherein each computer has an independent local memory accessible only by the corresponding portion of said application program(s) and wherein for each said portion a like plurality of substantially identical objects are created, each in the corresponding computer.

In accordance with a second aspect of the present invention there is disclosed A plurality of computers interconnected via a communications link and each having an independent local memory and substantially simultaneously operating a different portion at least one application program each written to operate on only a single computer, each local memory being accessible only by the corresponding portion of said application program.

In accordance with a third aspect of the present invention there is disclosed a method of running simultaneously on a plurality of computers at least one application program each written to operate on only a single computer, said computers being interconnected by means of a communications network and each having an independent local memory, said method comprising the step of: (i) executing different portions of said application program(s) on different ones of said computers and for each said portion creating a like plurality of substantially identical objects each in the corresponding computer and each accessible only by the corresponding portion of said application program.

In accordance with a fourth aspect of the present invention there is disclosed a method of loading an application program written to operate only on a single computer onto each of a plurality of computers, the computers being interconnected via a communications link, and different portions of said application program(s) being substantially simultaneously executable on different computers with each computer having an independent local memory accessible only by the corresponding portion of said application program(s), the method comprising the step of modifying the application before, during, or after loading and before execution of the relevant portion of the application program.

In accordance with a fifth aspect of the present invention there is disclosed a method of operating simultaneously on a plurality of computers all interconnected via a communications link at least one application program each written to operate on only a single computer, each of said computers having at least a minimum predetermined local memory capacity, different portions of said application program(s) being substantially simultaneously executed on different ones of said computers with the local memory of each computer being only accessible by the corresponding portion of said application program(s), said method comprising the steps of: (i) initially providing each local memory in substantially identical condition, (ii) satisfying all memory reads and writes generated by each said application program portion from said corresponding local memory, and (iii) communicating via said communications link all said memory writes at each said computer which take place locally to all the remainder of said plurality of computers whereby the contents of the local memory utilised by each said computer, subject to an updating data transmission delay, remains substantially identical.

In accordance with a sixth aspect of the present invention there is disclosed A method of compiling or modifying an application program written to operate on only a single computer but to run simultaneously on a plurality of computers interconnected via a communications link, with different portions of said application program(s) executing substantially simultaneously on different ones of said computers each of which has an independent local memory accessible only by the corresponding portion of said application program, said method comprising the steps of: (i) detecting instructions which share memory records utilizing one of said computers, (ii) listing all such shared memory records and providing a naming tag for each listed memory record, (iii) detecting those instructions which write to, or manipulate the contents of, any of said listed memory records, and (iv) activating an updating propagation routine following each said detected write or manipulate instruction, said updating propagation routine forwarding the re-written or manipulated contents and name tag of each said re-written or manipulated listed memory record to the remainder of said computers.

In accordance with a seventh aspect of the present invention there is disclosed in a multiple thread processing computer operation in which individual threads of a single application program written to operate on only a single computer are simultaneously being processed each on a different corresponding one of a plurality of computers each having an independent local memory accessible only by the corresponding thread and each being interconnected via a communications link, the improvement comprising communicating changes in the contents of local memory physically associated with the computer processing each thread to the local memory of each other said computer via said communications link.

In accordance with a eighth aspect of the present invention there is disclosed a computer program product comprising a set of program instructions stored in a storage medium and operable to permit a plurality of computers to carry out the abovementioned methods.

In accordance with a ninth aspect of the invention there is disclosed a distributed run time and distributed run time system adapted to enable communications between a plurality of computers, computing machines, or information appliances.

In accordance with a tenth aspect of the invention there is disclosed a modifier, modifier means, and modifier routine for modifying an application program written to execute on a single computer or computing machine at a time to execute simultaneously on a plurality of networked computers or computing machines. distributed run time and distributed run time system adapted to enable communications between a plurality of computers, computing machines, or information appliances.

In accordance with an eleventh aspect of the present invention there is disclosed a computer program and computer program product written to operate on only a single computer but product comprising a set of program instructions stored in a storage medium and operable to permit a plurality of computers to carry out the abovementioned procedures, routines, and methods.

BRIEF DESCRIPTION OF THE DRAWINGS

Embodiments of the present invention are now described with reference to the drawings in which:

FIG. 6 is a schematic illustration of a prior art computer arranged to operate JAVA code and thereby constitute a JAVA virtual machine;

FIG. 7 is a drawing similar to FIG. 6 but illustrating the initial loading of code in accordance with the preferred embodiment;

FIG. 8 is a drawing similar to FIG. 5 but illustrating the interconnection of a plurality of computers each operating JAVA code in the manner illustrated in FIG. 7;

Figure 1:
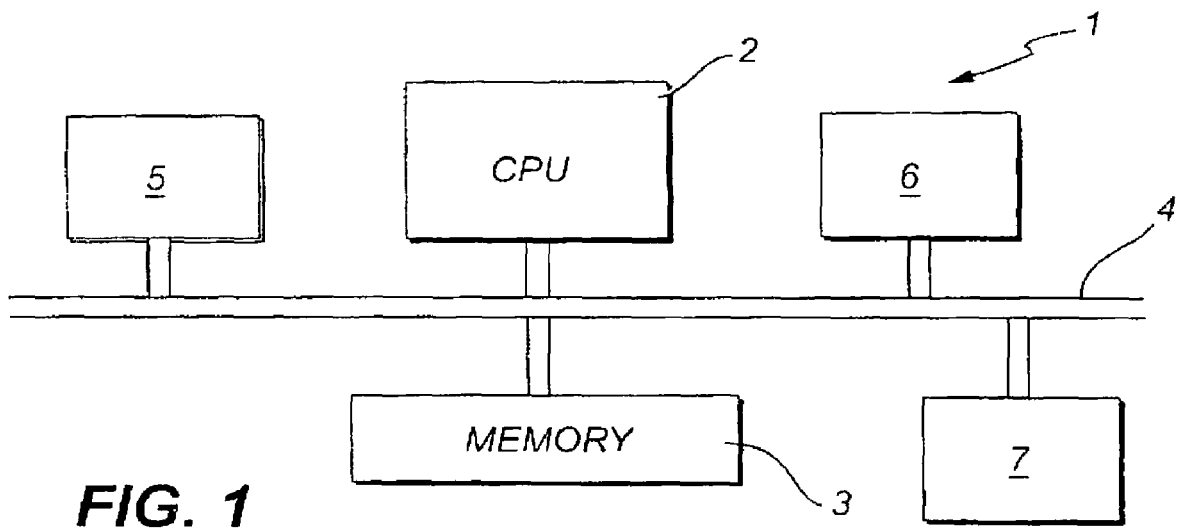
FIG. 1 is a schematic view of the internal architecture of a conventional computer.

The specification includes an Annexure A which provides actual program fragments which implement various aspects of the described embodiments.

REFERENCE TO ANNEXES

Although the specification provides a complete and detailed description of the several embodiments of the invention such that the invention may be understood and implemented without reference to other materials, the specification does includes Annexure A which provide exemplary actual program or code fragments which implement various aspects of the described embodiments. Although aspects of the invention are described throughout the specification including the Annexes, drawings, and claims, it may be appreciated that Annexure A relates primarily to fields. More particularly, the accompanying Annexure is provided in which: Annexures A1-A10 illustrate exemplary code to illustrate embodiments of the invention in relation to fields.

It will be appreciated in light of the description provided here that the categorization of the Annexures as well as the use of other headings and subheadings in this description is intended as an aid to the reader and is not to be used to limit the scope of the invention in any way.

DETAILED DESCRIPTION OF EMBODIMENTS OF THE INVENTION

The present invention discloses a modified computer architecture which enables an applications program to be run simultaneously on a plurality of computers in a manner that overcomes the limitations of the aforedescribed conventional architectures, systems, methods, and computer programs.

In one aspect, shared memory at each computer may be updated with amendments and/or overwrites so that all memory read requests are satisfied locally. Before, during or after program loading, but before execution of relevant portions of the program code are executed, or similar, instructions which result in memory being re-written or manipulated are identified. Additional instructions are inserted into the program code (or other modification made) to cause the equivalent memory locations at all computers to be updated. While the invention is not limited to JAVA language or virtual machines, exemplary embodiments are described relative to the JAVA language and standards.

In another aspect, the initialization of JAVA language classes and objects (or other assets) are provided for so all memory locations for all computers are initialized in the same manner. In another aspect, the finalization of JAVA language classes and objects is also provide so finalization only occurs when the last class or object present on all machines is no longer required. In still another aspect, synchronization is provided such that instructions which result in the application program acquiring (or releasing) a lock on a particular asset (synchronization) are identified. Additional instructions are inserted (or other code modifications performed) to result in a modified synchronization routine with which all computers are updated.

As will become more apparent in light of the further description provided herein, one of the features of the invention is to make it appear that one common application program or application code and its executable version (with likely modification) is simultaneously or concurrently executing across a plurality of computers or machines M1, . . . , Mn. As will be described in considerable detail hereinafter, the instant invention achieves this by running the same application program (for example, Microsoft Word or Adobe Photoshop CS2) on each machine, but modifying the executable code of that application program on each machine as necessary such that each executing instance ('copy') on each machine coordinates its local operations on any particular machine with the operations of the respective instances on the other machines such that they all function together in a consistent, coherent and coordinated manner and give the appearance of being one global instance of the application (i.e., a "meta-application").

In accordance with embodiments of the present invention a single application code 50 (sometimes more informally referred to as the application or the application program) can be operated simultaneously on a number of machines M1, M2 . . . Mn interconnected via a communications network or other communications link or path 53. The communications network or path may be any electronic signaling, data, or digital communications network or path and may advantageously be a relatively slow speed communications path, such as a network connection over the Internet or any common networking configurations known or available as of the date or this applications, and extensions and improvements, thereto.

By way of example but not limitation, one application code or program 50 may be a single application on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one" application code or program and a "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, and with some restrictions after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 (in some embodiments implemented as a distributed run time or DRT 71) on each machine M1, M2, . . . , Mn and thus all of the machines M1, M2 . . . Mn have the same (or substantially the same or similar) modifier 51 for each modification required. Different modification for example may be required for memory management and replication, initialization, finalization, and/or synchronization (though not all of these modification types may be required for all embodiments).

In addition, during the loading of, or at any time preceding the execution of, the application code 50 (or relevant portion thereof) on each machine M1, M2 . . . Mn, each application code 50 has been modified by the corresponding modifier 51 according to the same rules (or substantially the same rules since minor optimizing changes are permitted within each modifier 51/1, 51/2, . . . , 51/n).

With specific reference to any memory management modifier that may be provided, such memory management modifier 51-M or DRT 71-M or other code modifying means component of the overall modifier or distributed run time means is responsible for creating or replicating a memory structure and contents on each of the individual machines M1, M2 . . . Mn that permits the plurality of machines to interoperate. In some embodiments this replicated memory structure will be identical, in other embodiments this memory structure will have portions that are identical and other portions that are not, and in still other embodiments the memory structures are or may not be identical.

These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Attention is now directed to the particulars of several aspects of the invention that may be utilised alone or in any combination.

Figure 5:
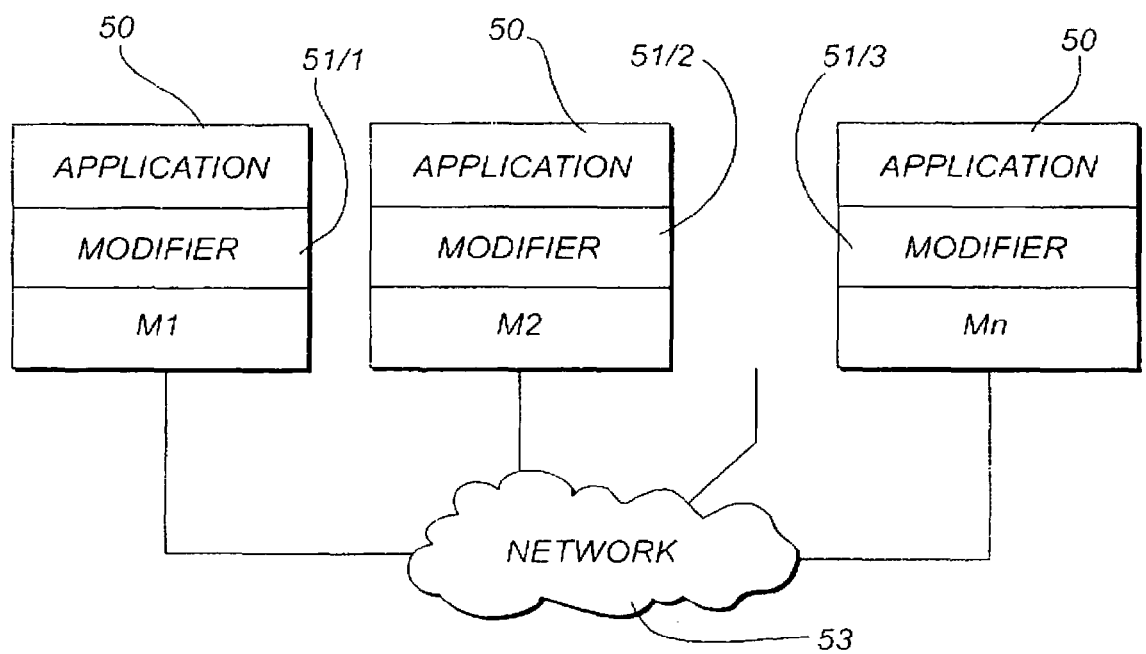
FIG. 5 is a schematic block diagram of a plurality of machines operating the same application program in accordance with a first embodiment of the present invention.

In connection with FIG. 5, in accordance with a preferred embodiment of the present invention a single application code 50 (sometimes more informally referred to as the application or the application program) can be operated simultaneously on a number of machines M1, M2 . . . Mn interconnected via a communications network or other communications link or path 53. By way of example but not limitation, one application code or program 50 would be a single common application program on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one", "single", and "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, or after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 on each machine M1, M2, . . . , Mn and thus all of the machines M1, M2 . . . Mn have the same (or substantially the same or similar) modifier 51 with the modifier of machine M1 being designated 51/1 and the modifier of machine M2 being designated 51/2, etc. In addition, before or during the loading of, or preceding the execution of, or even after execution has commenced, the application code 50 on each machine M1, M2 . . . Mn is modified by the corresponding modifier 51 according to the same rules (or substantially the same rules since minor optimizing changes are permitted within each modifier 51/1, 51/2, . . . , 51/n).

As will become more apparent in light of the further description provided herein, one of the features of the invention is to make it appear that one application program instance of application code 50 is executing simultaneously across all of the plurality of machines M1, M2, . . . , Mn. As will be described in considerable detail hereinafter, the instant invention achieves this by running the same application program code (for example, Microsoft Word or Adobe Photoshop CS2) on each machine, but modifying the executable code of that application program on each machine such that each executing occurrence (or 'local instance') on each one of the machines M1 . . . Mn coordinates its local operations with the operations of the respective occurrences on each one of the other machines such that each occurrence on each one of the plurality of machines function together in a consistent, coherent and coordinated manner so as to give the appearance of being one global instance (or occurrence) of the application program and program code (i.e., a "meta-application").

As a consequence of the above described arrangement, if each of the machines M1, M2, . . . , Mn has, say, an internal memory capability of 10 MB, then the total memory available to each application code 50 is not necessarily, as one might expect the number of machines (n) times 10 MB, or alternatively the additive combination of the internal memory capability of all n machines, but rather or still may only be 10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as a 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has an private (i.e. 'non-common') internal memory capability. The private internal memory capability of the machines M1, M2, . . . , Mn are normally approximately equal but need not be. It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation of the invention.

It is known from the prior art to operate a single computer or machine (produced by one of various manufacturers and having an operating system operating in one of various different languages) in a particular language of the application, by creating a virtual machine as schematically illustrated in FIG. 6. The code and data and virtual machine configuration or arrangement of FIG. 6 takes the form of the application code 50 written in the Java language and executing within a Java Virtual Machine 61. Thus, where the intended language of the application is the language JAVA, a JAVA virtual machine is used which is able to operate code in JAVA irrespective of the machine manufacturer and internal details of the machine. For further details see "The JAVA Virtual Machine Specification" $2^{nd}$ Edition by T. Lindholm & F. Yellin of Sun Microsystems Inc. of the USA, which is incorporated by reference herein.

Figure 17:
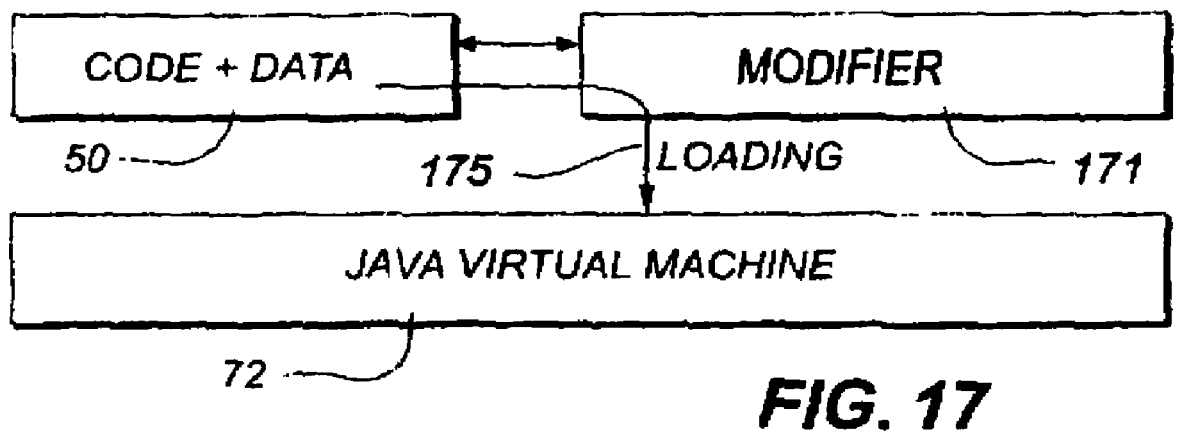
FIG. 17 is a drawing showing an alternative to similar to FIG. 7.

This conventional art arrangement of FIG. 6 is modified in accordance with embodiments of the present invention by the provision of an additional facility which is conveniently termed "distributed run time" or "distributed run time system" DRT 71 and as seen in FIG. 7. An alternative showing the modifier 171 and loading 175 code 50 is in FIG. 17.

In FIG. 7, the application code 50 is loaded onto the Java Virtual Machine 72 in cooperation with the distributed runtime system 71, through the loading procedure indicated by arrow 75. As used herein the terms distributed runtime and the distributed run time system are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. The runtime system typically deals with the details of the interface between the program and the operation system such as system calls, program start-up and termination, and memory management. For purposes of background, a conventional Distributed Computing Environment (DCE) that does not provide the capabilities of the inventive distributed run time or distributed run time system 71 required in the invention is available from the Open Software Foundation. This Distributed Computing Environment (DCE) performs a form of computer-to-computer communication for software running on the machines, but among its many limitations, it is not able to implement the modification or communication operations of this invention. Among its functions and operations, the inventive DRT 71 coordinates the particular communications between the plurality of machines M1, M2, . . . , Mn. Moreover, the inventive distributed runtime 71 comes into operation during the loading procedure indicated by arrow 75 of the JAVA application 50 on each JAVA virtual machine 72 of machines JVM#1, JVM#2, . . . JVM#n. The sequence of operations during loading will be described hereafter in relation to FIG. 9. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine, or operating environment.

FIG. 8 shows in modified form the arrangement of FIG. 5 utilising JAVA virtual machines, each as illustrated in FIG. 7. It will be apparent that again the same application code 50 is loaded onto each machine M1, M2 . . . Mn. However, the communications between each machine M1, M2, . . . , Mn, and indicated by arrows 83, although physically routed through the machine hardware, are advantageously controlled by the individual DRT's 71/1 . . . 71/n within each machine. Thus, in practice this may be conceptionalised as the DRT's 71/1, . . . , 71/n communicating with each other via the network or other communications link 73 rather than the machines M1, M2, . . . , Mn communicating directly with themselves or each other. Actually, the invention contemplates and included either this direct communication between machines M1, M2 . . . Mn or DRTs 71/1, 71/2, . . . , 71/n or a combination of such communications. The inventive DRT 71 provides communication that is transport, protocol, and link independent.

It will be appreciated in light of the description provided herein that there are alternative implementations of the modifier 51 and the distributed run time 71. For example, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71. In one embodiment, the modifier 51 and DRT 71 are implemented or written in a single piece of computer program code that provides the functions of the DRT and modifier. The modifier function and structure therefore maybe subsumed into the DRT and considered to be an optional component. Independent of how implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT may for example implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures within the invention are less important than that they are provided.

However, in the arrangement illustrated in FIG. 8, (and also in FIGS. 31-32), a plurality of individual computers or machines M1, M2, . . . , Mn are provided, each of which are interconnected via a communications network 53 or other communications link and each of which individual computers or machines provided with a modifier 51 (See in FIG. 5) and realised by or in for example the distributed run time (DRT) 71 (See FIG. 8) and loaded with a common application code 50. The term common application program is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50, and this single copy or perhaps a plurality of identical copies are modified to generate a modified copy or version of the application program or program code, each copy or instance prepared for execution on the plurality of machines. At the point after they are modified they are common in the sense that they perform similar operations and operate consistently and coherently with each other. It will be appreciated that a plurality of computers, machines, information appliances, or the like implementing the features of the invention may optionally be connected to or coupled with other computers, machines, information appliances, or the like that do not implement the features of the invention.

Essentially in at least one embodiment the modifier 51 or DRT 71 or other code modifying means is responsible for modifying the application code 50 so that it may execute memory manipulation operations, such as memory putstatic and putfield instructions in the JAVA language and virtual machine environment, in a coordinated, consistent, and coherent manner across and between the plurality of individual machines M1 ... Mn. It follows therefore that in such a computing environment it is necessary to ensure that each of memory location is manipulated in a consistent fashion (with respect to the others).

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

A machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that platform and/or runtime system may include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

Figure 9:
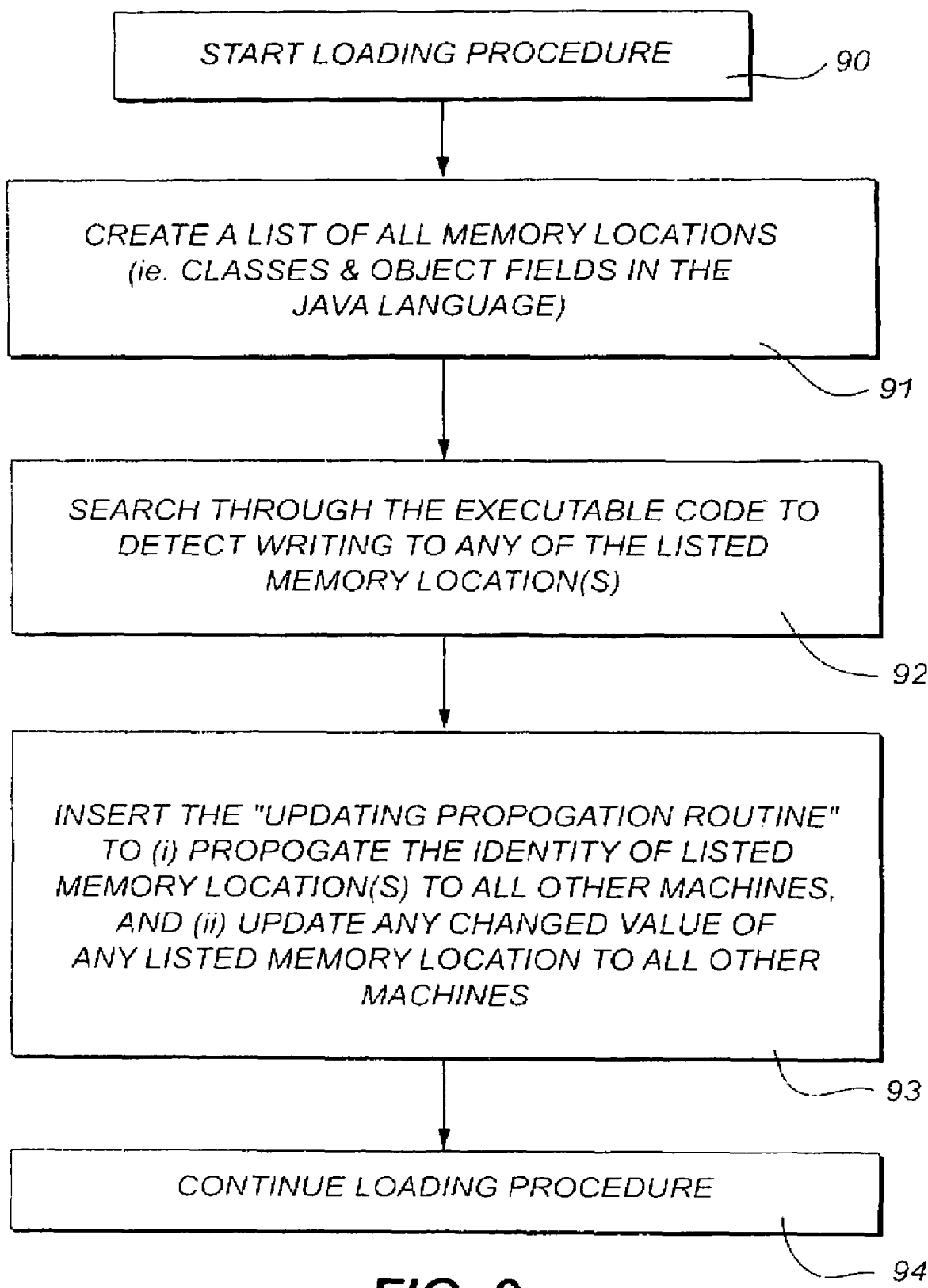
FIG. 9 is a flow chart of the procedure followed during loading of the same application on each machine in the network.

Turning now to FIGS. 7 and 9, during the loading procedure 75, the application code 50 being loaded onto or into each JAVA virtual machine 72 is modified by DRT 71. This modification commences at Step 90 in FIG. 9 and involves the initial step 91 of preferably scrutinizing or analysing the code and detecting all memory locations addressable by the application code 50, or optionally some subset of all memory locations addressable by the application code 50; such as for example named and unnamed memory locations, variables (such as local variables, global variables, and formal arguments to subroutines or functions), fields, registers, or any other address space or range of addresses which application code 50 may access. Such memory locations in some instances need to be identified for subsequent processing at steps 92 and 93. In some embodiments, where a list of detected memory locations is required for further processing, the DRT 71 during the loading procedure 75 creates a list of all the memory locations thus identified. In one embodiment, the memory locations in the form of JAVA fields are listed by object and class, however, the memory locations, fields, or the like may be listed or organized in any manner so long as they comport with the architectural and programming requirements of the system on which the program is to be used and the principles of the invention described herein. This detection is optional and not required in all embodiments of the invention. It may be noted that the DRT is at least in part fulfilling the roll of the modifier 51.

The next phase (designated Step 92 in FIG. 9) [Step 92] of the modification procedure is to search through the application code 50 in order to locate processing activity or activities that manipulate or change values or contents of any listed memory location (for example, but not limited to JAVA fields) corresponding to the list generated at step 91 when required. Preferably, all processing activities that manipulate or change any one or more values or contents of any one or more listed memory locations, are located.

When such a processing activity or operation (typically "putstatic" or "putfield" in the JAVA language, or for example, a memory assignment operation, or a memory write operation, or a memory manipulation operation, or more generally operations that otherwise manipulate or change value(s) or content(s) of memory or other addressable areas), is detected which changes the value or content of a listed or detected memory location, then an "updating propagation routine" is inserted by step 93 in the application code 50 corresponding to the detected memory manipulation operation, to communicate with all other machines in order to notify all other machines of the identity of the manipulated memory location, and the updated, manipulated or changed value(s) or content(s) of the manipulated memory location. The inserted "updating propagation routine" preferably takes the form of a method, function, procedure, or similar subroutine call or operation to a network communications library of DRT 71. Alternatively, the "updating propagation routine" may take the optional form of a code-block (or other inline code form) inserted into the application code instruction stream at, after, before, or otherwise corresponding to the detected manipulation instruction or operation. And preferably, in a multi-tasking or parallel processing machine environment (and in some embodiments inclusive or exclusive of operating system), such as a machine environment capable of potentially simultaneous or concurrent execution of multiple or different threads or processes, the "updating propagation routine" may execute on the same thread or process or processor as the detected memory manipulation operation of step 92. Thereafter, the loading procedure continues, by loading the modified application code 50 on the machine 72 in place of the unmodified application code 50, as indicated by step 94 in FIG. 9.

Figure 10:
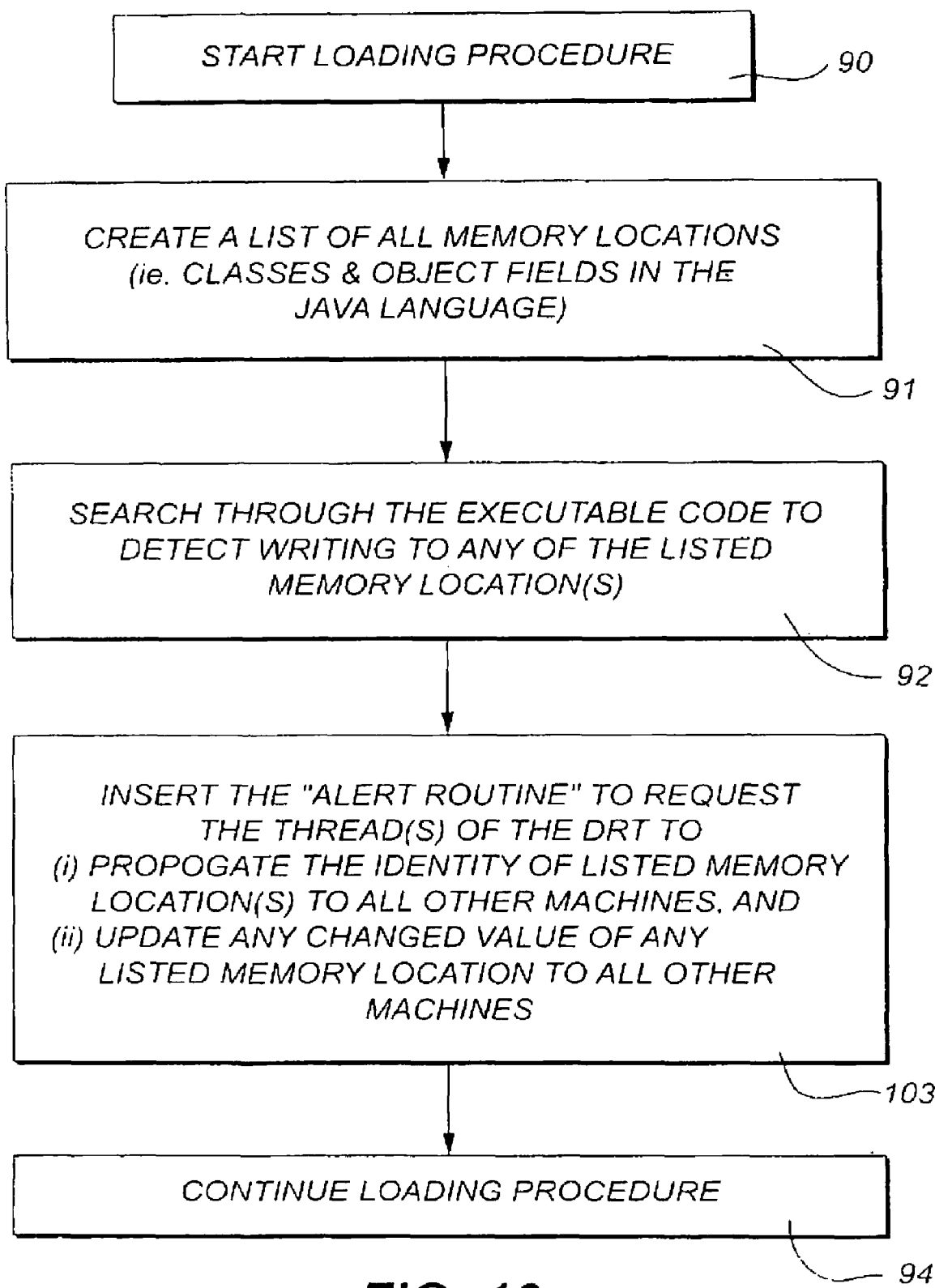
FIG. 10 is a flow chart showing a modified procedure similar to that of FIG. 9.

An alternative form of modification during loading is illustrated in the illustration of FIG. 10. Here the start and listing steps 90 and 91 and the searching step 92 are the same as in FIG. 9. However, rather than insert the "updating propagation routine" into the application code 50 corresponding to the detected memory manipulation operation identified in step 92, as is indicated in step 93, in which the application code 50, or network communications library code 71 of the DRT executing on the same thread or process or processor as the detected memory manipulation operation, carries out the updating, instead an "alert routine" is inserted corresponding to the detected memory manipulation operation, at step 103. The "alert routine" instructs, notifies or otherwise requests a different and potentially simultaneously or concurrently executing thread or process or processor not used to perform the memory manipulation operation (that is, a different thread or process or processor than the thread or process or processor which manipulated the memory location), such as a different thread or process allocated to the DRT 71, to carry out the notification, propagation, or communication of all other machines of the identity of the manipulated memory location, and the updated, manipulated or changed value(s) or content(s) of the manipulated memory location.

Figure 11:
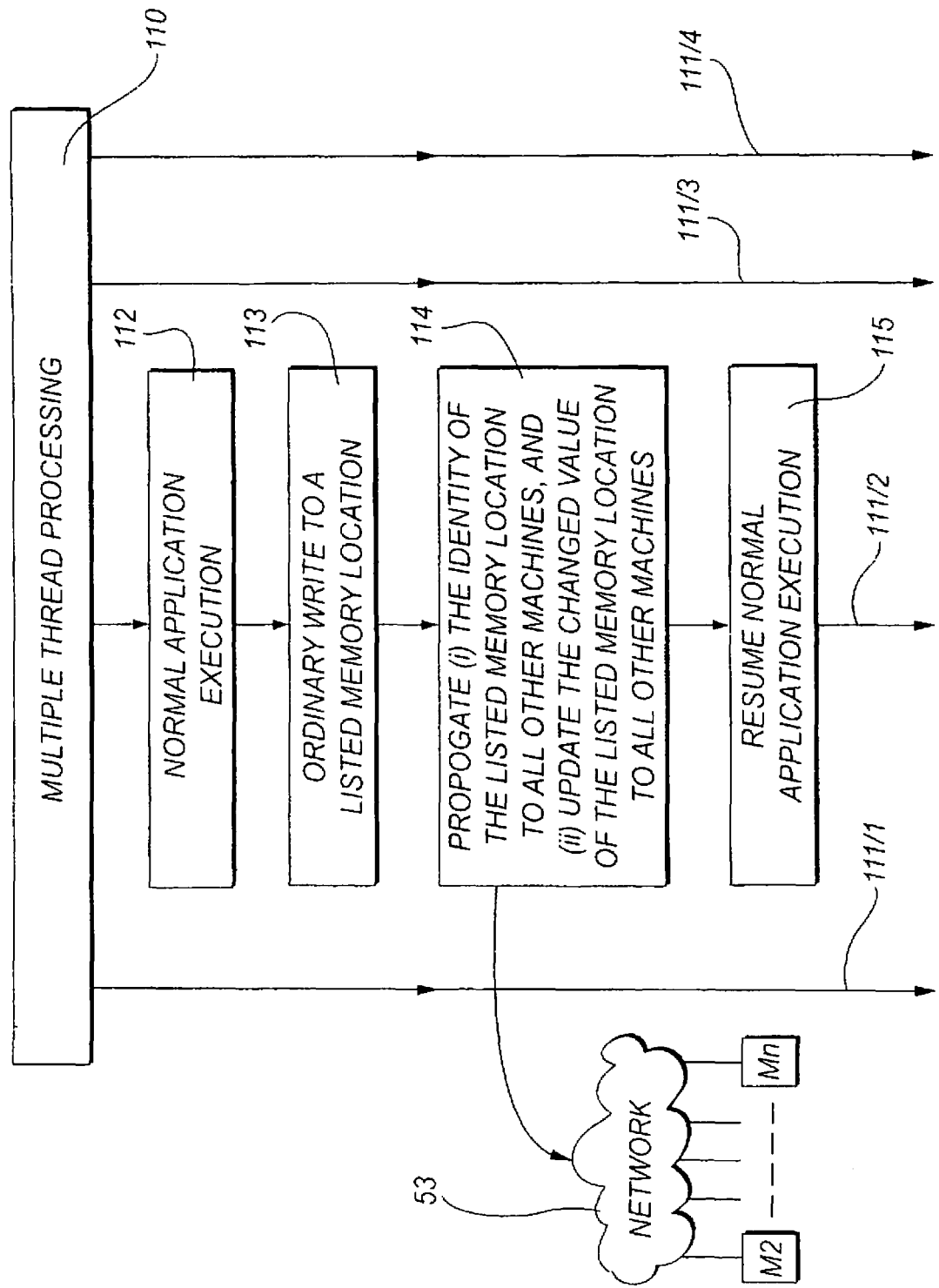
FIG. 11 is a schematic representation of multiple thread processing carried out on the machines of FIG. 8 utilizing a first embodiment of memory updating.
Figure 12:
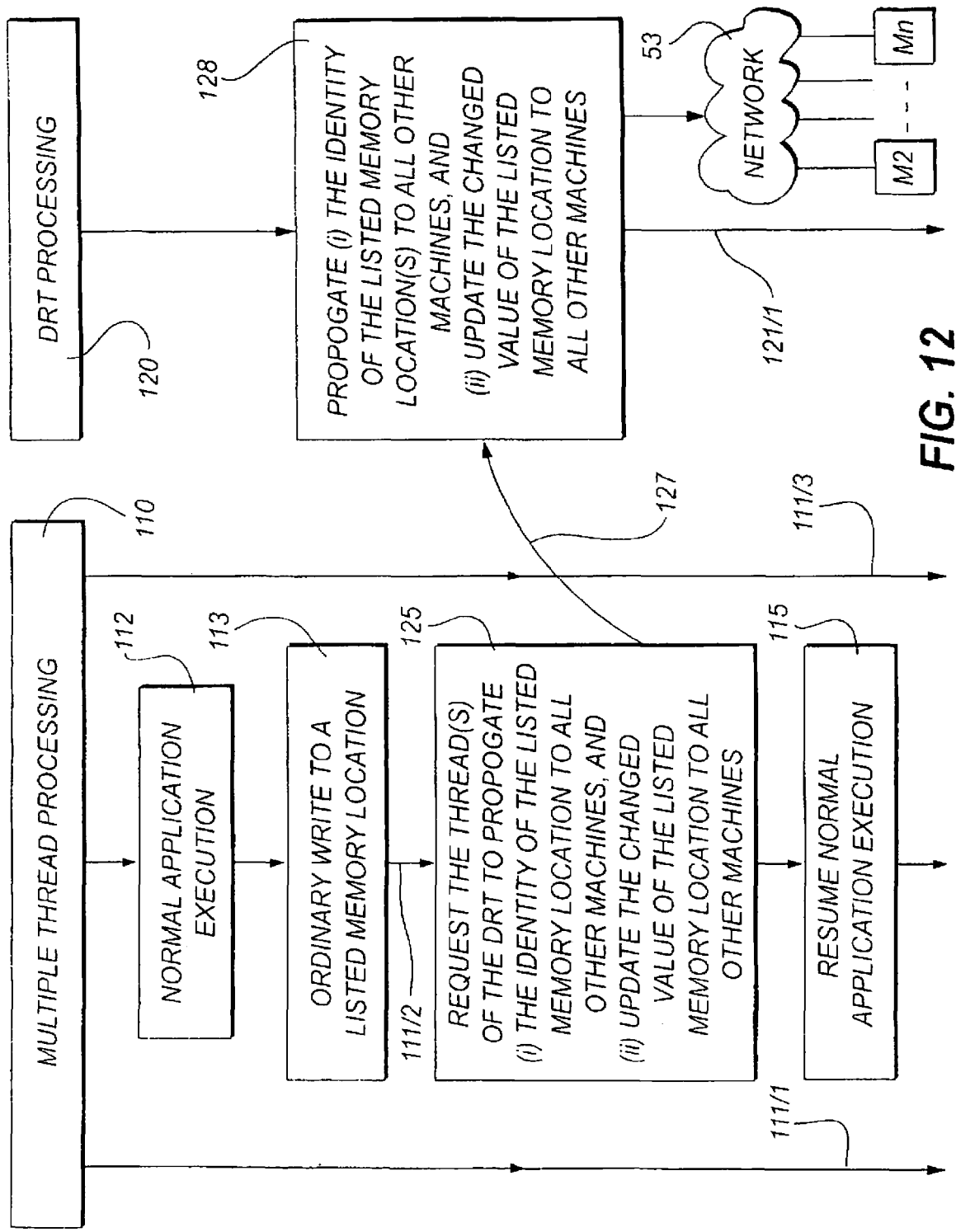
FIG. 12 is a schematic representation similar to FIG. 11 but illustrating an alternative embodiment.

Once this modification during the loading procedure has taken place and execution begins of the modified application code 50, then either the steps of FIG. 11 or FIG. 12 take place. FIG. 11 (and the steps 112, 113, 114, and 115 therein) correspond to the execution and operation of the modified application code 50 when modified in accordance with the procedures set forth in and described relative to FIG. 9. FIG. 12 on the other hand (and the steps 112, 113, 125, 127, and 115 therein) set forth therein correspond to the execution and operation of the modified application code 50 when modified in accordance with FIG. 10.

This analysis or scrutiny of the application code 50 can may take place either prior to loading the application program code 50, or during the application program code 50 loading procedure, or even after the application program code 50 loading procedure. It may be likened to an instrumentation, program transformation, translation, or compilation procedure in that the application code may be instrumented with additional instructions, and/or otherwise modified by meaning-preserving program manipulations, and/or optionally translated from an input code language to a different code language (such as for example from source-code language or intermediate-code language to object-code language or machine-code language), and with the understanding that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary-code languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.ClassLoader loadClass method (e.g., "java.lang.ClassLoader.loadClass( )").

Alternatively, the analysis or scrutiny of the application code 50 may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

As seen in FIG. 11, a multiple thread processing machine environment 110, on each one of the machines M1, . . . , Mn and consisting of threads 111/1 . . . 111/4 exists. The processing and execution of the second thread 111/2 (in this example) results in that thread 111/2 manipulating a memory location at step 113, by writing to a listed memory location. In accordance with the modifications made to the application code 50 in the steps 90-94 of FIG. 9, the application code 50 is modified at a point corresponding to the write to the memory location of step 113, so that it propagates, notifies, or communicates the identity and changed value of the manipulated memory location of step 113 to the other machines M2, . . . , Mn via network 53 or other communication link or path, as indicated at step 114. At this stage the processing of the application code 50 of that thread 111/2 is or may be altered and in some instances interrupted at step 114 by the executing of the inserted "updating propagation routine", and the same thread 111/2 notifies, or propagates, or communicates to all other machines M2, . . . , Mn via the network 53 or other communications link or path of the identity and changed value of the manipulated memory location of step 113. At the end of that notification, or propagation, or communication procedure 114, the thread 111/2 then resumes or continues the processing or the execution of the modified application code 50 at step 115.

In the alternative arrangement illustrated in FIG. 12, a multiple thread processing machine environment 110 comprising or consisting of threads 111/1, . . . , 111/3, and a simultaneously or concurrently executing DRT processing environment 120 consisting of the thread 121/1 as illustrated, or optionally a plurality of threads, is executing on each one of the machines M1, . . . Mn. The processing and execution of the modified application code 50 on thread 111/2 results in a memory manipulation operation of step 113, which in this instance is a write to a listed memory location. In accordance with the modifications made to the application code 50 in the steps 90, 91, 92, 103, and 94 of FIG. 9, the application code 50 is modified at a point corresponding to the write to the memory location of step 113, so that it requests or otherwise notifies the threads of the DRT processing environment 120 to notify, or propagate, or communicate to the other machines M2, . . . , Mn of the identity and changed value of the manipulated memory location of step 113, as indicated at steps 125 and 128 and arrow 127. In accordance with this modification, the thread 111/2 processing and executing the modified application code 50 requests a different and potentially simultaneously or concurrently executing thread or process (such as thread 12111) of the DRT processing environment 120 to notify the machines M2, . . . , Mn via network 53 or other communications link or path of the identity and changed value of the manipulated memory location of step 113, as indicated in step 125 and arrow 127. In response to this request of step 125 and arrow 127, a different and potentially simultaneously or concurrently executing thread or process 121/1 of the DRT processing environment 120 notifies the machines M2, . . . , Mn via network 53 or other communications link or path of the identity and changed value of the manipulated memory location of step 113, as requested of it by the modified application code 50 executing on thread 111/2 of step 125 and arrow 127.

Figure 2:
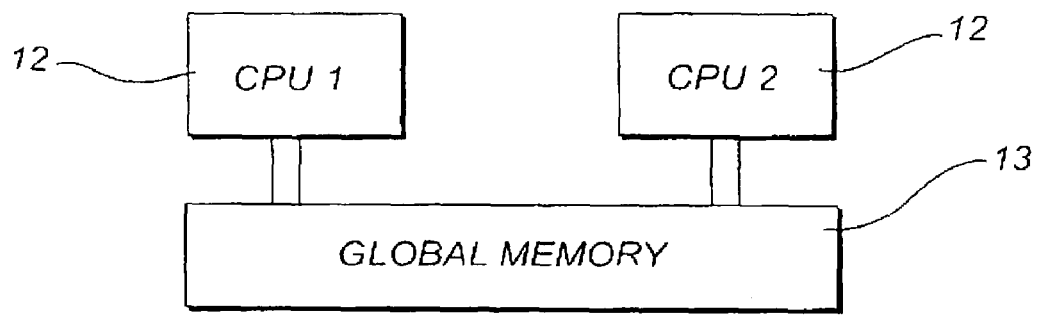
FIG. 2 is a schematic illustration showing the internal architecture of known symmetric multiple processors.

When compared to the earlier described step 114 of thread 111/2 of FIG. 11, step 125 of thread 111/2 of FIG. 12 can be carried out quickly, because step 114 of thread 111/2 must notify and communicate with machines M2, . . . , Mn via the relatively slow network 53 (relatively slow for example when compared to the internal memory bus 4 of FIG. 1 or the global memory 13 of FIG. 2) of the identity and changed value of the manipulated memory location of step 113, whereas step 125 of thread 111/2 does not communicate with machines M2, . . . , Mn via the relatively slow network 53. Instead, step 125 of thread 111/2 requests or otherwise notifies a different and potentially simultaneously or concurrently executing thread 121/1 of the DRT processing environment 120 to perform the notification and communication with machines M2, . . . , Mn via the relatively slow network 53 of the identify and changed value of the manipulated memory location of step 113, as indicated by arrow 127. Thus thread 111/2 carrying out step 125 is only interrupted momentarily before the thread 111/2 resumes or continues processing or execution of modified application code in step 115. The other thread 121/1 of the DRT processing environment 120 then communicates the identity and changed value of the manipulated memory location of step 113 to machines M2, . . . , Mn via the relatively slow network 53 or other relatively slow communications link or path.

This second arrangement of FIG. 12 makes better utilisation of the processing power of the various threads 111/1 . . . 111/3 and 121/1 (which are not, in general, subject to equal demands). Irrespective of which arrangement is used, the identity and change value of the manipulated memory location(s) of step 113 is (are) propagated to all the other machines M2 . . . Mn on the network 53 or other communications link or path.

Figure 13:
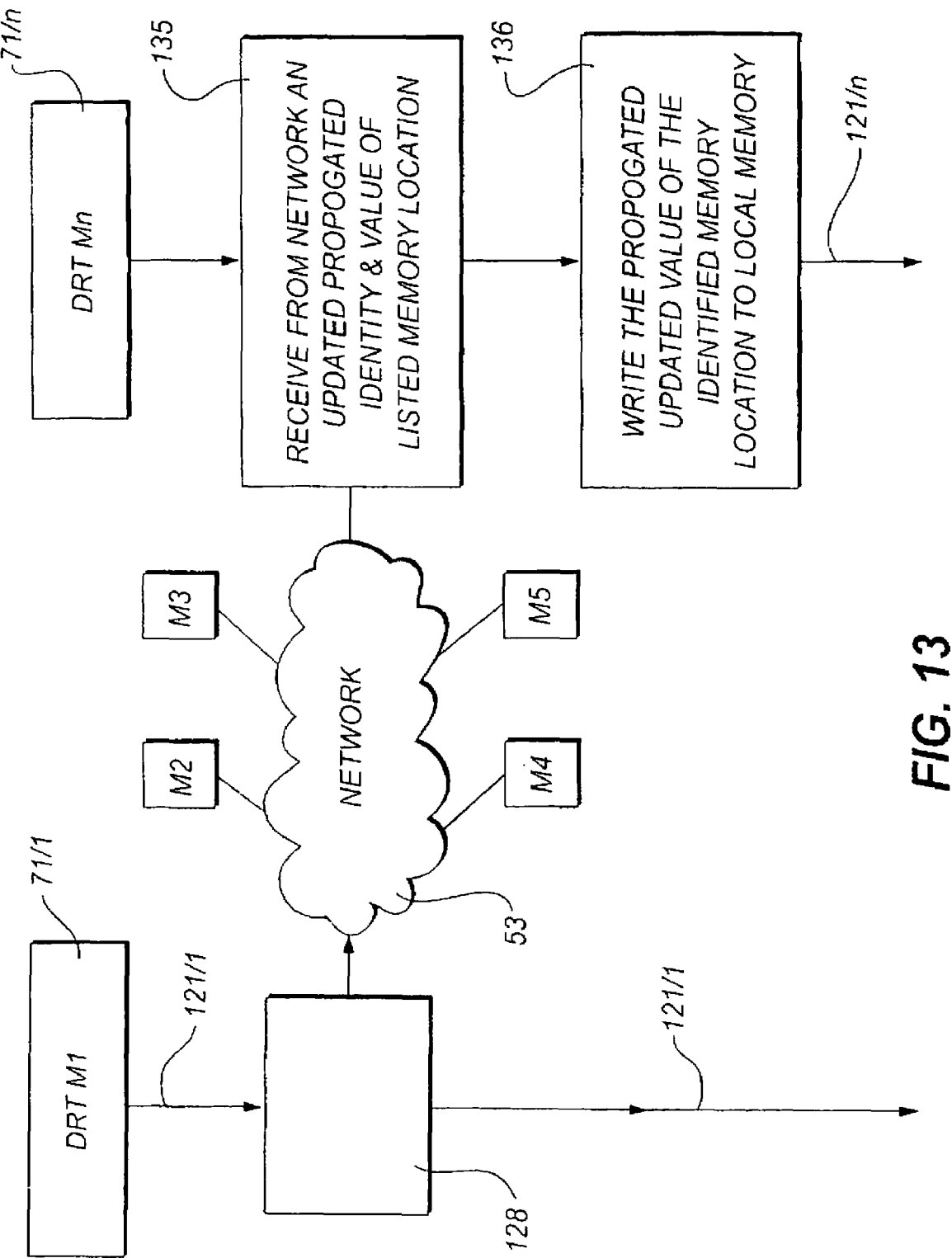
FIG. 13 illustrates multi-thread memory updating for the computers of FIG. 8.

This is illustrated in FIG. 13 where step 114 of FIG. 11, or the DRT 71/1 (corresponding to the DRT processing environment 120 of FIG. 12) and its thread 121/1 of FIG. 12 (represented by step 128 in FIG. 13), send, via the network 53 or other communications link or path, the identity and changed value of the manipulated memory location of step 113 of FIGS. 11 and 12, to each of the other machines M2, . . . , Mn.

With reference to FIG. 13, each of the other machines M2, . . . , Mn carries out the action of receiving from the network 53 the identity and changed value of, for example, the manipulated memory location of step 113 from machine M1, indicated by step 135, and writes the value received at step 135 to the local memory location corresponding to the identified memory location received at step 135, indicated by step 136.

Figure 3:
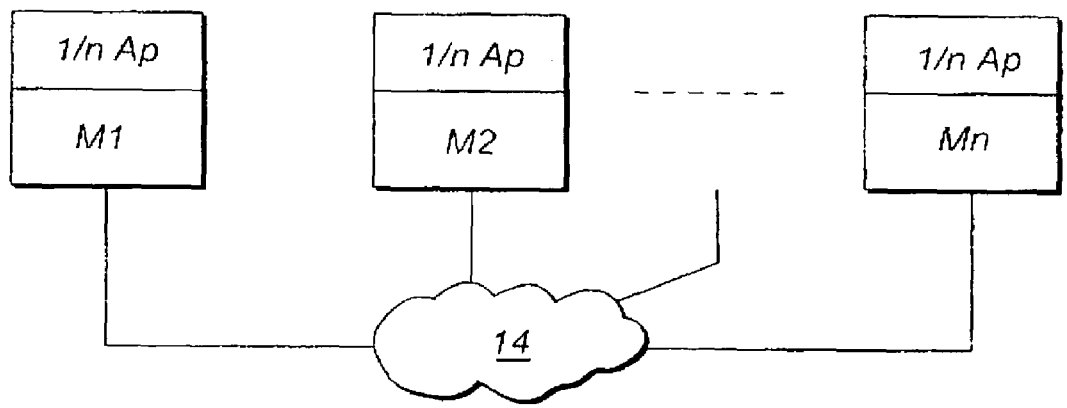
FIG. 3 is a schematic representation of prior art distributed computing.
Figure 4:
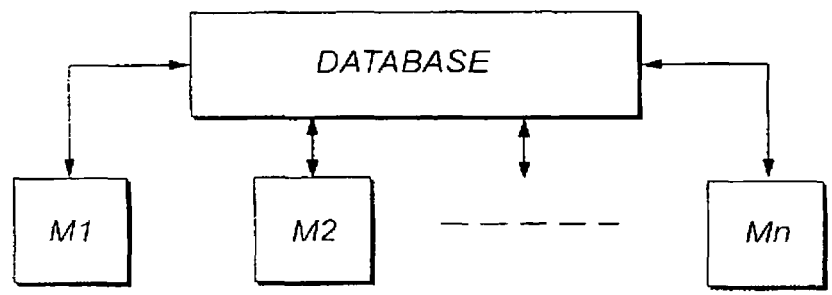
FIG. 4 is a schematic representation of a prior art network computing using clusters.

In the conventional arrangement in FIG. 3 utilising distributed software, memory access from one machine's software to memory physically located on another machine is permitted by the network interconnecting the machines. However, because the read and/or write memory access to memory physically located on another computer require the use of the slow network 14, in these configurations such memory accesses can result in substantial delays in memory read/write processing operation, potentially of the order of $10^6$-$10^7$ cycles of the central processing unit of the machine, but ultimately being dependant upon numerous factors, such as for example, the speed, bandwidth, and/or latency of the network 14. This in large part accounts for the diminished performance of the multiple interconnected machines in the prior art arrangement of FIG. 3.

However, in the present arrangement as described above in connection with FIG. 8, it will be appreciated that all reading of memory locations or data is satisfied locally because a current value of all (or some subset of all) memory locations is stored on the machine carrying out the processing which generates the demand to read memory.

Similarly, in the present arrangement as described above in connection with FIG. 8, it will be appreciated that all writing of memory locations or data may be satisfied locally because a current value of all (or some subset of all) memory locations is stored on the machine carrying out the processing which generates the demand to write to memory.

Such local memory read and write processing operation as performed according to the invention can typically be satisfied within $10^2$-$10^3$ cycles of the central processing unit. Thus, in practice, there is substantially less waiting for memory accesses which involves reads than the arrangement shown and described relative to FIG. 3. Additionally, in practice, there may be less waiting for memory accesses which involve writes than the arrangement shown and described relative to FIG. 3

It may be appreciated that most application software reads memory frequently but writes to memory relatively infrequently. As a consequence, the rate at which memory is being written or re-written is relatively slow compared to the rate at which memory is being read. Because of this slow demand for writing or re-writing of memory, the memory locations or fields can be continually updated at a relatively low speed via the possibly relatively slow and inexpensive commodity network 53, yet this possibly relatively slow speed is sufficient to meet the application program's demand for writing to memory. The result is that the performance of the FIG. 8 arrangement is superior to that of FIG. 3. It may be appreciated in light of the description provided herein that while a relatively slow network communication link or path 53 may advantageously be used because it provides the desired performance and low cost, the invention is not limited to a relatively low speed network connection and may be used with any communication link or path. The invention is transport, network, and communications path independent, and does not depend on how the communication between machines or DRTs takes place. In one embodiment, even electronic mail (email) exchanges between machines or DRTs may suffice for the communications.

In a further optional modification in relation to the above, the identity and changed value pair of a manipulated memory location sent over network 53, each pair typically sent as the sole contents of a single packet, frame or cell for example, can be grouped into batches of multiple pairs of identities and changed values corresponding to multiple manipulated memory locations, and sent together over network 53 or other communications link or path in a single packet, frame, or cell. This further modification further reduces the demands on the communication speed of the network 53 or other communications link or path interconnecting the various machines, as each packet, cell or frame may contain multiple identity and changed value pairs, and therefore fewer packets, frames, or cells require to be sent.

It may be apparent that in an environment where the application program code writes repeatedly to a single memory location, the embodiment illustrated of FIG. 11 of step 114 sends an updating and propagation message to all machines corresponding to every performed memory manipulation operation. In a still further optimal modification in relation to the above, the DRT thread 121/1 of FIG. 12 does not need to perform an updating and propagation operation corresponding to every local memory manipulation operation, but instead may send fewer updating and propagation messages than memory manipulation operations, each message containing the last or latest changed value or content of the manipulated memory location, or optionally may only send a single updating and propagation message corresponding to the last memory manipulation operation. This further improvement reduces the demands on the network 53 or other communications link or path, as fewer packets, frames, or cells require to be sent.

It will also be apparent to those skilled in the art in light of the detailed description provided herein that in a table or list or other data structure created by each DRT 71 when initially recording or creating the list of all, or some subset of all, memory locations (or fields), for each such recorded memory location on each machine M1, . . . , Mn there is a name or identity which is common or similar on each of the machines M1, . . . , Mn. However, in the individual machines the local memory location corresponding to a given name or identity (listed for example, during step 91 of FIG. 9) will or may vary over time since each machine may and generally will store changed memory values or contents at different memory locations according to its own internal processes. Thus the table, or list, or other data structure in each of the DRTs will have, in general, different local memory locations corresponding to a single memory name or identity, but each global "memory name" or identity will have the same "memory value" stored in the different local memory locations.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading, (ii) by a pre-compilation procedure prior to loading, (iii) compilation prior to loading, (iv) a "just-in-time" compilation, or (v) re-compilation after loading (but, or for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language Given the fundamental concept of modifying memory manipulation operations to coordinate operation between and amongst a plurality of machines M1 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3, . . . , Mn (either sequentially or simultaneously or according to any other order, routine or procedure) with the modified object (or class or other asset or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is binary executable object code. Alternatively, the memory manipulation operation(s) that is (are) loaded is executable intermediary code.

Figure 15:
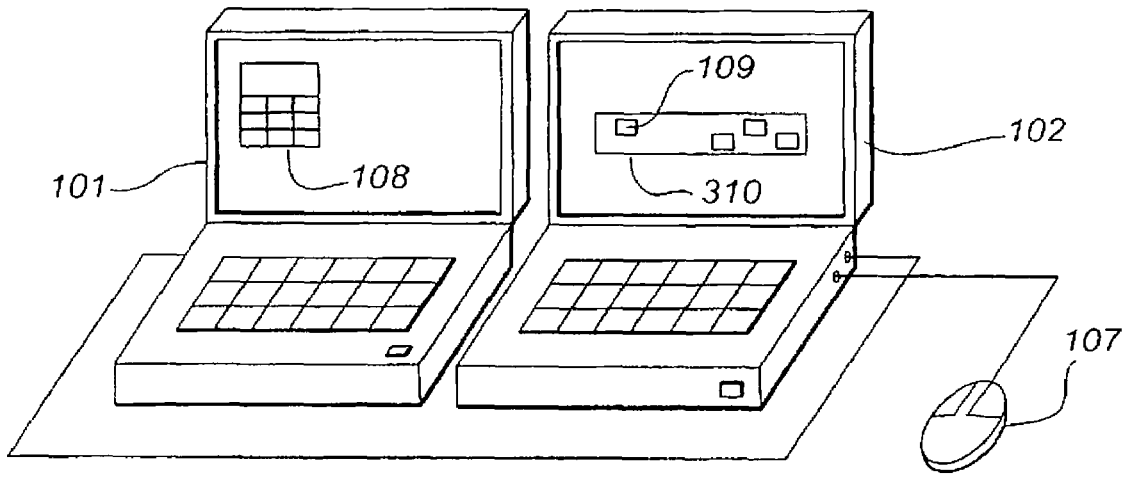
FIG. 15 is a view similar to FIG. 14 but showing the FIG. 14 apparatus with one application operating on each computer.

In this arrangement, which may be termed "master/slave" each of the slave (or secondary) machines M1, M3, . . . , Mn loads the modified object (or class), and inclusive of the new modified memory manipulation operation(s), that was sent to it over the computer communications network or other communications link or path by the master (or primary) machine, such as machine M2, or some other machine such as a machine X of FIG. 15. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a still further embodiment, each machine M1, . . . , Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different and to be enhanced, customized, and/or optimized based upon its particular machine architecture, hardware, processor, memory, configuration, operating system, or other factors, yet still similar, coherent and consistent with other machines with all other similar modifications and characteristics that may not need to be similar or identical.

In all of the described instances or embodiments, the supply or the communication of the asset code (such as class code or object code) to the machines M1, . . . , Mn, and optionally inclusive of a machine X of FIG. 15, can be branched, distributed or communicated among and between the different machines in any combination or permutation; such as by providing direct machine to machine communication (for example, M2 supplies each of M1, M3, M4, etc. directly), or by providing or using cascaded or sequential communication (for example, M2 supplies M1 which then supplies M3 which then supplies M4, and so on), or a combination of the direct and cascaded and/or sequential.

Reference is made to the accompanying Annexure A in which: Annexure A5 is a typical code fragment from a memory manipulation operation prior to modification (e.g., an exemplary unmodified routine with a memory manipulation operation), and Annexure A6 is the same routine with a memory manipulation operation after modification (e.g., an exemplary modified routine with a memory manipulation operation). These code fragments are exemplary only and identify one software code means for performing the modification in an exemplary language. It will be appreciated that other software/firmware or computer program code may be used to accomplish the same or analogous function or operation without departing from the invention.

Annexures A5 and A6 (also reproduced in part in Table VI and Table VII below) are exemplary code listings that set forth the conventional or unmodified computer program software code (such as may be used in a single machine or computer environment) of a routine with a memory manipulation operation of application program code 50 and a post-modification excerpt of the same routine such as may be used in embodiments of the present invention having multiple machines. The modified code that is added to the routine is highlighted in bold text.

TABLE I

Summary Listing of Contents of Annexure A
Annexure A includes exemplary program listings in the JAVA language to further
illustrate features, aspects, methods, and procedures of described in the detailed
description A1. This first excerpt is part of an illustration of the modification code of the modifier 51 in accordance with steps 92 and 103 of FIG. 10. It searches through the code array of the application program code 50, and when it detects a memory manipulation instruction (i.e. a putstatic instruction (opcode 178) in the JAVA language and virtual machine environment) it modifies the application program code by the insertion of an "alert" routine.
A2. This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1.
A3. This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1 . . . Mn.
A4. The fourth excerpt is part of the DRT 71, and corresponds to steps 135 and 136 of FIG. 13. This is a fragment of code to receive a propagated identity and value pair sent by another DRT 71 over the network, and write the changed value to the identified memory location.
A5. The fifth excerpt is an disassembled compiled form of the example.java application of Annexure A7, which performs a memory manipulation operation (putstatic and putfield).
A6. The sixth excerpt is the disassembled compiled form of the same example application in Annexure A5 after modification has been performed by FieldLoader.java of Annexure A11, in accordance with FIG. 9 of this invention. The modifications are highlighted in bold.
A7. The seventh excerpt is the source-code of the example.java application used in excerpt A5 and A6. This example application has two memory locations (staticValue and instanceValue) and performs two memory manipulation operations.
A8. The eighth excerpt is the source-code of FieldAlert.java which corresponds to step 125 and arrow 127 of FIG. 12, and which requests a thread 121/1 executing FieldSend.java of the "distributed run-time" 71 to propagate a changed value and identity pair to the other machines M1 . . . Mn.
A9. The ninth excerpt is the source-code of FieldSend.java which corresponds to step 128 of FIG. 12, and waits for a request/notification generated by FieldAlert.java of A8 corresponding to step 125 and arrow 127, and which propagates a changed value/identity pair requested of it by FieldAlert.java, via network 53.
A10. The tenth excerpt is the source-code of FieldReceive.java, which corresponds to steps 135 and 136 of FIG. 13, and which receives a propagated changed value and identity pair sent to it over the network 53 via FieldSend.java of annexure A9.
A11. FieldLoader.java. This excerpt is the source-code of FieldLoader.java, which modifies an application program code, such as the example.java application code of Annexure A7, as it is being loaded into a JAVA virtual machine in accordance with steps 90, 91, 92, 103, and 94 of FIG. 10. FieldLoader.java makes use of the convenience classes of Annexures A12 through to A36 during the modification of a compiled JAVA
A12. Attribute_info.java
Convience class for representing attribute_info structures within ClassFiles.
A13. ClassFile.java
Convience class for representing ClassFile structures.
A14. Code_attribute.java
Convience class for representing Code_attribute structures within ClassFiles.
A15. CONSTANT_Class_info.java
Convience class for representing CONSTANT_Class_info structures within ClassFiles.
A16. CONSTANT_Double_info.java
Convience class for representing CONSTANT_Double_info structures within ClassFiles.

TABLE I-continued

Summary Listing of Contents of Annexure A
Annexure A includes exemplary program listings in the JAVA language to further
illustrate features, aspects, methods, and procedures of described in the detailed
description A17. CONSTANT_Fieldref_info.java
Convience class for representing CONSTANT_Fieldref_info structures within ClassFiles.
A18. CONSTANT_Float_info.java
Convience class for representing CONSTANT_Float_info structures within ClassFiles.
A19. CONSTANT_Integer_info.java
Convience class for representing CONSTANT_Integer_info structures within ClassFiles.
A20. CONSTANT_InterfaceMethodref_info.java
Convience class for representing CONSTANT_InterfaceMethodref_info structures within
ClassFiles.
A21. CONSTANT_Long_info.java
Convience class for representing CONSTANT_Long_info structures within ClassFiles.
A22. CONSTANT_Methodref_info.java
Convience class for representing CONSTANT_Methodref_info structures within ClassFiles.
A23. CONSTANT_NameAndType_info.java
Convience class for representing CONSTANT_NameAndType_info structures within
ClassFiles.
A24. CONSTANT_String_info.java
Convience class for representing CONSTANT_String_info structures within ClassFiles.
A25. CONSTANT_Utf8_info.java
Convience class for representing CONSTANT_Utf8_info structures within ClassFiles.
A26. ConstantValue_attribute.java
Convience class for representing ConstantValue_attribute structures within ClassFiles.
A27. cp_info.java
Convience class for representing cp_info structures within ClassFiles.
A28. Deprecated_attribute.java
Convience class for representing Deprecated_attribute structures within ClassFiles.
A29. Exceptions_attribute.java
Convience class for representing Exceptions_attribute structures within ClassFiles.
A30. field_info.java
Convience class for representing field_info structures within ClassFiles.
A31. InnerClasses_attribute.java
Convience class for representing InnerClasses_attribute structures within ClassFiles.
A32. LineNumberTable_attribute.java
Convience class for representing LineNumberTable_attribute structures within ClassFiles.
A33. LocalVariableTable_attribute.java
Convience class for representing LocalVariableTable_attribute structures within ClassFiles.
A34. method_info.java
Convience class for representing method_info structures within ClassFiles.
A35. SourceFile_attribute.java
Convience class for representing SourceFile_attribute structures within ClassFiles.
A36. Synthetic_attribute.java
Convience class for representing Synthetic_attribute structures within ClassFiles.

TABLE II

Exemplary code listing showing embodiment of modified code.
A1. This first excerpt is part of an illustration of the modification code
of the modifier 51 in accordance with steps 92 and 103 of FIG. 10. It
searches through the code array of the application program code 50,
and when it detects a memory manipulation instruction (i.e. a putstatic
instruction (opcode 178) in the JAVA language and virtual machine
environment) it modifies the application program code by the
insertion of an "alert" routine.

```
// START
byte[ ] code = Code_attribute.code;     // Bytecode of a given method in a
                                        // given classfile.
int code_length = Code_attribute.code_length;
int DRT = 99;    // Location of the CONSTANT_Methodref_info for the
                 // DRT.alert( ) method.
for (int i=0; i<code_length; i++){
    if ((code[i] & 0xff) == 179){      // Putstatic instruction.
        System.arraycopy(code, i+3, code, i+6, code_length−(i+3));
        code[i+3] = (byte) 184;        // Invokestatic instruction for the
                                       // DRT.alert( ) method.
        code[i+4] = (byte) ((DRT >>> 8) & 0xff);
        code[i+5] = (byte) (DRT & 0xff);
```

TABLE II-continued

Exemplary code listing showing embodiment of modified code.
A1. This first excerpt is part of an illustration of the modification code
of the modifier 51 in accordance with steps 92 and 103 of FIG. 10. It
searches through the code array of the application program code 50,
and when it detects a memory manipulation instruction (i.e. a putstatic
instruction (opcode 178) in the JAVA language and virtual machine
environment) it modifies the application program code by the
insertion of an "alert" routine.

```
    }
}
// END
```

TABLE III

Exemplary code listing showing embodiment of code for alert method
A2. This second excerpt is part of the DRT.alert( ) method and
implements the step of 125 and arrow of 127 of FIG. 12. This
DRT.alert( ) method requests one or more threads of the DRT
processing environment of FIG. 12 to update and propagate the
value and identity of the changed memory location corresponding
to the operation of Annexure A1.

```
// START
public static void alert( ){
```

TABLE III-continued

Exemplary code listing showing embodiment of code for alert method A2. This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1.

```
    synchronized (ALERT_LOCK){
        ALERT_LOCK.notify( ); // Alerts a waiting DRT
        thread in the background.
    }
}
// END
```

TABLE IV

Exemplary code listing showing embodiment of code for DRT A3. This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1 . . . Mn.

```
// START
MulticastSocket ms = DRT.getMulticastSocket( );   // The multicast socket
                                                  // used by the DRT for
                                                  // communication.
byte nameTag = 33;           // This is the "name tag" on the network
                             // for this field.
Field field = modifiedClass.getDeclaredField("myField1");  // Stores
                                                           // the field
                                                           // from the
                                                           // modified
                                                           // class.
// In this example, the field is a byte field.
while (DRT.isRunning( )){
    synchronized (ALERT_LOCK){
        ALERT_LOCK.wait( );   // The DRT thread is waiting for the alert
                              // method to be called.
        byte[ ] b = new byte[ ]{nameTag, field.getByte(null)};  // Stores
                                                                // the
                                                                // nameTag
                                                                // and the
                                                                // value
                                                                // of the
                                                                // field from
                                                                // the
                                                                // modified
                                                                // class in a
                                                                // buffer.
        DatagramPacket dp = new DatagramPacket(b, 0, b.length);
        ms.send(dp);    // Send the buffer out across the network.
    }
}
// END
```

TABLE V

Exemplary code listing showing embodiment of code for DRT receiving. A4. The fourth excerpt is part of the DRT 71, and corresponds to steps 135 and 136 of FIG. 13. This is a fragment of code to receive a propagated identity and value pair sent by another DRT 71 over the network, and write the changed value to the identified memory location.

```
// START
MulticastSocket ms = DRT.getMulticastSocket( );   // The multicast socket
                                                  // used by the DRT for
                                                  // communication.
DatagramPacket dp = new DatagramPacket(new byte[2], 0, 2);
byte nameTag = 33;          // This is the "name tag" on the network for
                            // this field.
Field field = modifiedClass.getDeclaredField("myField1");    // Stores the
                                                             // field from
                                                             // the
                                                             // modified
                                                             // class.
// In this example, the field is a byte field.
while (DRT.isRunning){
    ms.receive(dp);
    // Receive the previously sent buffer from the network.
    byte[ ] b = dp.getData( );
    if (b[0] == nameTag)(   // Check the nametags match.
        field.setByte(null, b[1]);   // Write the value from the network packet
                                     // into the field location in memory.
    }
}
// END
```

TABLE VI

Exemplary code listing showing embodiment of application before modification is made.
A5. The fifth excerpt is an disassembled compiled form of the example.java application of Annexure A7, which performs a memory manipulation operation (putstatic and putfield).

```
Method void setValues(int, int)
    0 iload_1
    1 putstatic #3 <Field int staticValue>
    4 aload_0
    5 iload_2
    6 putfield #2 <Field int instanceValue>
    9 return
```

TABLE VII

Exemplary code listing showing embodiment of application after modification is made.
A6. The sixth excerpt is the disassembled compiled form of the same example application in Annexure A5 after modification has been performed by FieldLoader.java of Annexure A11, in accordance with FIG. 9 of this invention. The modifications are highlighted in bold.

```
Method void setValues(int, int)
    0 iload_1
    1 putstatic #3 <Field int staticValue>
    4 ldc #4 <String "example">
    6 iconst_0
    7 invokestatic #5 <Method void alert(java.lang.Object, int)>
    10 aload_0
    11 iload_2
    12 putfield #2 <Field int instanceValue>
    15 aload_0
    16 iconst_1
    17 invokestatic #5 <Method void alert(java.lang.Object, int)>
    20 return
```

TABLE VIII

Exemplary code listing showing embodiment of source-code of the example application.
A7. The seventh excerpt is the source-code of the example.java application used in excerpt A5 and A6. This example application has two memory locations (staticValue and instanceValue) and performs two memory manipulation operations.

```
import java.lang.*;
public class example{
```

TABLE VIII-continued

Exemplary code listing showing embodiment of source-code of the example application.

A7. The seventh excerpt is the source-code of the example.java application used in excerpt A5 and A6. This example application has two memory locations (staticValue and instanceValue) and performs two memory manipulation operations.

```
/** Shared static field. */
public static int staticValue = 0;
/** Shared instance field. */
public int instanceValue = 0;
/** Example method that writes to memory (instance field). */
public void setValues(int a, int b){
    staticValue = a;
    instanceValue = b;
}
}
```

TABLE IX

Exemplary code listing showing embodiment of the source-code of FieldAlert.

A8. The eighth excerpt is the source-code of FieldAlert.java which corresponds to step 125 and arrow 127 of FIG. 12, and which requests a thread 121/1 executing FieldSend.java of the "distributed run-time" 71 to propagate a changed value and identity pair to the other machines M1 . . . Mn.

```
import java.lang.*;
import java.util.*;
import java.net.*;
import java.io.*;
public class FieldAlert{
    /** Table of alerts. */
    public final static Hashtable alerts = new Hashtable( );
    /** Object handle. */
    public Object reference = null;
    /** Table of field alerts for this object. */
    public boolean[ ] fieldAlerts = null;
    /** Constructor. */
    public FieldAlert(Object o, int initialFieldCount){
        reference = o;
        fieldAlerts = new boolean[initialFieldCount];
    }
    /** Called when an application modifies a value. (Both objects and
        classes) */
    public static void alert(Object o, int fieldID){
        // Lock the alerts table.
        synchronized (alerts){
            FieldAlert alert = (FieldAlert) alerts.get(o);
            if (alert == null){    // This object hasn't been alerted already,
                                    // so add to alerts table.
                alert = new FieldAlert(o, fieldID + 1);
                alerts.put(o, alert);
            }
            if (fieldID >= alert.fieldAlerts.length){
                // Ok, enlarge fieldAlerts array.
                boolean[ ] b = new boolean[fieldID+1];
                System.arraycopy(alert.fieldAlerts, 0, b, 0,
                    alert.fieldAlerts.length);
                alert.fieldAlerts = b;
            }
            // Record the alert.
            alert.fieldAlerts[fieldID] = true;
            // Mark as pending.
            FieldSend.pending = true;    // Signal that there is one or more
                                          // propagations waiting.
            // Finally, notify the waiting FieldSend thread(s)
            if (FieldSend.waiting){
                FieldSend.waiting = false;
                alerts.notify( );
            }
        }
    }
}
```

It is noted that the compiled code in the annexure and portion repeated in the table is taken from the source-code of the file "example.java" which is included in the Annexure A7 (Table VIII). In the procedure of Annexure A5 and Table VI, the procedure name "Method void setValues(int, int)" of Step 001 is the name of the displayed disassembled output of the setValues method of the compiled application code of "example.java". The name "Method void setValues(int, int)" is arbitrary and selected for this example to indicate a typical JAVA method inclusive of a memory manipulation operation. Overall the method is responsible for writing two values to two different memory locations through the use of an memory manipulation assignment statement (being "putstatic" and "putfield" in this example) and the steps to accomplish this are described in turn.

First (Step 002), the Java Virtual Machine instruction "iload_1" causes the Java Virtual Machine to load the integer value in the local variable array at index 1 of the current method frame and store this item on the top of the stack of the current method frame and results in the integer value passed to this method as the first argument and stored in the local variable array at index 1 being pushed onto the stack.

The Java Virtual Machine instruction "putstatic #3 <Field int staticValue>" (Step 003) causes the Java Virtual Machine to pop the topmost value off the stack of the current method frame and store the value in the static field indicated by the CONSTANT_Fieldref_info constant-pool item stored in the $3^{rd}$ index of the classfile structure of the application program containing this example setValues( ) method and results in the topmost integer value of the stack of the current method frame being stored in the integer field named "staticValue".

The Java Virtual Machine instruction "aload_0" (Step 004) causes the Java Virtual Machine to load the item in the local variable array at index 0 of the current method frame and store this item on the top of the stack of the current method frame and results in the 'this' object reference stored in the local variable array at index 0 being pushed onto the stack.

First (Step 005), the Java Virtual Machine instruction "iload_2" causes the Java Virtual Machine to load the integer value in the local variable array at index 2 of the current method frame and store this item on the top of the stack of the current method frame and results in the integer value passed to this method as the first argument and stored in the local variable array at index 2 being pushed onto the stack.

The Java Virtual Machine instruction "putfield #2 <Field int instanceValue>" (Step 006) causes the Java Virtual Machine to pop the two topmost values off the stack of the current method frame and store the topmost value in the object instance field of the second popped value, indicated by the CONSTANT_Fieldref_info constant-pool item stored in the $2^{nd}$ index of the classfile structure of the application program containing this example setValues method and results in the integer value on the top of the stack of the current method frame being stored in the instance field named "instanceValue" of the object reference below the integer value on the stack.

Finally, the JAVA virtual machine instruction "return" (Step 007) causes the JAVA virtual machine to cease executing this setValues( ) method by returning control to the previous method frame and results in termination of execution of this setValues( ) method.

As a result of these steps operating on a single machine of the conventional configurations in FIG. 1 and FIG. 2, the JAVA virtual machine manipulates (i.e. writes to) the staticValue and instanceValue memory locations, and in executing the setValues( ) method containing the memory manipulation operation(s) is able to ensure that memory is and remains consistent between multiple threads of a single application instance, and therefore ensure that unwanted behaviour, such as for example inconsistent or incoherent memory between multiple threads of a single application instance (such inconsistent or incoherent memory being for example incorrect or different values or contents with respect to a single memory location) does not occur. Were these steps to be carried out on the plurality of machines of the configurations of FIG. 5 and FIG. 8 by concurrently executing the application program code 50 on each one of the plurality of machines M1 . . . Mn, the memory manipulation operations of each concurrently executing application program occurrence on each one of the machines would be performed without coordination between any other machine(s), such coordination being for example updating of corresponding memory locations on each machine such that they each report a same content or value. Given the goal of consistent, coordinated and coherent memory state and manipulation and updating operation across a plurality of a machines, this prior art arrangement would fail to perform such consistent, coherent, and coordinated memory state and manipulation and updating operation across the plurality of machines, as each machine performs memory manipulation only locally and without any attempt to coordinate or update their local memory state and manipulation operation with any other similar memory state on any one or more other machines. Such an arrangement would therefore be susceptible to inconsistent and incoherent memory state amongst machines M1 . . . Mn due to uncoordinated, inconsistent and/or incoherent memory manipulation and updating operation. Therefore it is the goal of the present invention to overcome this limitation of the prior art arrangement.

In the exemplary code in Table VII (Annexure A6), the code has been modified so that it solves the problem of consistent, coordinated memory manipulation and updating operation for a plurality of machines M1 . . . Mn, that was not solved in the code example from Table VI (Annexure A5). In this modified setValues( ) method code, an "Idc #4 <String "example">" instruction is inserted after the "putstatic #3" instruction in order to be the first instruction following the execution of the "putstatic #3" instruction. This causes the JAVA virtual machine to load the String value "example" onto the stack of the current method frame and results in the String value of "example" loaded onto the top of the stack of the current method frame. This change is significant because it modifies the setValues( ) method to load a String identifier corresponding to the classname of the class containing the static field location written to by the "putstatic #3" instruction onto the stack.

Furthermore, the JAVA virtual machine instruction "iconst_0" is inserted after the "Idc #4" instruction so that the JAVA virtual machine loads an integer value of "0" onto the stack of the current method frame and results in the integer value of "0" loaded onto the top of the stack of the current method frame. This change is significant because it modifies the setValues( ) method to load an integer value, which in this example is "0", which represents the identity of the memory location (field) manipulated by the preceding "putstatic #3" operation. It is to be noted that the choice or particular form of the memory identifier used for the implementation of this invention is for illustration purposes only. In this example, the integer value of "0" is the identifier used of the manipulated memory location, and corresponds to the "staticValue" field as the first field of the "example.java" application, as shown in Annexure A7. Therefore, corresponding to the "putstatic #3" instruction, the "iconst_0" instruction loads the integer value "0" corresponding to the index of the manipulated field of the "putstatic #3" instruction, and which in this case is the first field of "example.java" hence the "0" integer index value, onto the stack.

Additionally, the JAVA virtual machine instruction "invokestatic #5 <Method boolean alert(java.lang.Object, int)>" is inserted after the "iconst_0" instruction so that the JAVA virtual machine pops the two topmost items off the stack of the current method frame (which in accordance with the preceding "Idc #4" instruction is a reference to the String object with the value "example" corresponding to the name of the class to which manipulated field belongs, and the integer "0" corresponding to the index of the manipulated field in the example.java application) and invokes the "alert" method, passing the two topmost items popped off the stack to the new method frame as its first two arguments. This change is significant because it modifies the setValues( ) method to execute the "alert" method and associated operations, corresponding to the preceding memory manipulation operation (that is, the "putstatic #3" instruction) of the setValues( ) method.

Likewise, in this modified setValues( ) method code, an "aload_0" instruction is inserted after the "putfield #2" instruction in order to be the first instruction following the execution of the "putfield #2" instruction. This causes the JAVA virtual machine to load the instance object of the example class to which the manipulated field of the preceding "putfield #2" instruction belongs, onto the stack of the current method frame and results in the object reference corresponding to the instance field written to by the "putfield #2" instruction, loaded onto the top of the stack of the current method frame. This change is significant because it modifies the setValues( ) method to load a reference to the object corresponding to the manipulated field onto the stack.

Furthermore, the JAVA virtual machine instruction "iconst_1" is inserted after the "aload_0" instruction so that the JAVA virtual machine loads an integer value of "1" onto the stack of the current method frame and results in the integer value of "1" loaded onto the top of the stack of the current method frame. This change is significant because it modifies the setValues( ) method to load an integer value, which in this example is "1", which represents the identity of the memory location (field) manipulated by the preceding "putfield #2" operation. It is to be noted that the choice or particular form of the identifier used for the implementation of this invention is for illustration purposes only. In this example, the integer value of "1" corresponds to the "instanceValue" field as the second field of the "example.java" application, as shown in Annexure A7. Therefore, corresponding to the "putfield #2" instruction, the "iconst_1" instruction loads the integer value "1" corresponding to the index of the manipulated field of the "putfield #2" instruction, and which in this case is the second field of "example.java" hence the "1" integer index value, onto the stack.

Additionally, the JAVA virtual machine instruction "invokestatic #5 <Method boolean alert(java.lang.Object, int)>" is inserted after the "iconst_1" instruction so that the JAVA virtual machine pops the two topmost item off the stack of the current method frame (which in accordance with the preceding "aload_0" instruction is a reference to the object corresponding to the object to which the manipulated instance field belongs, and the integer "1" corresponding to the index of the manipulated field in the example.java application) and invokes the "alert" method, passing the two topmost items popped off the stack to the new method frame as its first two arguments. This change is significant because it modifies the setValues( ) method to execute the "alert" method and associated operations, corresponding to the preceding memory manipulation operation (that is, the "putfield #2" instruction) of the setValues( ) method.

The method void alert(java.lang.Object, int), part of the FieldAlert code of Annexure A8 and part of the distributed runtime system (DRT) 71, requests or otherwise notifies a DRT thread 121/1 executing the FieldSend.java code of Annexure A9 to update and propagate the changed identity and value of the manipulated memory location to the plurality of machines M1 . . . Mn.

It will be appreciated that the modified code permits, in a distributed computing environment having a plurality of computers or computing machines, the coordinated operation of memory manipulation operations so that the problems associated with the operation of the unmodified code or procedure on a plurality of machines M1 . . . Mn (such as for example inconsistent and incoherent memory state and manipulation and updating operation) does not occur when applying the modified code or procedure.

Having now described aspects of the memory management and replication, attention is now directed to an exemplary operational scenario illustrating the manner in which application programs on two computers may simultaneously execute the same application program in a consistent, coherent manner.

Figure 14:
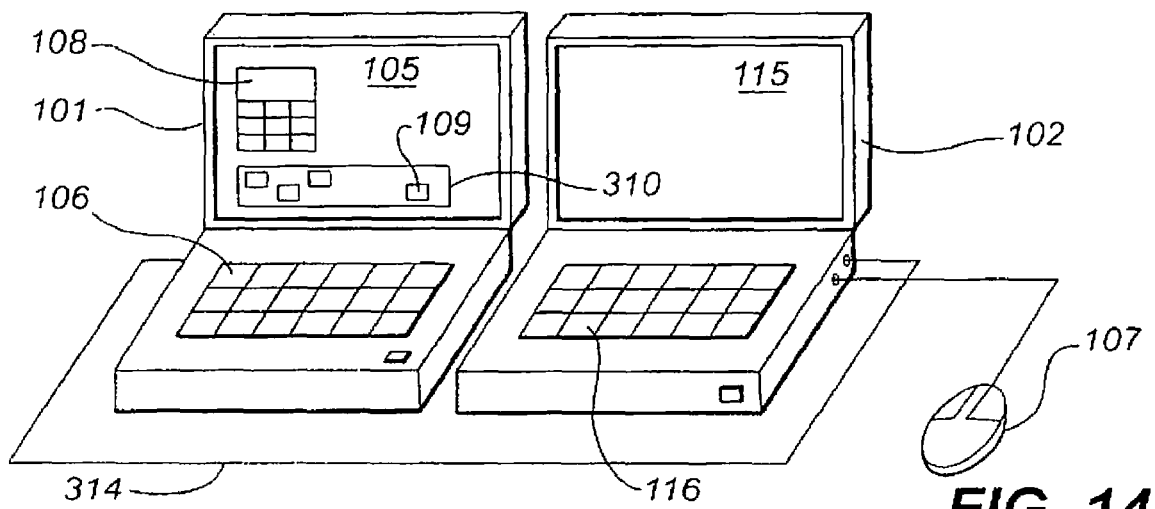
FIG. 14 is a schematic representation of two laptop computers interconnected to simultaneously run a plurality of applications, with both applications running on a single computer.
Figure 16:
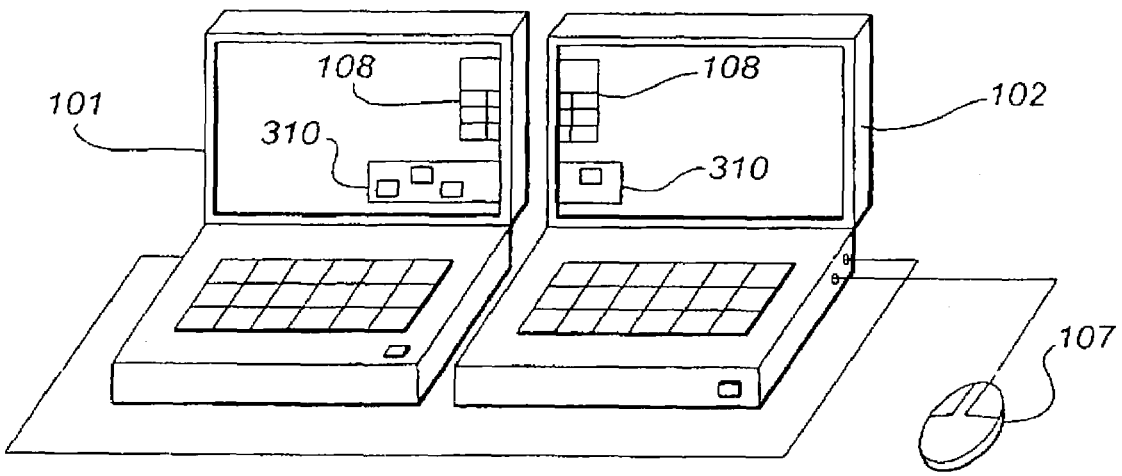
FIG. 16 is a view similar to FIGS. 14 and 15 but showing the FIG. 14 apparatus with both applications operating simultaneously on both computers.

In this regard, attention is directed to FIGS. 14-16, two laptop computers 101 and 102 are illustrated. The computers 101 and 102 are not necessarily identical and indeed, one can be an IBM or IBM-clone and the other can be an APPLE computer. The computers 101 and 102 have two screens 105, 115 two keyboards 106, 116 but a single mouse 107. The two machines 101, 102 are interconnected by a means of a single coaxial cable or twisted pair cable 314.

Two simple application programs are downloaded onto each of the machines 101, 102, the programs being modified as they are being loaded as described above. In this embodiment the first application is a simple calculator program and results in the image of a calculator 108 being displayed on the screen 105. The second program is a graphics program which displays four coloured blocks 109 which are of different colours and which move about at random within a rectangular box 310. Again, after loading, the box 310 is displayed on the screen 105. Each application operates independently so that the blocks 109 are in random motion on the screen 105 whilst numerals within the calculator 108 can be selected (with the mouse 107) together with a mathematical operator (such as addition or multiplication) so that the calculator 108 displays the result.

The mouse 107 can be used to "grab" the box 310 and move same to the right across the screen 105 and onto the screen 115 so as to arrive at the situation illustrated in FIG. 15. In this arrangement, the calculator application is being conducted on machine 101 whilst the graphics application resulting in display of box 310 is being conducted on machine 102.

However, as illustrated in FIG. 16, it is possible by means of the mouse 107 to drag the calculator 108 to the right as seen in FIG. 15 so as to have a part of the calculator 108 displayed by each of the screens 105, 115. Similarly, the box 310 can be dragged by means of the mouse 107 to the left as seen in FIG. 15 so that the box 310 is partially displayed by each of the screens 105, 115 as indicated FIG. 16. In this configuration, part of the calculator operation is being performed on machine 101 and part on machine 102 whilst part of the graphics application is being carried out the machine 101 and the remainder is carried out on machine 102.

FURTHER DESCRIPTION

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

An advantage of using a global identifier in the invention described is as a form of 'meta-name' or 'meta-identity' for all the similar equivalent local objects (or classes, or assets or resources or the like) on each one of the plurality of machines M1, . . . , Mn. For example, rather than having to keep track of each unique local name or identity of each similar equivalent local object on each machine of the plurality of similar equivalent objects, one may instead define or use a global name corresponding to the plurality of similar equivalent objects on each machine (e.g., "globalname7787"), and with the understanding that each machine relates the global name to a specific local name or object (e.g., "globalname7787" corresponds to object "localobject456" on machine M1, and "globalname7787" corresponds to object "localobject885" on machine M2, and "globalname7787" corresponds to object "localobject111" on machine M3, and so forth).

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Micrsoft.NET platform and architecture (Visual Basic, Visual C/C++, and C#) FORTRAN, C/C++, COBOL, BASIC etc.

The abovementioned arrangement, in which the JAVA code which updates memory locations or field values is modified, is based on the assumption that either the runtime system (say, JAVA HOTSPOT VIRTUAL MACHINE written in C and Java) or the operating system (LINUX written in C and Assembler, for example) of each machine M1 ... Mn will ordinarily update memory on the local machine (say M2) but not on any corresponding other machines (M1, M3 ... Mn). It is possible to leave the JAVA code which updates memory locations or field values unamended and instead amend the LINUX or HOTSPOT routine which updates memory locally, so that it correspondingly updates memory on all other machines as well. In order to embrace such an arrangement the term "updating propagation routine" used herein in conjunction with maintaining the memory of all machines M1 ... Mn essentially the same, is to be understood to include within its scope both the JAVA putfield and putstatic instructions and related operations and the "combination" of the JAVA putfield and putstatic operations and the LINUX or HOTSPOT code fragments which perform memory updating.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, propagation means, distribution update means, counter means, synchronization means, and the like. In at least one embodiment of the invention, any one or each of these various means may be implemented by computer program code statements or instructions (possibly including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by an combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

The invention may therefore includes a computer program product comprising a set of program instructions stored in a storage medium or exiting electronically in any form and operable to permit a plurality of computers to carry out any of the methods, procedures, routines, or the like as described herein including in any of the claims.

Furthermore, the invention may include a plurality of computers interconnected via a communication network or other communications ink or path and each operable to substantially simultaneously or concurrently execute the same or a different portion of an application program code written to operate on only a single computer on a corresponding different one of computers, wherein the computers being programmed to carry out any of the methods, procedures, or routines described in the specification or set forth in any of the claims, or being loaded with a computer program product.

The term "comprising" (and its grammatical variations) as used herein is used in the inclusive sense of "having" or "including" and not in the exclusive sense of "consisting only of".

COPYRIGHT NOTICE

This patent specification and the Annexures which form a part thereof contains material which is subject to copyright protection. The copyright owner (which is the applicant) has no objection to the reproduction of this patent specification or related materials from publicly available associated Patent Office files for the purposes of review, but otherwise reserves all copyright whatsoever. In particular, the various instructions are not to be entered into a computer without the specific written approval of the copyright owner.

COMPUTER ARCHITECTURE AND METHOD OF OPERATION FOR MULTI-COMPUTER DISTRIBUTED PROCESSING WITH REPLICATED MEMORY

ANNEXURE A

Annexure A

The following are program listings in the JAVA language:

A1. This first excerpt is part of an illustration of the modification code of the modifier 51 in accordance with steps 92 and 103 of FIG. 10. It searches through the code array of the application program code 50, and when it detects a memory manipulation instruction (i.e. a putstatic instruction (opcode 178) in the JAVA language and virtual machine environment) it modifies the application program code by the insertion of an "alert" routine.

```
// START
byte[ ] code = Code_attribute.code;    // Bytecode of a given method in a
                                       // given classfile.
int code_length = Code_attribute.code_length;
int DRT = 99;    // Location of the CONSTANT_Methodref_info for the
                 // DRT.alert( ) method.
for (int i=0; i<code_length; i++){
    if ((code[i] & 0xff) == 179){    // Putstatic instruction.
        System.arraycopy(code, i+3, code, i+6, code_length–(i+3));
        code[i+3] = (byte) 184;        // Invokestatic instruction for the
                                       // DRT.alert( ) method.
        code[i+4] = (byte) ((DRT >>> 8) & 0xff);
        code[i+5] = (byte) (DRT & 0xff);
    }
}
// END
```

A2. This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1.

```
// START
    public static void alert( ){
        synchronized (ALERT_LOCK){
            ALERT_LOCK.notify( ); // Alerts a waiting DRT
            thread in the background.
        }
    }
// END
```

A3. This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1 . . . Mn.

```
// START
MulticastSocket ms = DRT.getMulticastSocket( );   // The multicast socket
                                                  // used by the DRT for
                                                  // communication.
byte nameTag = 33;            // This is the "name tag" on the network
                              // for this field.
Field field = modifiedClass.getDeclaredField("myField1");   // Stores
                                                            // the field
                                                            // from the
                                                            // modified
                                                            // class.
// In this example, the field is a byte field.
while (DRT.isRunning( )){
    synchronized (ALERT_LOCK){
        ALERT_LOCK.wait( );   // The DRT thread is waiting for the alert
                              // method to be called.
        byte[ ] b = new byte[ ]{nameTag, field.getByte(null)};   // Stores
                                                                 // the
                                                                 // nameTag
                                                                 // and the
                                                                 // value
                                                                 // of the
                                                                 // field from
                                                                 // the
                                                                 // modified
                                                                 // class in a
                                                                 // buffer.
        DatagramPacket dp = new DatagramPacket(b, 0, b.length);
        ms.send(dp);   // Send the buffer out across the network.
    }
}
// END
```

A4. The fourth excerpt is part of the DRT 71, and corresponds to steps 135 and 136 of FIG. 13. This is a fragment of code to receive a propagated identity and value pair sent by another DRT 71 over the network, and write the changed value to the identified memory location.

```
// START
MulticastSocket ms = DRT.getMulticastSocket( );   // The multicast socket
                                                  // used by the DRT for
                                                  // communication.
DatagramPacket dp = new DatagramPacket(new byte[2], 0, 2);
byte nameTag = 33;            // This is the "name tag" on the network
                              // for this field.
Field field = modifiedClass.getDeclaredField("myField1");   // Stores the
                                                            // field from
                                                            // the
                                                            // modified
                                                            // class.
// In this example, the field is a byte field.
while (DRT.isRunning){
    ms.receive(dp);
    // Receive the previously sent buffer from the network.
    byte[ ] b = dp.getData( );
    if (b[0] == nameTag){   // Check the nametags match.
        field.setByte(null, b[1]);   // Write the value from the network packet
                                     // into the field location in memory.
    }
}
// END
```

A5. The fifth excerpt is an disassembled compiled form of the example.java application of Annexure A7, which performs a memory manipulation operation (putstatic and putfield).

Method void setValues(int, int)
  0 iload_1
  1 putstatic #3 <Field int staticValue>
  4 aload_0
  5 iload_2
  6 putfield #2 <Field int instanceValue>
  9 return A6. The sixth excerpt is the disassembled compiled form of the same example application in Annexure A5 after modification has been performed by FieldLoaderjava of Annexure A11, in accordance with FIG. 9 of this invention. The modifications are highlighted in bold.

Method void setValues(int, int)
  0 iload_1
  1 putstatic #3 <Field int staticValue>
  4 ldc #4 <String "example">
  6 iconst_0
  7 invokestatic #5 <Method void alert(java.lang.Object, int)>
  10 aload_0
  11 iload_2
  12 putfield #2 <Field int instanceValue>
  15 aload_0
  16 iconst_1
  17 invokestatic #5 <Method void alert(java.lang.Object, int)>
  20 return A7. The seventh excerpt is the source-code of the example.java application used in excerpt A5 and A6. This example application has two memory locations (staticValue and instanceValue) and performs two memory manipulation operations.

```
import java.lang.*;
public class example{
    /** Shared static field. */
    public static int staticValue = 0;
    /** Shared instance field. */
    public int instanceValue = 0;
    /** Example method that writes to memory (instance field). */
    public void setValues(int a, int b){
        staticValue = a;
        instanceValue = b;
    }
}
```

A8. The eighth excerpt is the source-code of FieldAlert.java which corresponds to step 125 and arrow 127 of FIG. 12, and which requests a thread 121/1 executing FieldSend.java of the "distributed run-time" 71 to propagate a changed value and identity pair to the other machines M1 . . . Mn.

```
import java.lang.*;
import java.util.*;
import java.net.*;
import java.io.*;
public class FieldAlert{
    /** Table of alerts. */
    public final static Hashtable alerts = new Hashtable( );
    /** Object handle. */
    public Object reference = null;
    /** Table of field alerts for this object. */
    public boolean[ ] fieldAlerts = null;
    /** Constructor. */
    public FieldAlert(Object o, int initialFieldCount){
        reference = o;
        fieldAlerts = new boolean[initialFieldCount];
    }
    /** Called when an application modifies a value. (Both objects and
        classes) */
    public static void alert(Object o, int fieldID){
        // Lock the alerts table.
        synchronized (alerts){
            FieldAlert alert = (FieldAlert) alerts.get(o);
            if (alert == null){    // This object hasn't been alerted already,
                                   // so add to alerts table.
                alert = new FieldAlert(o, fieldID + 1);
                alerts.put(o, alert);
            }
            if (fieldID >= alert.fieldAlerts.length){
                // Ok, enlarge fieldAlerts array.
                boolean[ ] b = new boolean[fieldID+1];
                System.arraycopy(alert.fieldAlerts, 0, b, 0,
                    alert.fieldAlerts.length);
                alert.fieldAlerts = b;
            }
            // Record the alert.
            alert.fieldAlerts[fieldID] = true;
            // Mark as pending.
            FieldSend.pending = true;    // Signal that there is one or more
                                         // propagations waiting.
            // Finally, notify the waiting FieldSend thread(s)
            if (FieldSend.waiting){
                FieldSend.waiting = false;
                alerts.notify( );
            }
        }
    }
}
```

A9. The ninth excerpt is the source-code of FieldSend.java which corresponds to step 128 of FIG. 12, and waits for a request/notification generated by FieldAlert.java of A8 corresponding to step 125 and arrow 127, and which propagates a changed value/identity pair requested of it by FieldAlert.java, via network 53.

```
import java.lang.*;
import java.lang.reflect.*;
import java.util.*;
import java.net.*;
import java.io.*;
public class FieldSend implements Runnable{
    /** Protocol specific values. */
    public final static int CLOSE = -1;
    public final static int NACK = 0;
    public final static int ACK = 1;
    public final static int PROPAGATE_OBJECT = 10;
    public final static int PROPAGATE_CLASS = 20;
    /** FieldAlert network values. */
    public final static String group =
```

-continued

```
        System.getProperty("FieldAlert_network_group");
    public final static int port =
        Integer.parseInt(System.getProperty("FieldAlert_network_port"));
    /** Table of global ID's for local objects. (hashcode-to-globalID
        mappings) */
    public final static Hashtable objectToGlobalID = new Hashtable( );
    /** Table of global ID's for local classnames. (classname-to-globalID
        mappings) */
    public final static Hashtable classNameToGlobalID = new Hashtable( );
    /** Pending. True if a propagation is pending. */
    public static boolean pending = false;
    /** Waiting. True if the FieldSend thread(s) are waiting. */
    public static boolean waiting = false;
    /** Background send thread. Propagates values as this thread is alerted
        to their alteration. */
    public void run( ){
        System.out.println("FieldAlert_network_group=" + group);
        System.out.println("FieldAlert_network_port=" + port);
        try{
            // Create a DatagramSocket to send propagated field values.
            DatagramSocket datagramSocket =
                new DatagramSocket(port, InetAddress.getByName(group));
            // Next, create the buffer and packet for all transmissions.
            byte[ ] buffer = new byte[512];       // Working limit of 512 bytes
                                                  // per packet.
            DatagramPacket datagramPacket =
                new DatagramPacket(buffer, 0, buffer.length);
            while (!Thread.interrupted( )){
                Object[ ] entries = null;
                // Lock the alerts table.
                synchronized (FieldAlert.alerts){
                    // Await for an alert to propagate something.
                    while (!pending){
                        waiting = true;
                        FieldAlert.alerts.wait( );
                        waiting = false;
                    }
                    pending = false;
                    entries = FieldAlert.alerts.entrySet( ).toArray( );
                    // Clear alerts once we have copied them.
                    FieldAlert.alerts.clear( );
                }
                // Process each object alert in turn.
                for (int i=0; i<entries.length; i++){
                    FieldAlert alert = (FieldAlert) entries[i];
                    int index = 0;
                    datagramPacket.setLength(buffer.length);
                    Object reference = null;
                    if (alert.reference instanceof String){
                        // PROPAGATE_CLASS field operation.
                        buffer[index++] = (byte)
                            ((PROPAGATE_CLASS >> 24) & 0xff);
                        buffer[index++] = (byte)
                            ((PROPAGATE_CLASS >> 16) & 0xff);
                        buffer[index++] = (byte)
                            ((PROPAGATE_CLASS >> 8) & 0xff);
                        buffer[index++] = (byte)
                            ((PROPAGATE_CLASS >> 0) & 0xff);
                        String name = (String) alert.reference;
                        int length = name.length( );
                        buffer[index++] = (byte) ((length >> 24) & 0xff);
                        buffer[index++] = (byte) ((length >> 16) & 0xff);
                        buffer[index++] = (byte) ((length >> 8) & 0xff);
                        buffer[index++] = (byte) ((length >> 0) & 0xff);
                        byte[ ] bytes = name.getBytes( );
                        System.arraycopy(bytes, 0, buffer, index, length);
                        index += length;
                    }else{              // PROPAGATE_OBJECT field operation.
                        buffer[index++] =
                            (byte) ((PROPAGATE_OBJECT >> 24) & 0xff);
                        buffer[index++] =
                            (byte) ((PROPAGATE_OBJECT >> 16) & 0xff);
                        buffer[index++] = (byte)
                            ((PROPAGATE_OBJECT >> 8) & 0xff);
                        buffer[index++] = (byte)
                            ((PROPAGATE_OBJECT >> 0) & 0xff);
                        int globalID = ((Integer)
                            objectToGlobalID.get(alert.reference)).intValue( );
                        buffer[index++] = (byte) ((globalID >> 24) & 0xff);
```

-continued

```
      buffer[index++] = (byte) ((globalID >> 16) & 0xff);
      buffer[index++] = (byte) ((globalID >> 8) & 0xff);
      buffer[index++] = (byte) ((globalID >> 0) & 0xff);
      reference = alert.reference;
   }
   // Use reflection to get a table of fields that correspond to
   // the field indexes used internally.
   Field[ ] fields = null;
   if (reference == null){
      fields = FieldLoader.loadClass((String)
         alert.reference).getDeclaredFields( );
   }else{
      fields = alert.reference.getClass( ).getDeclaredFields( );
   }
   // Now encode in batch mode the fieldID/value pairs.
   for (int j=0; j<alert.fieldAlerts.length; j++){
      if (alert.fieldAlerts[j] == false)
         continue;
      buffer[index++] = (byte) ((j >> 24) & 0xff);
      buffer[index++] = (byte) ((j >> 16) & 0xff);
      buffer[index++] = (byte) ((j >> 8) & 0xff);
      buffer[index++] = (byte) ((j >> 0) & 0xff);
      // Encode value.
      Class type = fields[j].getType( );
      if (type == Boolean.TYPE){
         buffer[index++] =(byte)
            (fields[j].getBoolean(reference)? 1 : 0);
      }else if (type == Byte.TYPE){
         buffer[index++] = fields[j].getByte(reference);
      }else if (type == Short.TYPE){
         short v = fields[j].getShort(reference);
         buffer[index++] = (byte) ((v >> 8) & 0xff);
         buffer[index++] = (byte) ((v >> 0) & 0xff);
      }else if (type == Character.TYPE){
         char v = fields[j].getChar(reference);
         buffer[index++] = (byte) ((v >> 8) & 0xff);
         buffer[index++] = (byte) ((v >> 0) & 0xff);
      }else if (type == Integer.TYPE){
         int v = fields[j].getInt(reference);
         buffer[index++] = (byte) ((v >> 24) & 0xff);
         buffer[index++] = (byte) ((v >> 16) & 0xff);
         buffer[index++] = (byte) ((v >> 8) & 0xff);
         buffer[index++] = (byte) ((v >> 0) & 0xff);
      }else if (type == Float.TYPE){
         int v = Float.floatToIntBits(
            fields[j].getFloat(reference));
         buffer[index++] = (byte) ((v >> 24) & 0xff);
         buffer[index++] = (byte) ((v >> 16) & 0xff);
         buffer[index++] = (byte) ((v >> 8) & 0xff);
         buffer[index++] = (byte) ((v >> 0) & 0xff);
      }else if (type == Long.TYPE){
         long v = fields[j].getLong(reference);
         buffer[index++] = (byte) ((v >> 56) & 0xff);
         buffer[index++] = (byte) ((v >> 48) & 0xff);
         buffer[index++] = (byte) ((v >> 40) & 0xff);
         buffer[index++] = (byte) ((v >> 32) & 0xff);
         buffer[index++] = (byte) ((v >> 24) & 0xff);
         buffer[index++] = (byte) ((v >> 16) & 0xff);
         buffer[index++] = (byte) ((v >> 8) & 0xff);
         buffer[index++] = (byte) ((v >> 0) & 0xff);
      }else if (type == Double.TYPE){
         long v = Double.doubleToLongBits(
            fields[j].getDouble(reference));
         buffer[index++] = (byte) ((v >> 56) & 0xff);
         buffer[index++] = (byte) ((v >> 48) & 0xff);
         buffer[index++] = (byte) ((v >> 40) & 0xff);
         buffer[index++] = (byte) ((v >> 32) & 0xff);
         buffer[index++] = (byte) ((v >> 24) & 0xff);
         buffer[index++] = (byte) ((v >> 16) & 0xff);
         buffer[index++] = (byte) ((v >> 8) & 0xff);
         buffer[index++] = (byte) ((v >> 0) & 0xff);
      }else{
         throw new AssertionError("Unsupported type.");
      }
   }
   // Now set the length of the datagrampacket.
   datagramPacket.setLength(index);
   // Now send the packet.
   datagramSocket.send(datagramPacket);
      }
   }
   }catch (Exception e){
      throw new AssertionError("Exception: " + e.toString( ));
   }
      }
   }
}
```

A10. The tenth excerpt is the source-code of FieldReceive. java, which corresponds to steps 135 and 136 of FIG. 13, and which receives a propagated changed value and identity pair sent to it over the network 53 via FieldSend.java of annexure A9.

```
import java.lang.*;
import java.lang.reflect.*;
import java.util.*;
import java.net.*;
import java.io.*;
public class FieldReceive implements Runnable{
   /** Protocol specific values.  */
   public final static int CLOSE = -1;
   public final static int NACK = 0;
   public final static int ACK = 1;
   public final static int PROPAGATE_OBJECT = 10;
   public final static int PROPAGATE_CLASS = 20;
   /** FieldAlert network values.  */
   public final static String group =
      System.getProperty("FieldAlert_network_group");
   public final static int port =
      Integer.parseInt(System.getProperty("FieldAlert_network_port"));
   /** Table of global ID's for local objects. (globalID-to-hashcode
      mappings) */
   public final static Hashtable globalIDToObject = new Hashtable( );
   /** Table of global ID's for local classnames. (globalID-to-classname
      mappings) */
   public final static Hashtable globalIDToClassName = new Hashtable( );
   /** Called when an application is to acquire a lock.  */
   public void run( ){
      System.out.println("FieldAlert_network_group=" + group);
```

-continued

```
System.out.println("FieldAlert_network_port=" + port);
try{
    // Create a DatagramSocket to send propagated field values from
    MulticastSocket multicastSocket = new MulticastSocket(port);
    multicastSocket.joinGroup(InetAddress.getByName(group));
    // Next, create the buffer and packet for all transmissions.
    byte[ ] buffer = new byte[512];              // Working limit of 512
                                                 // bytes per packet.
    DatagramPacket datagramPacket =
        new DatagramPacket(buffer, 0, buffer.length);
    while (!Thread.interrupted( )){
        // Make sure to reset length.
        datagramPacket.setLength(buffer.length);
        // Receive the next available packet.
        multicastSocket.receive(datagramPacket);
        int index = 0, length = datagramPacket.getLength( );
        // Decode the command.
        int command = (int) (((buffer[index++] & 0xff) << 24)
            | ((buffer[index++] & 0xff) << 16)
            | ((buffer[index++] & 0xff) << 8)
            | (buffer[index++] & 0xff));
        if (command == PROPAGATE_OBJECT){    // Propagate operation for
                                             // object fields.
            // Decode global id.
            int globalID = (int) (((buffer[index++] & 0xff) << 24)
                | ((buffer[index++] & 0xff) << 16)
                | ((buffer[index++] & 0xff) << 8)
                | (buffer[index++] & 0xff));
            // Now, need to resolve the object in question.
            Object reference = globalIDToObject.get(
                new Integer(globalID));
            // Next, get the array of fields for this object.
            Field[ ] fields = reference.getClass( ).getDeclaredFields( );
            while (index < length){
                // Decode the field id.
                int fieldID = (int) (((buffer[index++] & 0xff) << 24)
                    | ((buffer[index++] & 0xff) << 16)
                    | ((buffer[index++] & 0xff) << 8)
                    | (buffer[index++] & 0xff));
                // Determine value length based on corresponding field
                // type.
                Field field = fields[fieldID];
                Class type = field.getType( );
                if (type == Boolean.TYPE){
                    boolean v = (buffer[index++] == 1 ? true : false);
                    field.setBoolean(reference, v);
                }else if (type == Byte.TYPE){
                    byte v = buffer[index++];
                    field.setByte(reference, v);
                }else if (type == Short.TYPE){
                    short v = (short) (((buffer[index++] & 0xff) << 8)
                        | (buffer[index++] & 0xff));
                    field.setShort(reference, v);
                }else if (type == Character.TYPE){
                    char v = (char) (((buffer[index++] & 0xff) << 8)
                        | (buffer[index++] & 0xff));
                    field.setChar(reference, v);
                }else if (type == Integer.TYPE){
                    int v = (int) (((buffer[index++] & 0xff) << 24)
                        | ((buffer[index++] & 0xff) << 16)
                        | ((buffer[index++] & 0xff) << 8)
                        | (buffer[index++] & 0xff));
                    field.setInt(reference, v);
                }else if (type == Float.TYPE){
                    int v = (int) (((buffer[index++] & 0xff) << 24)
                        | ((buffer[index++] & 0xff) << 16)
                        | ((buffer[index++] & 0xff) << 8)
                        | (buffer[index++] & 0xff));
                    field.setFloat(reference, Float.intBitsToFloat(v));
                }else if (type == Long.TYPE){
                    long v = (long) (((buffer[index++] & 0xff) << 56)
                        | ((buffer[index++] & 0xff) << 48)
                        | ((buffer[index++] & 0xff) << 40)
                        | ((buffer[index++] & 0xff) << 32)
                        | ((buffer[index++] & 0xff) << 24)
                        | ((buffer[index++] & 0xff) << 16)
                        | ((buffer[index++] & 0xff) << 8)
                        | (buffer[index++] & 0xff));
                    field.setLong(reference, v);
```

-continued

```
      }else if (type == Double.TYPE){
        long v = (long) (((buffer[index++] & 0xff) << 56)
          | ((buffer[index++] & 0xff) << 48)
          | ((buffer[index++] & 0xff) << 40)
          | ((buffer[index++] & 0xff) << 32)
          | ((buffer[index++] & 0xff) << 24)
          | ((buffer[index++] & 0xff) << 16)
          | ((buffer[index++] & 0xff) << 8)
          | (buffer[index++] & 0xff));
        field.setDouble(reference, Double.longBitsToDouble(v));
      }else{
        throw new AssertionError("Unsupported type.");
      }
    }
  }else if (command == PROPAGATE_CLASS){        // Propagate an update
                                                // to class fields.
    // Decode the classname.
    int nameLength = (int) (((buffer[index++] & 0xff) << 24)
      | ((buffer[index++] & 0xff) << 16)
      | ((buffer[index++] & 0xff) << 8)
      | (buffer[index++] & 0xff));
    String name = new String(buffer, index, nameLength);
    index += nameLength;
    // Next, get the array of fields for this class.
    Field[ ] fields =
      FieldLoader.loadClass(name).getDeclaredFields( );
    // Decode all batched fields included in this propagation
    // packet.
    while (index < length){
      // Decode the field id.
      int fieldID = (int) (((buffer[index++] & 0xff) << 24)
        | ((buffer[index++] & 0xff) << 16)
        | ((buffer[index++] & 0xff) << 8)
        | (buffer[index++] & 0xff));
      // Determine field type to determine value length.
      Field field = fields[fieldID];
      Class type = field.getType( );
      if (type == Boolean.TYPE){
        boolean v = (buffer[index++] == 1 ? true : false);
        field.setBoolean(null, v);
      }else if (type == Byte.TYPE){
        byte v = buffer[index++];
        field.setByte(null, v);
      }else if (type == Short.TYPE){
        short v = (short) (((buffer[index++] & 0xff) << 8)
          | (buffer[index++] & 0xff));
        field.setShort(null, v);
      }else if (type == Character.TYPE){
        char v = (char) (((buffer[index++] & 0xff) << 8)
          | (buffer[index++] & 0xff));
        field.setChar(null, v);
      }else if (type == Integer.TYPE){
        int v = (int) (((buffer[index++] & 0xff) << 24)
          | ((buffer[index++] & 0xff) << 16)
          | ((buffer[index++] & 0xff) << 8)
          | (buffer[index++] & 0xff));
        field.setInt(null, v);
      }else if (type == Float.TYPE){
        int v = (int) (((buffer[index++] & 0xff) << 24)
          | ((buffer[index++] & 0xff) << 16)
          | ((buffer[index++] & 0xff) << 8)
          | (buffer[index++] & 0xff));
        field.setFloat(null, Float.intBitsToFloat(v));
      }else if (type == Long.TYPE){
        long v = (long) (((buffer[index++] & 0xff) << 56)
          | ((buffer[index++] & 0xff) << 48)
          | ((buffer[index++] & 0xff) << 40)
          | ((buffer[index++] & 0xff) << 32)
          | ((buffer[index++] & 0xff) << 24)
          | ((buffer[index++] & 0xff) << 16)
          | ((buffer[index++] & 0xff) << 8)
          | (buffer[index++] & 0xff));
        field.setLong(null, v);
      }else if (type == Double.TYPE){
        long v = (long) (((buffer[index++] & 0xff) << 56)
          | ((buffer[index++] & 0xff) << 48)
          | ((buffer[index++] & 0xff) << 40)
          | ((buffer[index++] & 0xff) << 32)
          | ((buffer[index++] & 0xff) << 24)
```

-continued

```
                    | ((buffer[index++] & 0xff) << 16)
                    | ((buffer[index++] & 0xff) << 8)
                    | (buffer[index++] & 0xff));
                    field.setDouble(null, Double.longBitsToDouble(v));
                }else{            // Unsupported field type.
                    throw new AssertionError("Unsupported type.");
                }
            }
          }
        }
      }
    }catch (Exception e){
      throw new AssertionError("Exception: " + e.toString( ));
    }
  }
}
```

A11. FieldLoader.java

This excerpt is the source-code of FieldLoader.java, which modifies an application program code, such as the example.java application code of Annexure A7, as it is being loaded into a JAVA virtual machine in accordance with steps 90, 91, 92, 103, and 94 of FIG. 10. FieldLoader.java makes use of the convenience classes of Annexures A12 through to A36 during the modification of a compiled JAVA classfile.

```
import java.lang.*;
import java.io.*;
import java.net.*;
public class FieldLoader extends URLClassLoader{
  public FieldLoader(URL[ ] urls){
    super(urls);
  }
  protected Class findClass(String name)
  throws ClassNotFoundException{
    ClassFile cf = null;
    try{
      BufferedInputStream in =
        new BufferedInputStream(findResource(
          name.replace('.', '/').concat(".class")).openStream( ));
      cf = new ClassFile(in);
    }catch (Exception e){throw new ClassNotFoundException(e.toString( ));}
    // Class-wide pointers to the ldc and alert index.
    int ldcindex = −1;
    int alertindex = −1;
    for (int i=0; i<cf.methods_count; i++){
      for (int j=0; j<cf.methods[i].attributes_count; j++){
        if (!(cf.methods[i].attributes[j] instanceof Code_attribute))
          continue;
        Code_attribute ca = (Code_attribute) cf.methods[i].attributes[j];
        boolean changed = false;
        for (int z=0; z<ca.code.length; z++){
          if ((ca.code[z][0] & 0xff) == 179){        // Opcode for a PUTSTATIC
                                                     // instruction.
            changed = true;
            // The code below only supports fields in this class.
            // Thus, first off, check that this field is local to this
            // class.
            CONSTANT_Fieldref_info fi = (CONSTANT_Fieldref_info)
              cf.constant_pool[(int) (((ca.code[z][1] & 0xff) << 8) |
              (ca.code[z][2] & 0xff))];
            CONSTANT_Class_info ci = (CONSTANT_Class_info)
              cf.constant_pool[fi.class_index];
            String className =
              cf.constant_pool[ci.name_index].toString( );
            if (!name.equals(className)){
              throw new AssertionError("This code only supports fields "
                "local to this class");
            }
            // Ok, now search for the fields name and index.
            int index = 0;
            CONSTANT_NameAndType_info ni = (CONSTANT_NameAndType_info)
              cf.constant_pool[fi.name_and_type_index];
            String fieldName =
```

-continued

```
            cf.constant_pool[ni.name_index].toString( );
         for (int a=0; a<cf.fields_count; a++){
            String fn = cf.constant_pool[
               cf.fields[a].name_index].toString( );
            if (fieldName.equals(fn)){
               index = a;
               break;
            }
         }
      }
      // Next, realign the code array, making room for the
      // insertions.
      byte[ ][ ] code2 = new byte[ca.code.length+3][ ];
      System.arraycopy(ca.code, 0, code2, 0, z+1);
      System.arraycopy(ca.code, z+1, code2, z+4,
         ca.code.length-(z+1));
      ca.code = code2;
      // Next, insert the LDC_W instruction.
      if (ldcindex == -1){
         CONSTANT_String_info csi =
            new CONSTANT_String_info(ci.name_index);
         cp_info[ ] cpi = new cp_info[cf.constant_pool.length+1];
         System.arraycopy(cf.constant_pool, 0, cpi, 0,
            cf.constant_pool.length);
         cpi[cpi.length - 1] = csi;
         ldcindex = cpi.length-1;
         cf.constant_pool = cpi;
         cf.constant_pool_count++;
      }
      ca.code[z+1] = new byte[3];
      ca.code[z+1][0] = (byte) 19;
      ca.code[z+1][1] = (byte) ((ldcindex >> 8) & 0xff);
      ca.code[z+1][2] = (byte) (ldcindex & 0xff);
      // Next, insert the SIPUSH instruction.
      ca.code[z+2] = new byte[3];
      ca.code[z+2][0] = (byte) 17;
      ca.code[z+2][1] = (byte) ((index >> 8) & 0xff);
      ca.code[z+2][2] = (byte) (index & 0xff);
      // Finally, insert the INVOKESTATIC instruction.
      if (alertindex == -1){
         // This is the first time this class is encourtering
the
         // alert instruction, so have to add it to the constant
         // pool.
         cp_info[ ] cpi = new cp_info[cf.constant_pool.length+6];
         System.arraycopy(cf.constant_pool, 0, cpi, 0,
            cf.constant_pool.length);
         cf.constant_pool = cpi;
         cf.constant_pool_count += 6;
         CONSTANT_Utf8_info u1 =
            new CONSTANT_Utf8_info("FieldAlert");
         cf.constant_pool[cf.constant_pool.length-6] = u1;
         CONSTANT_Class_info c1 = new CONSTANT_Class_info(
            cf.constant_pool_count-6);
         cf.constant_pool[cf.constant_pool.length-5] = c1;
         u1 = new CONSTANT_Utf8_info("alert");
         cf.constant_pool[cf.constant_pool.length-4] = u1;
         u1 = new CONSTANT_Utf8_info("(Ljava/lang/Object;I)V");
         cf.constant_pool[cf.constant_pool.length-3] = u1;
         CONSTANT_NameAndType_info n1 =
            new CONSTANT_NameAndType_info(
               cf.constant_pool.length-4, cf.constant_pool.length-
3);
         cf.constant_pool[cf.constant_pool.length-2] = n1;
         CONSTANT_Methodref_info m1 = new
CONSTANT_Methodref_info(
            cf.constant_pool.length-5, cf.constant_pool.length-
2);
         cf.constant_pool[cf.constant_pool.length-1] = m1;
         alertindex = cf.constant_pool.length-1;
      }
      ca.code[z+3] = new byte[3];
      ca.code[z+3][0] = (byte) 184;
      ca.code[z+3][1] = (byte) ((alertindex >> 8) & 0xff);
      ca.code[z+3][2] = (byte) (alertindex & 0xff);
      // And lastly, increase the CODE_LENGTH and
ATTRIBUTE_LENGTH
      // values.
      ca.code_length += 9;
      ca.attribute_length += 9;
```

```
            }
        }
        // If we changed this method, then increase the stack size by one.
        if (changed){
            ca.max_stack++;          // Just to make sure.
        }
      }
    }
    try{
        ByteArrayOutputStream out = new ByteArrayOutputStream( );
        cf.serialize(out);
        byte[ ] b = out.toByteArray( );
        return defineClass(name, b, 0, b.length);
    }catch (Exception e){
        throw new ClassNotFoundException(name);
    }
  }
}
```

A12. Attribute_info.java

Convience class for representing attribute_info structures within ClassFiles.

```
import java.lang.*;
import java.io.*;
/** This abstract class represents all types of attribute_info
 *  that are used in the JVM specifications.
 *
 *  All new attribute_info subclasses are to always inherit from this
 *  class.
 */
public abstract class attribute_info{
    public int attribute_name_index;
    public int attribute_length;
    /** This is used by subclasses to register themselves
     *  to their parent classFile.
     */
    attribute_info(ClassFile cf){ }
    /** Used during input serialization by ClassFile only.   */
    attribute_info(ClassFile cf, DataInputStream in)
        throws IOException{
        attribute_name_index = in.readChar( );
        attribute_length = in.readInt( );
    }
    /** Used during output serialization by ClassFile only.   */
    void serialize(DataOutputStream out)
        throws IOException{
        out.writeChar(attribute_name_index);
        out.writeInt(attribute_length);
    }
/** This class represents an unknown attribute_info that
 *  this current version of classfile specification does
 *  not understand.
 */
public final static class Unknown extends attribute_info{
    byte[ ] info;
    /** Used during input serialization by ClassFile only.   */
    Unknown(ClassFile cf, DataInputStream in)
        throws IOException{
        super(cf, in);
        info = new byte[attribute_length];
        in.read(info, 0, attribute_length);
    }
    /** Used during output serialization by ClassFile only.   */
    void serialize(DataOutputStream out)
        throws IOException{
        ByteArrayOutputStream baos = new
            ByteArrayOutputStream( );
        super.serialize(out);
        out.write(info, 0, attribute_length);
    }
}
}
```

A13. ClassFile.java

Convience class for representing ClassFile structures.

```
import java.lang.*;
import java.io.*;
import java.util.*;
/** The ClassFile follows verbatim from the JVM specification.   */
public final class ClassFile {
    public int magic;
    public int minor_version;
    public int major_version;
    public int constant_pool_count;
    public cp_info[ ] constant_pool;
    public int access_flags;
    public int this_class;
    public int super_class;
    public int interfaces_count;
    public int[ ] interfaces;
    public int fields_count;
    public field_info[ ] fields;
    public int methods_count;
```

-continued

```
    public method_info[ ] methods;
    public int attributes_count;
    public attribute_info[ ] attributes;
    /** Constructor. Takes in a byte stream representation and transforms
     *  each of the attributes in the ClassFile into objects to allow for
     *  easier manipulation.
     */
    public ClassFile(InputStream ins)
        throws IOException{
        DataInputStream in = (ins instanceof DataInputStream ?
            (DataInputStream) ins : new DataInputStream(ins));
        magic = in.readInt( );
        minor_version = in.readChar( );
        major_version = in.readChar( );
        constant_pool_count = in.readChar( );
        constant_pool = new cp_info[constant_pool_count];
        for (int i=1; i<constant_pool_count; i++){
            in.mark(1);
            int s = in.read( );
            in.reset( );
            switch (s){
                case 1:
                    constant_pool[i] = new CONSTANT_Utf8_info(this, in);
                    break;
                case 3:
                    constant_pool[i] = new CONSTANT_Integer_info(this, in);
                    break;
                case 4:
                    constant_pool[i] = new CONSTANT_Float_info(this, in);
                    break;
                case 5:
                    constant_pool[i] = new CONSTANT_Long_info(this, in);
                    i++;
                    break;
                case 6:
                    constant_pool[i] = new CONSTANT_Double_info(this, in);
                    i++;
                    break;
                case 7:
                    constant_pool[i] = new CONSTANT_Class_info(this, in);
                    break;
                case 8:
                    constant_pool[i] = new CONSTANT_String_info(this, in);
                    break;
                case 9:
                    constant_pool[i] = new CONSTANT_Fieldref_info(this, in);
                    break;
                case 10:
                    constant_pool[i] = new CONSTANT_Methodref_info(this, in);
                    break;
                case 11:
                    constant_pool[i] =
                        new CONSTANT_InterfaceMethodref_info(this, in);
                    break;
                case 12:
                    constant_pool[i] = new CONSTANT_NameAndType_info(this, in);
                    break;
                default:
                    throw new ClassFormatError("Invalid ConstantPoolTag");
            }
        }
        access_flags = in.readChar( );
        this_class = in.readChar( );
        super_class = in.readChar( );
        interfaces_count = in.readChar( );
        interfaces = new int[interfaces_count];
        for (int i=0; i<interfaces_count; i++)
            interfaces[i] = in.readChar( );
        fields_count = in.readChar( );
        fields = new field_info[fields_count];
        for (int i=0; i<fields_count; i++) {
            fields[i] = new field_info(this, in);
        }
        methods_count = in.readChar( );
        methods = new method_info[methods_count];
        for (int i=0; i<methods_count; i++) {
            methods[i] = new method_info(this, in);
```

```
        }
        attributes_count = in.readChar( );
        attributes = new attribute_info[attributes_count];
        for (int i=0; i<attributes_count; i++){
            in.mark(2);
            String s = constant_pool[in.readChar( )].toString( );
            in.reset( );
            if (s.equals("SourceFile"))
                attributes[i] = new SourceFile_attribute(this, in);
            else if (s.equals("Deprecated"))
                attributes[i] = new Deprecated_attribute(this, in);
            else if (s.equals("InnerClasses"))
                attributes[i] = new InnerClasses_attribute(this, in);
            else
                attributes[i] = new attribute_info.Unknown(this, in);
        }
    }
    /** Serializes the ClassFile object into a byte stream.  */
    public void serialize(OutputStream o)
        throws IOException{
        DataOutputStream out = (o instanceof DataOutputStream ?
            (DataOutputStream) o : new DataOutputStream(o));
        out.writeInt(magic);
        out.writeChar(minor_version);
        out.writeChar(major_version);
        out.writeChar(constant_pool_count);
        for (int i=1; i<constant_pool_count; i++){
            constant_pool[i].serialize(out);
            if (constant_pool[i] instanceof CONSTANT_Long_info ||
                    constant_pool[i] instanceof CONSTANT_Double_info)
                i++;
        }
        out.writeChar(access_flags);
        out.writeChar(this_class);
        out.writeChar(super_class);
        out.writeChar(interfaces_count);
        for (int i=0; i<interfaces_count; i++)
            out.writeChar(interfaces[i]);
        out.writeChar(fields_count);
        for (int i=0; i<fields_count; i++)
            fields[i].serialize(out);
        out.writeChar(methods_count);
        for (int i=0; i<methods_count; i++)
            methods[i].serialize(out);
        out.writeChar(attributes_count);
        for (int i=0; i<attributes_count; i++)
            attributes[i].serialize(out);
        // Flush the outputstream just to make sure.
        out.flush( );
    }
}
```

A14. Code_attribute.java

Convience class for representing Code_attribute structures within ClassFiles.

```
import java.util.*;
import java.lang.*;
import java.io.*;
/**
 *  The code[ ] is stored as a 2D array.   */
public final class Code_attribute extends attribute_info{
    public int max_stack;
    public int max_locals;
    public int code_length;
    public byte[ ][ ] code;
    public int exception_table_length;
    public exception_table[ ] exception_table;
    public int attributes_count;
    public attribute_info[ ] attributes;
    /** Internal class that handles the exception table.  */
    public final static class exception_table{
```

-continued

```
        public int start_pc;
        public int end_pc;
        public int handler_pc;
        public int catch_type;
}
/** Constructor called only by method_info.  */
Code_attribute(ClassFile cf, int ani, int al, int ms, int ml, int cl,
                byte[ ][ ] cd, int etl, exception_table[ ] et, int ac,
                attribute_info[ ] a){
    super(cf);
    attribute_name_index = ani;
    attribute_length = al;
    max_stack = ms;
    max_locals = ml;
    code_length = cl;
    code = cd;
    exception_table_length = etl;
    exception_table = et;
    attributes_count = ac;
    attributes = a;
}
/** Used during input serialization by ClassFile only.  */
Code_attribute(ClassFile cf, DataInputStream in)
        throws IOException(
    super(cf, in);
    max_stack = in.readChar( );
    max_locals = in.readChar( );
    code_length = in.readInt( );
    code = new byte[code_length][ ];
    int i = 0;
    for (int pos=0; pos<code_length; i++){
        in.mark(1);
        int s = in.read( );
        in.reset( );
        switch (s)(
            case 16:
            case 18:
            case 21:
            case 22:
            case 23:
            case 24:
            case 25:
            case 54:
            case 55:
            case 56:
            case 57:
            case 58:
            case 169:
            case 188:
            case 196:
                code[i] = new byte[2];
            break;
            case 17:
            case 19:
            case 20:
            case 132:
            case 153:
            case 154:
            case 155:
            case 156:
            case 157:
            case 158:
            case 159:
            case 160:
            case 161:
            case 162:
            case 163:
            case 164:
            case 165:
            case 166:
            case 167:
            case 168:
            case 178:
            case 179:
            case 180:
            case 181:
            case 182:
            case 183:
            case 184:
```

```
                    case 187:
                    case 189:
                    case 192:
                    case 193:
                    case 198:
                    case 199:
                    case 209:
                        code[i] = new byte[3];
                        break;
                    case 197:
                        code[i] = new byte[4];
                        break;
                    case 185:
                    case 200:
                    case 201:
                        code[i] = new byte[5];
                        break;
                    case 170:{
                        int pad = 3 – (pos % 4);
                        in.mark(pad+13);                            // highbyte
                        in.skipBytes(pad+5);                        // lowbyte
                        int low = in.readInt( );
                        code[i] =
                            new byte[pad + 13 + ((in.readInt( ) – low + 1) * 4)];
                        in.reset( );
                        break;
                    )case 171:{
                        int pad = 3 – (pos % 4);
                        in.mark(pad+9);
                        in.skipBytes(pad+5);
                        code[i] = new byte[pad + 9 + (in.readInt( ) * 8)];
                        in.reset( );
                        break;
                    }default:
                        code[i] = new byte[1];
                }
                in.read(code[i], 0, code[i].length);
                pos += code[i].length;
            }
            // adjust the array to the new size and store the size
            byte[ ][ ] temp = new byte[i][ ];
            System.arraycopy(code, 0, temp, 0, i);
            code = temp;
            exception_table_length = in.readChar( );
            exception_table =
                new Code_attribute.exception_table[exception_table_length];
            for (i=0; i<exception_table_length; i++){
                exception_table[i] = new exception_table( );
                exception_table[i].start_pc = in.readChar( );
                exception_table[i].end_pc = in.readChar( );
                exception_table[i].handler_pc = in.readChar( );
                exception_table[i].catch_type = in.readChar( );
            }
            attributes_count = in.readChar( );
            attributes = new attribute_info[attributes_count];
            for (i=0; i<attributes_count; i++){
                in.mark(2);
                String s = cf.constant_pool[in.readChar( )].toString( );
                in.reset( );
                if (s.equals("LineNumberTable"))
                    attributes[i] = new LineNumberTable_attribute(cf, in);
                else if (s.equals("LocalVariableTable"))
                    attributes[i] = new LocalVariableTable_attribute(cf, in);
                else
                    attributes[i] = new attribute_info.Unknown(cf, in);
            }
        }
    }
    /** Used during output serialization by ClassFile only.
    */
    void serialize(DataOutputStream out)
        throws IOException{
            attribute_length = 12 + code_length +
                (exception_table_length * 8);
            for (int i=0; i<attributes_count; i++)
                attribute_length += attributes[i].attribute_length + 6;
            super.serialize(out);
            out.writeChar(max_stack);
            out.writeChar(max_locals);
            out.writeInt(code_length);
```

-continued

```
            for (int i=0, pos=0; pos<code_length; i++){
                out.write(code[i], 0, code[i].length);
                pos += code[i].length;
            }
            out.writeChar(exception_table_length);
            for (int i=0; i<exception_table_length; i++){
                out.writeChar(exception_table[i].start_pc);
                out.writeChar(exception_table[i].end_pc);
                out.writeChar(exception_table[i].handler_pc);
                out.writeChar(exception_table[i].catch_type);
            }
            out.writeChar(attributes_count);
            for (int i=0; i<attributes_count; i++)
                attributes[i].serialize(out);
        }
}
```

A15. CONSTANT_Class_info.java

Convience class for representing CONSTANT_Class_info structures within ClassFiles.

```
import java.lang.*;
import java.io.*;
/** Class subtype of a constant pool entry.   */
public final class CONSTANT_Class_info extends cp_info{
    /** The index to the name of this class. */
    public int name_index = 0;
    /** Convenience constructor.
     */
    public CONSTANT_Class_info(int index) {
        tag = 7;
        name_index = index;
    }
    /** Used during input serialization by ClassFile only. */
    CONSTANT_Class_info(ClassFile cf, DataInputStream in)
        throws IOException{
        super(cf, in);
        if (tag != 7)
            throw new ClassFormatError( );
        name_index = in.readChar( );
    }
    /** Used during output serialization by ClassFile only. */
    void serialize(DataOutputStream out)
        throws IOException{
        out.writeByte(tag);
        out.writeChar(name_index);
    }
}
```

A16. CONSTANT_Fieldref_info.java

Convience class for representing CONSTANT_Double_info structures within ClassFiles.

```
import java.lang.*;
import java.io.*;
/** Double subtype of a constant pool entry. */
public final class CONSTANT_Double_info extends cp_info{
    /** The actual value. */
    public double bytes;
    public CONSTANT_Double_info(double d){
        tag = 6;
        bytes = d;
    }
    /** Used during input serialization by ClassFile only. */
    CONSTANT_Double_info(ClassFile cf, DataInputStream in)
        throws IOException{
        super (cf, in);
        if (tag != 6)
```

-continued

```
            throw new ClassFormatError( );
        bytes = in.readDouble( );
    }
    /** Used during output serialization by ClassFile only. */
    void serialize(DataOutputStream out)
        throws IOException{
        out.writeByte(tag);
        out.writeDouble(bytes);
        long l = Double.doubleToLongBits(bytes);
    }
}
```

A17. CONSTANT_Fieldref_info.java

Convience class for representing CONSTANT_Fieldref_info structures within ClassFiles.

```
import java.lang.*;
import java.io.*;
/** Fieldref subtype of a constant pool entry.   */
public final class CONSTANT_Fieldref_info extends cp_info{
    /** The index to the class that this field is referencing to.   */
    public int class_index;
    /** The name and type index this field if referencing to.   */
    public int name_and_type_index;
    /** Convenience constructor.   */
    public CONSTANT_Fieldref_info(int class_index,
        int name_and_type_index)
    {
        tag = 9;
        this.class_index = class_index;
        this.name_and_type_index = name_and_type_index;
    }
    /** Used during input serialization by ClassFile only.   */
    CONSTANT_Fieldref_info(ClassFile cf, DataInputStream in)
        throws IOException{
        super(cf, in);
        if (tag != 9)
            throw new ClassFormatError( );
        class_index = in.readChar( );
        name_and_type_index = in.readChar( );
    }
    /** Used during output serialization by ClassFile only.   */
    void serialize(DataOutputStream out)
        throws IOException{
        out.writeByte(tag);
        out.writeChar(class_index);
        out.writeChar(name_and_type_index);
    }
}
```

A18. CONSTANT_Float_info.java

Convience class for representing CONSTANT_Float_info structures within ClassFiles.

```java
import java.lang.*;
import java.io.*;
/** Float subtype of a constant pool entry. */
public final class CONSTANT_Float_info extends cp_info{
    /** The actual value. */
    public float bytes;
    public CONSTANT_Float_info(float f){
        tag = 4;
        bytes = f;
    }
    /** Used during input serialization by ClassFile only. */
    CONSTANT_Float_info(ClassFile cf, DataInputStream in)
        throws IOException{
        super(cf, in);
        if (tag != 4)
            throw new ClassFormatError( );
        bytes = in.readFloat( );
    }
    /** Used during output serialization by ClassFile only. */
    public void serialize(DataOutputStream out)
        throws IOException{
        out.writeByte(4);
        out.writeFloat(bytes);
    }
}
```

A19. CONSTANT_Integer_info.java

Convience class for representing CONSTANT_Integer_info structures within ClassFiles.

```java
import java.lang.*;
import java.io.*;
/** Integer subtype of a constant pool entry. */
public final class CONSTANT_Integer_info extends cp_info(
    /** The actual value. */
    public int bytes;
    public CONSTANT_Integer_info(int b) {
        tag = 3;
        bytes = b;
    }
    /** Used during input serialization by ClassFile only. */
    CONSTANT_Integer_info(ClassFile cf, DataInputStream in)
        throws IOException{
        super(cf, in);
        if (tag != 3)
            throw new ClassFormatError( );
        bytes = in.readInt( );
    }
    /** Used during output serialization by ClassFile only. */
    public void serialize(DataOutputStream out)
        throws IOException{
        out.writeByte(tag);
        out.writeInt(bytes);
    }
}
```

A20. CONSTANT_InterfaceMethodref_info.java

Convience class for representing CONSTANT_InterfaceMethodref_info structures within ClassFiles.

```java
import java.lang.*;
import java.io.*;
/** InterfaceMethodref subtype of a constant pool entry.
 */
```

-continued

```java
public final class CONSTANT_InterfaceMethodref_info extends
cp_info{
    /** The index to the class that this field is referencing to. */
    public int class_index;
    /** The name and type index this field if referencing to. */
    public int name_and_type_index;
    public CONSTANT_InterfaceMethodref_info(int class_index,
                                            int name_and_type_index) {
        tag = 11;
        this.class_index = class_index;
        this.name_and_type_index = name_and_type_index;
    }
    /** Used during input serialization by ClassFile only. */
    CONSTANT_InterfaceMethodref_info(ClassFile cf,
    DataInputStream in)
        throws IOException{
        super(cf, in);
        if (tag != 11)
            throw new ClassFormatError( );
        class_index = in.readChar( );
        name_and_type_index = in.readChar( );
    }
    /** Used during output serialization by ClassFile only. */
    void serialize(DataOutputStream out)
        throws IOException{
        out.writeByte(tag);
        out.writeChar(class_index);
        out.writeChar(name_and_type_index);
    }
}
```

A21. CONSTANT_Long_info.java

Convience class for representing CONSTANT_Long_info structures within ClassFiles.

```java
import java.lang.*;
import java.io.*;
/** Long subtype of a constant pool entry. */
public final class CONSTANT_Long_info extends cp_info{
    /** The actual value. */
    public long bytes;
    public CONSTANT_Long_info(long b){
        tag = 5;
        bytes = b;
    }
    /** Used during input serialization by ClassFile only. */
    CONSTANT_Long_info(ClassFile cf, DataInputStream in)
        throws IOException{
        super(cf, in);
        if (tag != 5)
            throw new ClassFormatError( );
        bytes = in.readLong( );
    }
    /** Used during output serialization by ClassFile only. */
    void serialize(DataOutputStream out)
        throws IOException{
        out.writeByte(tag);
        out.writeLong(bytes);
    }
}
```

A22. CONSTANT_Methodref_info.java

Convience class for representing CONSTANT_Methodref_info structures within ClassFiles.

```java
import java.lang.*;
import java.io.*;
/** Methodref subtype of a constant pool entry.
 */
```

```
public final class CONSTANT_Methodref_info extends cp_info{
   /** The index to the class that this field is referencing to. */
   public int class_index;
   /** The name and type index this field if referencing to. */
   public int name_and_type_index;
   public CONSTANT_Methodref_info(int class_index,
   int name_and_type_index)
   {
      tag = 10;
      this.class_index = class_index;
      this.name_and_type_index = name_and_type_index;
   }
   /** Used during input serialization by ClassFile only. */
   CONSTANT_Methodref_info(ClassFile cf, DataInputStream in)
      throws IOException{
         super(cf, in);
         if (tag != 10)
            throw new ClassFormatError( );
         class_index = in.readChar( );
         name_and_type_index = in.readChar( );
      }
   /** Used during output serialization by ClassFile only. */
   void serialize(DataOutputStream out)
      throws IOException{
         out.writeByte(tag);
         out.writeChar(class_index);
         out.writeChar(name_and_type_index);
      }
}
```

A23. CONSTANT_NameAndType_info.java

Convience class for representing CONSTANT_NameAnd-Type_info structures within ClassFiles.

```
import java.io.*;
import java.lang.*;
/** NameAndType subtype of a constant pool entry.
 */
public final class CONSTANT_NameAndType_info extends cp_info{
   /** The index to the Utf8 that contains the name. */
   public int name_index;
   /** The index to the Utf8 that constains the signature. */
   public int descriptor_index;
   public CONSTANT_NameAndType_info(int name_index,
   int descriptor_index) {
      tag = 12;
      this.name_index = name_index;
      this.descriptor_index = descriptor_index;
   }
   /** Used during input serialization by ClassFile only. */
   CONSTANT_NameAndType_info(ClassFile cf, DataInputStream in)
      throws IOException{
         super(cf, in);
         if (tag != 12)
            throw new ClassFormatError( );
         name_index = in.readChar( );
         descriptor_index = in.readChar( );
      }
   /** Used during output serialization by ClassFile only. */
   void serialize(DataOutputStream out)
      throws IOException{
         out.writeByte(tag);
         out.writeChar(name_index);
         out.writeChar(descriptor_index);
      }
}
```

A24. CONSTANT_String_info.java

Convience class for representing CONSTANT_String_info structures within ClassFiles.

```
import java.lang.*;
import java.io.*;
/** String subtype of a constant pool entry.
 */
public final class CONSTANT_String_info extends cp_info{
   /** The index to the actual value of the string. */
   public int string_index;
   public CONSTANT_String_info(int value) {
      tag = 8;
      string_index = value;
   }
   /** ONLY TO BE USED BY CLASSFILE! */
   public CONSTANT_String_info(ClassFile cf, DataInputStream in)
      throws IOException{
         super(cf, in);
         if (tag != 8)
            throw new ClassFormatError( );
         string_index = in.readChar( );
      }
   /** Output serialization, ONLY TO BE USED BY CLASSFILE! */
   public void serialize(DataOutputStream out)
      throws IOException{
         out.writeByte(tag);
         out.writeChar(string_index);
      }
}
```

A25. CONSTANT_Utf8_info.java

Convience class for representing CONSTANT_Utf8_info structures within ClassFiles.

```
import java.io.*;
import java.lang.*;
/** Utf8 subtype of a constant pool entry.
 * We internally represent the Utf8 info byte array
 * as a String.
 */
public final class CONSTANT_Utf8_info extends cp_info{
   /** Length of the byte array. */
   public int length;
   /** The actual bytes, represented by a String. */
   public String bytes;
   /** This constructor should be used for the purpose
    * of part creation. It does not set the parent
    * ClassFile reference.
    */
   public CONSTANT_Utf8_info(String s) {
      tag = 1;
      length = s.length( );
      bytes = s;
   }
   /** Used during input serialization by ClassFile only. */
   public CONSTANT_Utf8_info(ClassFile cf, DataInputStream in)
      throws IOException{
         super(cf, in);
         if (tag != 1)
            throw new ClassFormatError( );
         length = in.readChar( );
         byte[ ] b = new byte[length];
         in.read(b, 0, length);
         // WARNING: String constructor is deprecated.
         bytes = new String(b, 0, length);
      }
   /** Used during output serialization by ClassFile only. */
   public void serialize(DataOutputStream out)
      throws IOException{
         out.writeByte(tag);
         out.writeChar(length);
         // WARNING: Handling of String coversion here might be
```

A26. ConstantValue_attribute.java

Convience class for representing ConstantValue_attribute structures within ClassFiles.

```java
import java.lang.*;
import java.io.*;
/** Attribute that allows for initialization of static variables in
 *  classes. This attribute will only reside in a field_info struct.
 */
public final class ConstantValue_attribute extends attribute_info{
    public int constantvalue_index;
    public ConstantValue_attribute(ClassFile cf, int ani, int al, int cvi){
        super(cf);
        attribute_name_index = ani;
        attribute_length = al;
        constantvalue_index = cvi;
    }
    public ConstantValue_attribute(ClassFile cf, DataInputStream in)
        throws IOException{
        super(cf, in);
        constantvalue_index = in.readChar( );
    }
    public void serialize(DataOutputStream out)
        throws IOException{
        attribute_length = 2;
        super.serialize(out);
        out.writeChar(constantvalue_index);
    }
}
```

A27. cp_info.java

Convience class for representing cp_info structures within ClassFiles.

```java
import java.lang.*;
import java.io.*;
/** Represents the common interface of all constant pool parts
 *  that all specific constant pool items must inherit from.
 *
 */
public abstract class cp_info{
    /** The type tag that signifies what kind of constant pool
     *  item it is */
    public int tag;
    /** Used for serialization of the object back into a bytestream. */
    abstract void serialize(DataOutputStream out) throws IOException;
    /** Default constructor. Simply does nothing. */
    public cp_info( ) { }
    /** Constructor simply takes in the ClassFile as a reference to
     *  it's parent
     */
    public cp_info(ClassFile cf) { }
    /** Used during input serialization by ClassFile only. */
    cp_info(ClassFile cf, DataInputStream in)
        throws IOException{
        tag = in.readUnsignedByte( );
    }
}
```

-continued

```java
    problematic.
    out.writeBytes(bytes);
}
public String toString( ){
    return bytes;
}
}
```

A28. Deprecated_attribute.java

Convience class for representing Deprecated_attribute structures within ClassFiles.

```java
import java.lang.*;
import java.io.*;
/** A fix attributed that can be located either in the ClassFile,
 *  field_info or the method_info attribute. Mark deprecated to
 *  indicate that the method, class or field has been superceded.
 */
public final class Deprecated_attribute extends attribute_info{
    public Deprecated_attribute(ClassFile cf, int ani, int al){
        super(cf);
        attribute_name_index = ani;
        attribute_length = al;
    }
    /** Used during input serialization by ClassFile only. */
    Deprecated_attribute(ClassFile cf, DataInputStream in)
        throws IOException{
        super(cf, in);
    }
}
```

A29. Exceptions_attribute.java

Convience class for representing Exceptions_attribute structures within ClassFiles.

```java
import java.lang.*;
import java.io.*;
/** This is the struct where the exceptions table are located.
 *   <br><br>
 *  This attribute can only appear once in a method_info struct.
 */
public final class Exceptions_attribute extends attribute_info{
    public int number_of_exceptions;
    public int[ ] exception_index_table;
    public Exceptions_attribute(ClassFile cf, int ani, int al, int noe,
                    int[ ] eit){
        super(cf);
        attribute_name_index = ani;
        attribute_length = al;
        number_of_exceptions = noe;
        exception_index_table = eit;
    }
    /** Used during input serialization by ClassFile only. */
    Exceptions_attribute(ClassFile cf, DataInputStream in)
        throws IOException{
        super(cf, in);
        number_of_exceptions = in.readChar( );
        exception_index_table = new int [number_of_exceptions];
        for (int i=0; i<number_of_exceptions; i++)
            exception_index_table[i] = in.readChar( );
    }
    /** Used during output serialization by ClassFile only. */
    public void serialize(DataOutputStream out)
        throws IOException{
        attribute_length = 2 + (number_of_exceptions*2);
        super.serialize(out);
        out.writeChar(number_of_exceptions);
        for (int i=0; i<number_of_exceptions; i++)
            out.writeChar(exception_index_table[i]);
    }
}
```

A30. field_info.java

Convience class for representing field_info structures within ClassFiles.

```java
import java.lang.*;
import java.io.*;
/** Represents the field_info structure as specified in the JVM
specification.
 */
public final class field_info{
   public int access_flags;
   public int name_index;
   public int descriptor_index;
   public int attributes_count;
   public attribute_info[ ] attributes;
   /** Convenience constructor. */
   public field_info(ClassFile cf, int flags, int ni, int di){
      access_flags = flags;
      name_index = ni;
      descriptor_index = di;
      attributes_count = 0;
      attributes = new attribute_info[0];
   }
   /** Constructor called only during the serialization process.
    * <br><br>
    * This is intentionally left as package protected as we
    * should not normally call this constructor directly.
    * <br><br>
    * Warning: the handling of len is not correct (after String s =...)
    */
   field_info(ClassFile cf, DataInputStream in)
      throws IOException{
      access_flags = in.readChar( );
      name_index = in.readChar( );
      descriptor_index = in.readChar( );
      attributes_count = in.readChar( );
      attributes = new attribute_info[attributes_count];
      for (int i=0; i<attributes_count; i++){
         in.mark(2);
         String s = cf.constant_pool[in.readChar( )].toString( );
         in.reset( );
         if (s.equals("ConstantValue"))
            attributes[i] = new ConstantValue_attribute(cf, in);
         else if (s.equals("Synthetic"))
            attributes[i] = new Synthetic_attribute(cf, in);
         else if (s.equals("Deprecated"))
            attributes[i] = new Deprecated_attribute(cf, in);
         else
            attributes[i] = new attribute_info.Unknown(cf, in);
      }
   }
   /** To serialize the contents into the output format.
    */
   public void serialize(DataOutputStream out)
      throws IOException{
      out.writeChar(access_flags);
      out.writeChar(name_index);
      out.writeChar(descriptor_index);
      out.writeChar(attributes_count);
      for (int i=0; i<attributes_count; i++)
         attributes[i].serialize(out);
   }
}
```

A31. InnerClasses_attribute.java

Convience class for representing InnerClasses_attribute structures within ClassFiles.

```java
import java.lang.*;
import java.io.*;
/** A variable length structure that contains information about an
 *  inner class of this class.
 */
public final class InnerClasses_attribute extends attribute_info{
   public int number_of_classes;
   public classes[ ] classes;
   public final static class classes{
      int inner_class_info_index;
      int outer_class_info_index;
      int inner_name_index;
      int inner_class_access_flags;
   }
   public InnerClasses_attribute(ClassFile cf, int ani, int al,
                  int noc, classes[ ] c){
      super(cf);
      attribute_name_index = ani;
      attribute_length = al;
      number_of_classes = noc;
      classes = c;
   }
   /** Used during input serialization by ClassFile only. */
   InnerClasses_attribute(ClassFile cf, DataInputStream in)
      throws IOException{
      super(cf, in);
      number_of_classes = in.readChar( );
      classes = new InnerClasses_attribute.classes[number_of_classes];
      for (int i=0; i<number_of_classes; i++){
         classes[i] = new classes( );
         classes[i].inner_class_info_index = in.readChar( );
         classes[i].outer_class_info_index = in.readChar( );
         classes[i].inner_name_index = in.readChar( );
         classes[i].inner_class_access_flags = in.readChar( );
      }
   }
   /** Used during output serialization by ClassFile only. */
   public void serialize(DataOutputStream out)
      throws IOException{
      attribute_length = 2 + (number_of_classes * 8);
      super.serialize(out);
      out.writeChar(number_of_classes);
      for (int i=0; i<number_of_classes; i++){
         out.writeChar(classes[i].inner_class_info_index);
         out.writeChar(classes[i].outer_class_info_index);
         out.writeChar(classes[i].inner_name_index);
         out.writeChar(classes[i].inner_class_access_flags);
      }
   }
}
```

A32. LineNumberTable_attribute.java

Convience class for representing LineNumberTable_attribute structures within ClassFiles.

```java
import java.lang.*;
import java.io.*;
/** Determines which line of the binary code relates to the
 *  corresponding source code.
 */
public final class LineNumberTable_attribute extends attribute_info{
   public int line_number_table_length;
   public line_number_table[ ] line_number_table;
   public final static class line_number_table{
      int start_pc;
      int line_number;
   }
   public LineNumberTable_attribute(ClassFile cf, int ani, int al, int lntl,
                  line_number_table[ ] lnt){
      super(cf);
      attribute_name_index = ani;
      attribute_length = al;
      line_number_table_length = lntl;
      line_number_table = lnt;
   }
   /** Used during input serialization by ClassFile only. */
   LineNumberTable_attribute(ClassFile cf, DataInputStream in)
```

```
        throws IOException{
            super(cf, in);
            line_number_table_length = in.readChar( );
            line_number_table = new
LineNumberTable_attribute.-
line_number_table[line_number_table_length];
            for (int i=0; i<line_number_table_length; i++){
                line_number_table[i] = new line_number_table( );
                line_number_table[i].start_pc = in.readChar( );
                line_number_table[i].line_number = in.readChar( );
            }
        }
        /** Used during output serialization by ClassFile only. */
        void serialize(DataOutputStream out)
            throws IOException{
            attribute_length = 2 + (line_number_table_length * 4);
            super.serialize(out);
            out.writeChar(line_number_table_length);
            for (int i=0; i<line_number_table_length; i++){
                out.writeChar(line_number_table[i].start_pc);
                out.writeChar(line_number_table[i].line_number);
            }
        }
}
```

A33. LocalVariableTable_attribute.java

Convience class for representing LocalVariableTable_attribute structures within ClassFiles.

```
import java.lang.*;
import java.io.*;
/** Used by debugger to find out how the source file line number is linked
 *  to the binary code. It has many to one correspondence and is found in
 *  the Code_attribute.
 */
public final class LocalVariableTable_attribute extends attribute_info{
    public int local_variable_table_length;
    public local_variable_table[ ] local_variable_table;
    public final static class local_variable_table{
        int start_pc;
        int length;
        int name_index;
        int descriptor_index;
        int index;
    }
    public LocalVariableTable_attribute(ClassFile cf, int ani, int al,
                        int lvtl, local_variable_table[ ]
lvt){
        super(cf);
        attribute_name_index = ani;
        attribute_length = al;
        local_variable_table_length = lvtl;
        local_variable_table = lvt;
    }
    /** Used during input serialization by ClassFile only. */
    LocalVariableTable_attribute(ClassFile cf, DataInputStream in)
        throws IOException{
        super(cf, in);
        local_variable_table_length = in.readChar( );
        local_variable_table = new
LocalVariableTable_attribute.-
local_variable_table[local_variable_table_length];
        for (int i=0; i<local_variable_table_length; i++){
            local_variable_table[i] = new local_variable_table( );
            local_variable_table[i].start_pc = in.readChar( );
            local_variable_table[i].length = in.readChar( );
            local_variable_table[i].name_index = in.readChar( );
            local_variable_table[i].descriptor_index = in.readChar( );
            local_variable_table[i].index = in.readChar( );
        }
    }
    /** Used during output serialization by ClassFile only. */
    void serialize(DataOutputStream out)
        throws IOException{
        attribute_length = 2 + (local_variable_table_length * 10);
        super.serialize(out);
        out.writeChar(local_variable_table_length);
        for (int i=0; i<local_variable_table_length; i++){
            out.writeChar(local_variable_table[i].start_pc);
            out.writeChar(local_variable_table[i].length);
            out.writeChar(local_variable_table[i].name_index);
            out.writeChar(local_variable_table[i].descriptor_index);
            out.writeChar(local_variable_table[i].index);
        }
    }
}
```

A34. method_info.java

Convience class for representing method_info structures within ClassFiles.

```
import java.lang.*;
import java.io.*;
/** This follows the method_info in the JVM specification.
 */
public final class method_info {
    public int access_flags;
    public int name_index;
    public int descriptor_index;
    public int attributes_count;
    public attribute_info[ ] attributes;
    /** Constructor. Creates a method_info, initializes it with
     *  the flags set, and the name and descriptor indexes given.
     *  A new uninitialized code attribute is also created, and stored
     *  in the <i>code</i> variable.*/
    public method_info(ClassFile cf, int flags, int ni, int di,
                       int ac, attribute_info[ ] a) {
        access_flags = flags;
        name_index = ni;
        descriptor_index = di;
        attributes_count = ac;
        attributes = a;
    }
    /** This method creates a method_info from the current pointer in the
     *  data stream. Only called by during the serialization of a complete
     *  ClassFile from a bytestream, not normally invoked directly.
     */
    method_info(ClassFile cf, DataInputStream in)
        throws IOException{
        access_flags = in.readChar( );
        name_index = in.readChar( );
        descriptor_index = in.readChar( );
        attributes_count = in.readChar( );
        attributes = new attribute_info[attributes_count];
        for (int i=0; i<attributes_count; i++){
            in.mark(2);
            String s = cf.constant_pool[in.readChar( )].toString( );
            in.reset( );
            if (s.equals("Code"))
                attributes[i] = new Code_attribute(cf, in);
            else if (s.equals("Exceptions"))
                attributes[i] = new Exceptions_attribute(cf, in);
            else if (s.equals("Synthetic"))
                attributes[i] = new Synthetic_attribute(cf, in);
            else if (s.equals("Deprecated"))
                attributes[i] = new Deprecated_attribute(cf, in);
            else
                attributes[i] = new attribute_info.Unknown(cf, in);
        }
    }
    /** Output serialization of the method_info to a byte array.
     *  Not normally invoked directly.
     */
    public void serialize(DataOutputStream out)
        throws IOException{
        out.writeChar(access_flags);
```

-continued

```
        out.writeChar(name_index);
        out.writeChar(descriptor_index);
        out.writeChar(attributes_count);
        for (int i=0; i<attributes_count; i++)
            attributes[i].serialize(out);
    }
}
```

A35. SourceFile_attribute.java

Convience class for representing SourceFile_attribute structures within ClassFiles.

```
import java.lang.*;
import java.io.*;
/** A SourceFile attribute is an optional fixed_length attribute in
 *  the attributes table. Only located in the ClassFile struct only
 *  once.
 */
public final class SourceFile_attribute extends attribute_info{
    public int sourcefile_index;
    public SourceFile_attribute(ClassFile cf, int ani, int al, int sfi){
        super(cf);
        attribute_name_index = ani;
        attribute_length = al;
        sourcefile_index = sfi;
    }
    /** Used during input serialization by ClassFile only. */
    SourceFile_attribute(ClassFile cf, DataInputStream in)
        throws IOException{
        super(cf, in);
        sourcefile_index = in.readChar( );
    }
    /** Used during output serialization by ClassFile only. */
    void serialize(DataOutputStream out)
        throws IOException{
        attribute_length = 2;
        super.serialize(out);
        out.writeChar(sourcefile_index);
    }
}
```

A36. Synthetic_attribute.java

Convience class for representing Synthetic_attribute structures within ClassFiles.

```
import java.lang.*;
import java.io.*;
/** A synthetic attribute indicates that this class does not have
 *  a generated code source. It is likely to imply that the code
 *  is generated by machine means rather than coded directly. This
 *  attribute can appear in the classfile, method_info or field_info.
 *  It is fixed length.
 */
public final class Synthetic_attribute extends attribute_info{
    public Synthetic_attribute(ClassFile cf, int ani, int al){
        super(cf);
        attribute_name_index = ani;
        attribute_length = al;
    }
    /** Used during output serialization by ClassFile only. */
    Synthetic_attribute(ClassFile cf, DataInputStream in)
        throws IOException{
        super(cf, in);
    }
}
```

END OF ANNEXURE

I claim:

1. A method of operating, on a multiple computer system comprising a plurality of computers, a stored application program having code written to operate only on a single computer system comprising a single computer having a single CPU or a single computer having symmetric multiple processors, said code including a plurality of threads all intended to execute in cooperation with a single memory, wherein: all of said plurality of computers are interconnected via a communications link; each one of said plurality of computers is independent of the other ones of said plurality of computers, has a single independent local memory which is not shared with any other computer of said plurality of computers and accessible only by the corresponding portion of said application program executing on that single computer, has a substantially similar copy of said application program code stored therein, and has at least one thread; each said single independent local memory has memory locations only addressable and accessible by the thread or threads of the corresponding computer executing the corresponding copy of said application program code, and each said independent local memory has stored therein all application memory values arising from the execution of all said threads of all said plurality of computers; said method of operating comprising the steps of: (i) allocating said plurality of threads of said stored application program code amongst said multiple computers so that at least a portion of the application including at least one thread of said application program code is allocated to a corresponding one of said multiple computers for execution thereon by one or more threads of that one of said multiple computers; (ii) substantially simultaneously executing said application program code thread or threads by those ones of said multiple computers having an application program code thread or threads allocated thereto; (iii) storing in said single independent local memory of each said computer a replica of each and every application memory value addressable by each and every said thread of each and every one of said plurality of computers; and (iv) communicating via said communications link each new application memory value which has overwritten a previous corresponding value as a consequence of execution of said application program code on any one of said single computers, to the independent local memory of all other ones of said computers, whereby the values of said replica application memory values of all said computers remain, subject to an updating transmission delay, substantially identical; (v) modifying each said copy of said application program code prior to storing same in each said single independent local memory;

wherein said modifying step (v) further comprises: (a) detecting instructions which share memory records utilizing one of said single computers; (b) listing all such shared memory records and providing a naming tag for each listed memory record; (c) detecting those instructions which write to, or manipulate the contents of, any of said listed memory records; and (d) generating an updating propagation routine corresponding to each said detected write or manipulate instruction, said updating propagation routine forwarding the re-written or manipulated contents and name tag of each said re-written or manipulated listed memory record to all of the others of said single computers.

2. The method as claimed in claim 1, further comprising the step of: (v) during execution of said substantially similar copy of said application program code by each said single computer, satisfying all read requests from each said single computer from the corresponding single independent local memory of that computer.

3. The method as claimed in claim 1, further comprising the step of: (v) reading in each said single computer said substantially similar copy of said application program code from said single independent local memory of each said computer.

4. The method as claimed in claim 1, further comprising the step of: (v) storing said substantially similar copy of said application program code in a compiled object code format.

5. The method as claimed in claim 1, further comprising the step of: (v) storing said substantially similar copy of said application program code in an uncompiled source code format.

6. The method as claimed in claim 1, further comprising the step of: (v) modifying each said copy of said application program in the same way for each said single computer.

7. The method as claimed in claim 1, further comprising the step of: (x) modifying each said copy of said application program in a different way for each said single computer.

8. The method as claimed in claim 1, wherein the substantially similar copy of the application program comprises a copy of the application program with the same or substantially the same or similar modifier applied to the copy of the application program.

9. A multiple computer system comprising a plurality of computers and on which is executed an application program having code written to operate only on a single computer system comprising a single computer having a single CPU or a single computer having symmetric multi-processors, said code including a plurality of threads all intended to execute in cooperation with a single memory, wherein: all of said plurality of computers are interconnected via a communications link; each one of said plurality of computers is independent of the other ones of said plurality of computers, has a single independent local memory which is not shared with any other computer of said plurality of computers, has a substantially similar copy of said application program code stored therein, and has at least one thread; each said single independent local memory has memory locations only addressable and accessible by the thread or threads of the corresponding computer executing the corresponding copy of said application program code, and each said independent local memory has stored therein all application memory values arising from the execution of all said threads of all said plurality of computers; said plurality of threads of said stored application program code being allocated amongst said multiple computers so that at least a portion of the application program including at least one thread of said application program code is allocated to a corresponding one of said multiple computers for substantially simultaneous execution thereon by one or more threads of that one of said multiple computers; said single independent local memory of each said computer stores a replica of each and every application memory value addressable by each and every said thread and each and every one of said plurality of computers; and each new application memory value which is written over a previous corresponding value that has a consequence of execution of said application program code of any one of said single computers, is communicated via said communications link to the single independent local memory of all other ones of said computers, so that the values of said replica application memory values of all said computers remain, subject to an updating transmission delay, substantially identical; modifying each said copy of said application program code prior to storing same in each said single independent local memory;
wherein said modifying step further comprises: (a) detecting instructions which share memory records utilizing one of said single computers; (b) listing all such shared memory records and providing a naming tag for each listed memory record; (c) detecting those instructions which write to, or manipulate the contents of, any of said listed memory records; and (d) generating an updating propagation routine corresponding to each said detected write or manipulate instruction, said updating propagation routine forwarding the re-written or manipulated contents and name tag of each said re-written or manipulated listed memory record to all of the others of said single computers.

10. The system as claimed in claim 9, wherein each said single computer during execution of said substantially similar copy of said application program code satisfies all read requests from that single computer from the corresponding single independent local memory of that single computer.sub.

11. The system as claimed in claim 9, wherein each said substantially similar copy of said application program code is stored in a compiled object code format in the corresponding single independent local memory.

12. The system as claimed in claim 9, wherein each said substantially similar copy of said application program code is stored in an uncompiled source code format in the corresponding single independent local memory.

13. In a multiple computer system including a plurality of single computers interconnected via a communications link, wherein each single computer: (a) has a single central processing unit (CPU) or symmetric multiple processing units, (b) a single independent local memory which is not shared with any other computer of said plurality of single computers, and (c) that is independent of the other ones of said plurality of single computers; each one of said plurality of single computers has a substantially similar copy of an application program having code written to operate only on a single computer system stored therein, the code including a plurality of threads all intended to execute in cooperation with a single memory, and has at least one thread; and each said single independent local memory has memory locations only addressable and accessible by the thread or threads of the corresponding single computer executing the corresponding copy of said application program code, and each said independent local memory has stored therein all application memory values arising from the execution of all said threads of all said plurality of computers; a method of operating said stored application program comprising the steps of: (i) allocating said plurality of threads of said stored application program code amongst said plurality of single computers so that at least a portion of the application program including at least one thread of said application program code is allocated to a corresponding one of said plurality of single computers for execution thereon by one or more threads of that one of said plurality of single computers; (ii) substantially simultaneously executing said application program code thread or threads by those ones of said plurality of single computers having an application program code thread or threads allocated thereto; (iii) storing in said single independent local memory of each said single computer a replica of each and every application memory value addressable by each and every said thread of each and every one of said plurality of computers; and (iv) communicating via said communications link each new application memory value which has overwritten a previous corresponding value as a consequence of execution of said application program code on any one of said single computers, to the single independent local memory of all other ones of said plurality of single computers, so that the values of said replica application memory values of all said single computers remain, subject to an updating transmission delay, substantially identical; (v) modifying each said copy of said application program code prior to storing same in each said single independent local memory; wherein said modifying step (v) further comprises: (a) detecting instructions which share memory records utilizing one of said single computers; (b) listing all such shared memory records and providing a naming tag for each listed memory record; (c) detecting those instructions which write to, or manipulate the contents of, any of said listed memory records; and (d) generating an updating propagation routine corresponding to each said detected write or manipulate instruction, said updating propagation routine forwarding the re-written or manipulated contents and name tag of each said re-written or manipulated listed memory record to all of the others of said single computers.

14. The method as claimed in claim 13, wherein the communicating includes executing an updating propagation routine.

15. The method as claimed in claim 14, wherein executing the updating propagation routine includes communicating the identity of updated, changed, or manipulated memory location, and the updated, manipulated or changed value(s) or content(s) of the manipulated memory location.

16. The method as claimed in claim 14, wherein each of said plurality of single computers receiving an update communication from a network, writes the memory location value(s) received to the local independent memory location corresponding to the identified memory location received.

17. The method as claimed in claim 16, wherein the network is a slow network having a communications speed of operation that is an order of magnitude slower than the speed of operation of the bus on the single computers.

18. The method as claimed in claim 14, wherein: all reading of memory locations or data is satisfied locally from the single computer local independent memory because a current value of at least a portion of memory locations is stored on the single computer carrying out the processing of the code threads which generates the demand to read from memory; and all writing of memory locations or data is satisfied locally from the single computer local independent memory because a current value of at least a portion of memory locations is stored on the single computer carrying out the processing of the code threads which generates the demand to write to memory; wherein the demand to write or rewrite memory being relatively lower than the demand to read from memory, so that memory locations can be continually updated at a relatively low speed via a slow and inexpensive commodity network, yet this sufficient to meet the application program demand for writing to memory.

* * * * *

UNITED STATES PATENT AND TRADEMARK OFFICE
CERTIFICATE OF CORRECTION

PATENT NO. : 7,860,829 B2  Page 1 of 1
APPLICATION NO. : 12/396446
DATED : December 28, 2010
INVENTOR(S) : John Matthew Holt It is certified that error appears in the above-identified patent and that said Letters Patent is hereby corrected as shown below:

On the title page, item (30) Foreign Application Priority Data, include

--Apr. 21, 2005  (AU)      2005902023
  Apr. 21, 2005  (AU)      2005902024
  Apr. 21, 2005  (AU)      2005902025
  Apr. 21, 2005  (AU)      2005902026
  Apr. 21, 2005  (AU)      2005902027--

Signed and Sealed this
Twenty-second Day of February, 2011

David J. Kappos
*Director of the United States Patent and Trademark Office*